(12) United States Patent
Huang et al.

(10) Patent No.: US 12,500,649 B2
(45) Date of Patent: Dec. 16, 2025

(54) METHOD AND APPARATUS FOR HANDLING UE-INITIATED BEAM REPORTING IN A WIRELESS COMMUNICATION SYSTEM

(71) Applicant: ASUS Technology Licensing Inc., Taipei (TW)

(72) Inventors: Chun-Wei Huang, Taipei (TW); Yu-Hsuan Guo, Taipei (TW); Yi-Hsuan Kung, Taipei (TW)

(73) Assignee: ASUS Technology Licensing Inc., Taipei (TW)

( * ) Notice: Subject to any disclaimer, the term of this patent is extended or adjusted under 35 U.S.C. 154(b) by 0 days.

(21) Appl. No.: 19/204,222

(22) Filed: May 9, 2025

(65) Prior Publication Data

US 2025/0350340 A1   Nov. 13, 2025

Related U.S. Application Data

(60) Provisional application No. 63/644,989, filed on May 9, 2024, provisional application No. 63/645,012, filed on May 9, 2024.

(51) Int. Cl.
*H04B 7/0413* (2017.01)
*H04B 7/06* (2006.01)
*H04W 76/38* (2018.01)

(52) U.S. Cl.
CPC ....... *H04B 7/06952* (2023.05); *H04B 7/0413* (2013.01); *H04W 76/38* (2018.02)

(58) Field of Classification Search
CPC .. H04B 7/06952; H04B 7/0413; H04W 76/38
See application file for complete search history.

(56) References Cited

U.S. PATENT DOCUMENTS

2025/0159495 A1*   5/2025   Awadin .................. H04B 7/063

* cited by examiner

*Primary Examiner* — Rahel Guarino
(74) *Attorney, Agent, or Firm* — Skaar Ulbrich Macari, P.A.

(57) ABSTRACT

Methods, systems, and apparatuses are provided for handling User Equipment (UE)-initiated beam reporting in a wireless communication system, wherein a method of a UE comprises being configured with a first UE-initiated beam reporting associated with a Serving Cell, wherein the first UE-initiated beam reporting is (initiated or triggered) based on comparison between a quality of a current beam of the Serving Cell and a quality of a candidate beam of the Serving Cell, maintaining a counter associated with the first UE-initiated beam reporting of the Serving Cell, and resetting the counter in response to a beam change of the current beam on the Serving Cell.

20 Claims, 24 Drawing Sheets

| R | R | R | R | R | Candidate Cell ID | | | Oct 1 |
|---|---|---|---|---|---|---|---|---|
| $P_1$ | $P_2$ | $P_3$ | $P_4$ | $P_5$ | $P_6$ | $P_7$ | $P_8$ | Oct 2 |
| D/U | TCI state ID 1 | | | | | | | Oct 3 |
| D/U | TCI state ID 2 | | | | | | | Oct 4 |
| ... | | | | | | | | |
| D/U | TCI state ID N | | | | | | | Oct N+2 |

FIG. 9 (PRIOR ART)

|  | Procedure 1 | Procedure 2 | Procedure 3 |
|---|---|---|---|
| Action 1 | X | O | O |
| Action 2 | X | O | O |
| Action 3 | X | X | O |
| Action 4 | X | X | O |

FIG. 11

|  | Procedure 1 | Procedure 2 | Procedure 3 |
|---|---|---|---|
| Event 1-related UEI | Perform Action 1 | Perform Action 1 | Not perform action 1 |
| Event 2-related UEI | perform Action 1 | Not perform Action 1 | Not perform action 1 |

FIG. 12

|  | Procedure 1 |
|---|---|
| Event 1-related UEI | Perform Action 1 and Action 2 |
| Event 2-related UEI | perform Action 1 and not perform Action 2 |

METHOD AND APPARATUS FOR HANDLING UE-INITIATED BEAM REPORTING IN A WIRELESS COMMUNICATION SYSTEM

CROSS-REFERENCE TO RELATED APPLICATIONS

The present Application claims priority to and the benefit of U.S. Provisional patent application Ser. No. 63/644,989, filed May 9, 2024, and U.S. Provisional Patent Application Ser. No. 63/645,012, filed May 9, 2024; with each of the referenced and identified applications and disclosures fully incorporated herein by reference.

FIELD

This disclosure generally relates to wireless communication networks and, more particularly, to a method and apparatus for handling User Equipment (UE)-initiated beam reporting in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

Methods, systems, and apparatuses are provided for handling User Equipment (UE)-initiated beam reporting in a wireless communication system. In various embodiments, a method of a UE comprises being configured with a first UE-initiated beam reporting associated with a Serving Cell, wherein the first UE-initiated beam reporting is (initiated or triggered) based on comparison between a quality of a current beam of the Serving Cell and a quality of a candidate beam of the Serving Cell, maintaining a counter associated with the first UE-initiated beam reporting of the Serving Cell, and resetting the counter in response to a beam change of the current beam on the Serving Cell.

BRIEF DESCRIPTION OF THE DRAWINGS

FIG. 9 is a reproduction of FIG. 6.1.3.76-1: Candidate Cell TCI state activation/deactivation MAC CE, rom 3GPP 38.321 v18.1.0.

FIG. 11 is an example diagram showing that a UE could determine whether to perform an action for a UE-initiated beam reporting in response to a procedure based on at least the type of the procedure, in accordance with embodiments of the present invention.

FIG. 12 is an example diagram showing that a UE determines whether to perform Action 1 for a UE-initiated beam reporting in response to different procedures based on different events related to the UE-initiated beam reporting, in accordance with embodiments of the present invention.

DETAILED DESCRIPTION

The invention described herein can be applied to or implemented in exemplary wireless communication systems and devices described below. In addition, the invention is described mainly in the context of the 3GPP architecture reference model. However, it is understood that with the disclosed information, one skilled in the art could easily adapt for use and implement aspects of the invention in a 3GPP2 network architecture as well as in other network architectures.

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A (Long Term Evolution Advanced) wireless access, 3GPP2 UMB (Ultra Mobile Broadband), WIMAX®, 3GPP NR (New Radio), or some other modulation techniques.

In particular, the exemplary wireless communication systems and devices described below may be designed to support one or more standards such as the standard offered by a consortium named "3rd Generation Partnership Project" referred to herein as 3GPP, including: [1] RP-234007 New WID: NR MIMO Phase 5; [2] 3GPP 38.214 v17.4.0; [3] 3GPP 38.321 v17.4.0; [4] 3GPP 38.331 v17.4.0; [5] Draft 38.300 v 18.0.0; [6] RP-234036 New WID: NR mobility enhancements Phase 4; [7] 3GPP 38.321 v18.1.0; [8] Chair notes RAN1 #116 eom0; and [9] Chair's notes RAN1 #116bis eom0; 3GPP TS 38.214 V17.3.0 (2022 September) 3rd Generation Partnership Project; Technical Specification Group Radio Access Network; NR; Physical layer procedures for data (Release 17); and 3GPP TS 38.213 V18.2.0 (2024 March) 3rd Generation Partnership Project; Technical Specification Group Radio Access Network; NR; Physical layer procedures for control (Release 18). The standards and documents listed above are hereby expressly and fully incorporated herein by reference in their entirety.

Figure 1:
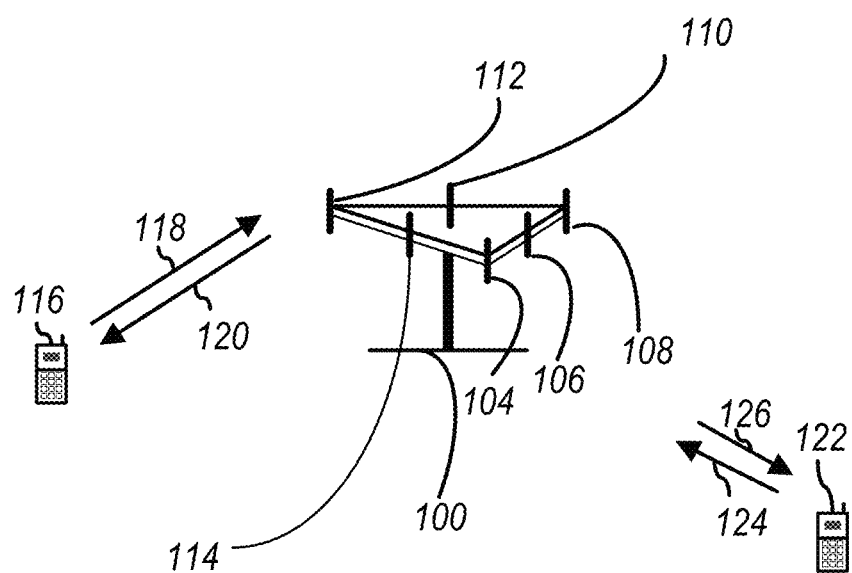
FIG. 1 shows a diagram of a wireless communication system, in accordance with embodiments of the present invention.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group.

Access terminal (AT) 116 is in communication with antennas 112 and 114, where antennas 112 and 114 transmit information to access terminal 116 over forward link 120 and receive information from AT 116 over reverse link 118. AT 122 is in communication with antennas 106 and 108, where antennas 106 and 108 transmit information to AT 122 over forward link 126 and receive information from AT 122 over reverse link 124. In a FDD system, communication links 118, 120, 124 and 126 may use different frequency for communication. For example, forward link 120 may use a different frequency than that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage normally causes less interference to access terminals in neighboring cells than an access network transmitting through a single antenna to all its access terminals.

The AN may be a fixed station or base station used for communicating with the terminals and may also be referred to as an access point, a Node B, a base station, an enhanced base station, an eNodeB, or some other terminology. The AT may also be called User Equipment (UE), a wireless communication device, terminal, access terminal or some other terminology.

Figure 2:
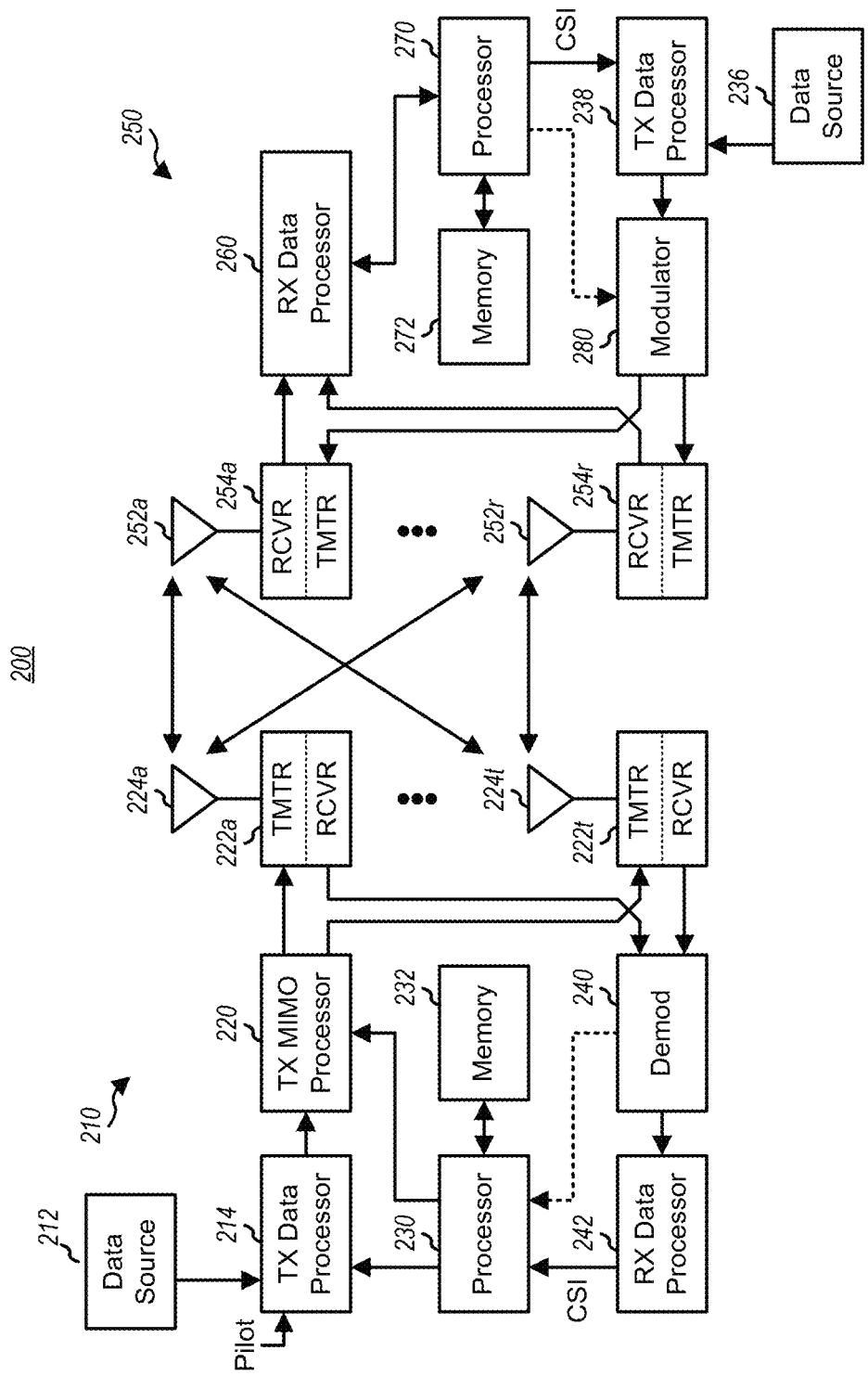
FIG. 2 is a block diagram of a transmitter system (also known as access network) and a receiver system (also known as user equipment or UE), in accordance with embodiments of the present invention.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (e.g., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230. A memory 232 is coupled to processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Memory 232 may be used to temporarily store some buffered/computational data from 240 or 242 through Processor 230, store some buffed data from 212, or store some specific program codes. And Memory 272 may be used to temporarily store some buffered/computational data from 260 through Processor 270, store some buffed data from 236, or store some specific program codes.

Figure 3:
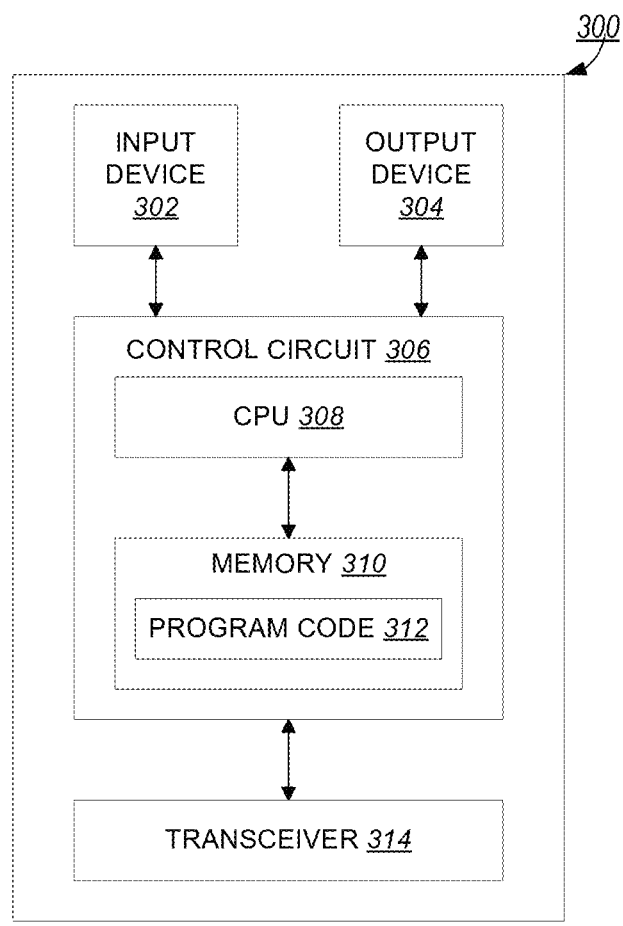
FIG. 3 is a functional block diagram of a communication system, in accordance with embodiments of the present invention.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1, and the wireless communications system is preferably the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly.

Figure 4:
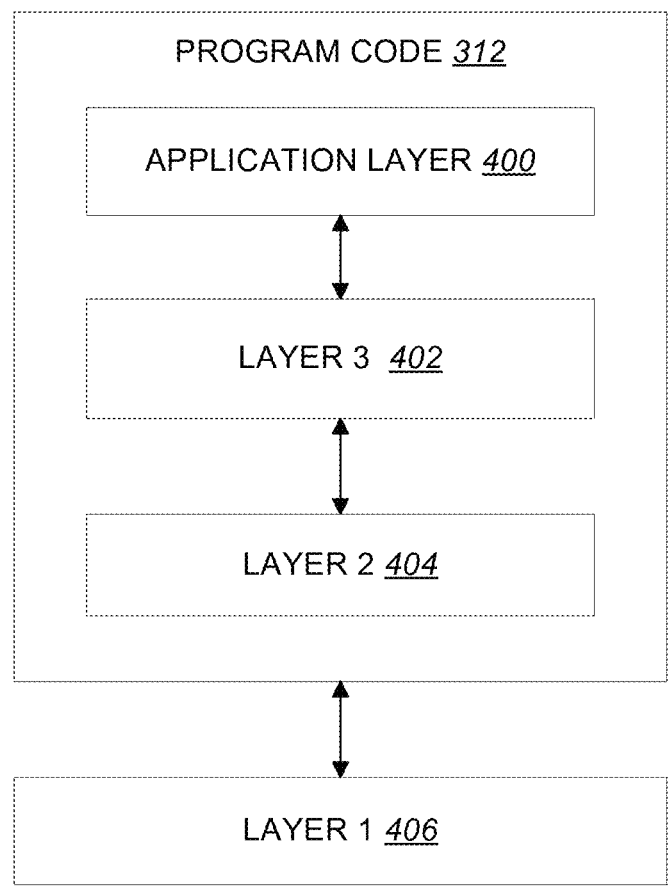
FIG. 4 is a functional block diagram of the program code of FIG. 3, in accordance with embodiments of the present invention.

FIG. 4 is a simplified block diagram of the program code 312 shown in FIG. 3 in accordance with an embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

For LTE, LTE-A, or NR systems, the Layer 2 portion 404 may include a Radio Link Control (RLC) layer and a Medium Access Control (MAC) layer. The Layer 3 portion 402 may include a Radio Resource Control (RRC) layer.

Any two or more than two of the following paragraphs, (sub-) bullets, points, actions, or claims described in each invention paragraph or section may be combined logically, reasonably, and properly to form a specific method.

Any sentence, paragraph, (sub-) bullet, point, action, or claim described in each of the following invention paragraphs or sections may be implemented independently and separately to form a specific method or apparatus. Dependency, e.g., "based on", "more specifically", "example", etc., in the following invention disclosure is just one possible embodiment which would not restrict the specific method or apparatus.

In Work item description [1] RP-234007 New WID: NR MIMO Phase 5, MIMO enhancement for Rel-19 is introduced:

3 Justification

In legacy beam management procedures, the network may configure/activate frequent periodic or semi-persistent beam reporting (e.g., N best beams and corresponding L1-RSRPs) or triggers frequent aperiodic beam reporting to timely acquire the best/preferred beam for data/control transmissions. However, this clearly results in large UL reporting overhead and control signaling overhead. At the same time, if less frequent beam reporting is configured, the network could not always acquire 'best/preferred' beam(s) as the beam reporting by the UE may be outdated, thus leading to performance degradation. Given that UE has better and more-timely knowledge of beam quality changes, UE-initiated beam reporting procedure can lead to more timely beam reports yet with reduced reporting overhead. Under such a procedure, if the UE determines that e.g., current beam(s) quality becomes poor, UE can trigger beam reporting without the network needing to configure or trigger frequent reporting.

. . .

4 Objective
4.1 Objective of SI or Core Part WI or Testing Part WI
The detailed objectives are as follows:
RAN1:
 1. Specify enhancement to facilitate UE-initiated/event-driven beam management for reducing overhead and/or latency, assuming the unified TCI while leveraging (as much as possible) legacy CSI measurement and reporting configuration frameworks, targeting FR2 and sTRP with intra- and inter-cell beam management
   a. UL signaling content(s) (and procedure(s) as required) for UE-initiated/event-driven beam reporting facilitating fast beam switching
   b. UL signaling medium/container considering the UE-initiated/event-driven nature of the UL transmission, designed primarily for the purpose of beam reporting

. . .

Acronyms:
 sTRP: single TRP (transmit-receive point)
 mTRP: multiple TRP (transmit-receive point)
  In [2] 3GPP 38.214 v17.4.0, CSI reporting is introduced:
5.2 UE Procedure for Reporting Channel State Information (CSI)
5.2.1 Channel State Information Framework
The procedures on aperiodic CSI reporting described in this clause assume that the CSI reporting is triggered by DCI format 0_1, but they equally apply to CSI reporting triggered by DCI format 0_2, by applying the higher layer parameter reportTriggerSizeDCI-0-2 instead of reportTriggerSize.
The time and frequency resources that can be used by the UE to report CSI are controlled by the gNB. CSI may consist of Channel Quality Indicator (CQI), precoding matrix indicator (PMI), CSI-RS resource indicator (CRI), SS/PBCH Block Resource indicator (SSBRI), layer indicator (LI), rank indicator (RI), L1-RSRP, L1-SINR or CapabilityIndex.
For CQI, PMI, CRI, SSBRI, LI, RI, L1-RSRP, L1-SINR, Capability [Set] Index a UE is configured by higher layers with N≥1 CSI-ReportConfig Reporting Settings, M≥1 CSI-ResourceConfig Resource Settings, and one or two list(s) of trigger states (given by the higher layer parameters CSI-AperiodicTriggerStateList and CSI-SemiPersistentOnPUSCH-TriggerStateList). Each trigger state in CSI-AperiodicTriggerStateList contains a list of associated CSI-ReportConfigs indicating the Resource Set IDs for channel and optionally for interference. Each trigger state in CSI-SemiPersistentOnPUSCH-TriggerStateList contains one associated CSI-ReportConfig.

5.2.1.1 Reporting Settings
Each Reporting Setting CSI-ReportConfig is associated with a single downlink BWP (indicated by higher layer parameter BWP-Id) given in the associated CSI-ResourceConfig for channel measurement and contains the parameter(s) for one CSI reporting band: codebook configuration including codebook subset restriction, time-domain behavior, frequency granularity for CQI and PMI, measurement restriction configurations, and the CSI-related quantities to be reported by the UE such as the layer indicator (LI), L1-RSRP, L1-SINR, CRI, and SSBRI (SSB Resource Indicator) and CapabilityIndex.

. . .

5.2.1.2 Resource Settings
Each CSI Resource Setting CSI-ResourceConfig contains a configuration of a list of S≥1 CSI Resource Sets (given by higher layer parameter csi-RS-ResourceSetList), where the list is comprised of references to either or both of NZP CSI-RS resource set(s) and SS/PBCH block set(s) or the list is comprised of references to CSI-IM resource set(s). Each CSI Resource Setting is located in the DL BWP identified by the higher layer parameter BWP-id, and all CSI Resource Settings linked to a CSI Report Setting have the same DL BWP.

. . .

5.2.1.4 Reporting Configurations
The UE shall calculate CSI parameters (if reported) assuming the following dependencies between CSI parameters (if reported)
 LI shall be calculated conditioned on the reported CQI, PMI, RI and CRI
 CQI shall be calculated conditioned on the reported PMI, RI and CRI
 PMI shall be calculated conditioned on the reported RI and CRI RI shall be calculated conditioned on the reported CRI. The Reporting configuration for CSI can be aperiodic (using PUSCH), periodic (using PUCCH) or semi-persistent (using PUCCH, and DCI activated PUSCH). The CSI-RS Resources can be periodic, semi-persistent, or aperiodic. Table 5.2.1.4-1 shows the supported combinations of CSI Reporting configurations and CSI-RS Resource configurations and how the CSI Reporting is triggered for each CSI-RS Resource configuration. Periodic CSI-RS is configured by higher layers. Semi-persistent CSI-RS is activated and deactivated as described in Clause 5.2.1.5.2. Aperiodic CSI-RS is configured and triggered/activated as described in Clause 5.2.1.5.1.

For aperiodic CSI, and for periodic and semi-persistent CSI resource settings, each trigger state configured using the higher layer parameter CSI-AperiodicTriggerState is associated with one or multiple CSI-ReportConfig where the CSI-ReportConfig configured with groupBasedBeamReporting-r17 is linked to periodic or semi-persistent, setting(s):

When one Resource Setting is configured, the Resource setting is given by resourcesForChannelMeasurement for L1-RSRP measurement. In such a case, the number of configured CSI Resource Sets in the Resource Setting is S=2

TABLE 5.2.1.4-1

Triggering/Activation of CSI Reporting for the possible CSI-RS Configurations.

| CSI-RS Configuration | Periodic CSI Reporting | Semi-Persistent CSI Reporting | Aperiodic CSI Reporting |
|---|---|---|---|
| Periodic CSI-RS | No dynamic triggering/ activation | For reporting on PUCCH, the UE receives an activation command, as described in clause 6.1.3.16 of [10, TS 38.321]; for reporting on PUSCH, the UE receives triggering on DCI | Triggered by DCI; additionally, subselection indication as described in clause 6.1.3.13 of [10, TS 38.321] possible as defined in Clause 5.2.1.5.1. |
| Semi-Persistent CSI-RS | Not Supported | For reporting on PUCCH, the UE receives an activation command, as described in clause 6.1.3.16 of [10, TS 38.321]; for reporting on PUSCH, the UE receives triggering on DCI | Triggered by DCI; additionally, subselection indication as described in clause 6.1.3.13 of [10, TS 38.321] possible as defined in Clause 5.2.1.5.1. |
| Aperiodic CSI-RS | Not Supported | Not Supported | Triggered by DCI; additionally, subselection indication as described in clause 6.1.3.13 of [10, TS 38.321] possible as defined in Clause 5.2.1.5.1. |

5.2.1.4.1 Resource Setting Configuration

For aperiodic CSI, each trigger state configured using the higher layer parameter CSI-AperiodicTriggerState is associated with one or multiple CSI-ReportConfig where the CSI-ReportConfig not configured with groupBasedBeamReporting-r17 is linked to periodic, or semi-persistent, or aperiodic resource setting(s):

When one Resource Setting is configured, the Resource Setting (given by higher layer parameter resourcesForChannelMeasurement) is for channel measurement for L1-RSRP or for channel and interference measurement for L1-SINR computation.

When two Resource Settings are configured, the first one Resource Setting (given by higher layer parameter resourcesForChannelMeasurement) is for channel measurement and the second one (given by either higher layer parameter csi-IM-ResourcesForInterference or higher layer parameter nzp-CSI-RS-ResourcesForInterference) is for interference measurement performed on CSI-IM or on NZP CSI-RS.

When three Resource Settings are configured, the first Resource Setting (higher layer parameter resourcesForChannelMeasurement) is for channel measurement, the second one (given by higher layer parameter csi-IM-ResourcesForInterference) is for CSI-IM based interference measurement and the third one (given by higher layer parameter nzp-CSI-RS-ResourcesForInterference) is for NZP CSI-RS based interference measurement.

For aperiodic CSI, and for aperiodic CSI resource settings, each trigger state configured using the higher layer parameter CSI-AperiodicTriggerState is associated with one or multiple CSI-ReportConfig where the CSI-ReportConfig configured with groupBasedBeamReporting-r17 is associated with resourcesForChannel and resourcesForChannel2, which correspond to first and second resource sets, respectively, for L1-RSRP measurement.

For semi-persistent or periodic CSI, each CSI-ReportConfig is linked to periodic or semi-persistent Resource Setting(s):

When one Resource Setting (given by higher layer parameter resourcesForChannelMeasurement) is configured, the Resource Setting is for channel measurement for L1-RSRP or for channel and interference measurement for L1-SINR computation.

When two Resource Settings are configured, the first Resource Setting (given by higher layer parameter resourcesForChannelMeasurement) is for channel measurement and the second Resource Setting (given by higher layer parameter csi-IM-ResourcesForInterference) is used for interference measurement performed on CSI-IM. For L1-SINR computation, the second Resource Setting (given by higher layer parameter csi-IM-ResourcesForInterference or higher layer parameter nzp-CSI-RS-ResourceForInterference) is used for interference measurement performed on CSI-IM or on NZP CSI-RS.

. . .

5.2.1.4.2 Report Quantity Configurations

A UE may be configured with a CSI-ReportConfig with the higher layer parameter reportQuantity set to either 'none', 'cri-RI-PMI-CQI', 'cri-RI-i1', 'cri-RI-i1-CQI', 'cri-RI-CQI', 'cri-RSRP', 'cri-SINR', 'ssb-Index-RSRP', 'ssb-Index-SINR', 'cri-RI-LI-PMI-CQI', 'cri-RSRP-Index', 'ssb-Index-RSRP-Index', 'cri-SINR-Index' or 'ssb-Index-SINR-Index'.

If the UE is configured with a CSI-ReportConfig with the higher layer parameter reportQuantity set to 'none', then the UE shall not report any quantity for the CSI-ReportConfig.

...

If the UE is configured with a CSI-ReportConfig with the higher layer parameter reportQuantity set to 'cri-RSRP', 'ssb-Index-RSRP', 'cri-RSRP-Index' or 'ssb-Index-RSRP-Index',

- if the UE is configured with the higher layer parameter groupBasedBeamReporting set to 'disabled', the UE is not required to update measurements for more than 64 CSI-RS and/or SSB resources, and the UE shall report in a single report nrofReportedRS (higher layer configured) different CRI or SSBRI for each report setting.
- if the UE is configured with the higher layer parameter groupBasedBeamReporting set to 'enabled', the UE is not required to update measurements for more than 64 CSI-RS and/or SSB resources, and the UE shall report in a single reporting instance two different CRI or SSBRI for each report setting, where CSI-RS and/or SSB resources can be received simultaneously by the UE either with a single spatial domain receive filter, or with multiple simultaneous spatial domain receive filters.
- if the UE is configured with the higher layer parameter groupBasedBeamReporting-r17, the UE is not required to update measurements for more than 64 CSI-RS and/or SSB resources, and the UE shall report in a single reporting instance nrofReportedGroups, if configured, group(s) of two CRIs or SSBRIs selecting one CSI-RS or SSB from each of the two CSI Resource Sets for the report setting, where CSI-RS and/or SSB resources of each group can be received simultaneously by the UE.

If the UE is configured with a CSI-ReportConfig with the higher layer parameter reportQuantity set to 'cri-SINR', 'ssb-Index-SINR', 'cri-SINR-Index' or 'ssb-Index-SINR-Index',

- if the UE is configured with the higher layer parameter groupBasedBeamReporting set to 'disabled', the UE shall report in a single report nrofReportedRS (higher layer configured) different CRI or SSBRI for each report setting.
- if the UE is configured with the higher layer parameter groupBasedBeamReporting set to 'enabled', the UE shall report in a single reporting instance two different CRI or SSBRI for each report setting, where CSI-RS and/or SSB resources can be received simultaneously by the UE.

...

5.2.1.4.3 L1-RSRP Reporting

For L1-RSRP computation

- the UE may be configured with CSI-RS resources, SS/PBCH Block resources or both CSI-RS and SS/PBCH block resources, when resource-wise quasi co-located with 'type C' and 'typeD' when applicable.
- the UE may be configured with CSI-RS resource setting up to 16 CSI-RS resource sets having up to 64 resources within each set. The total number of different CSI-RS resources over all resource sets is no more than 128.

For L1-RSRP reporting, if the higher layer parameter nrofReportedRS in CSI-ReportConfig is configured to be one, the reported L1-RSRP value is defined by a 7-bit value in the range [−140, −44] dBm with 1 dB step size, if the higher layer parameter nrofReportedRS is configured to be larger than one, or if the higher layer parameter groupBasedBeamReporting is configured as 'enabled', or if the higher layer parameter groupBasedBeamReporting-r17 is configured, the UE shall use differential L1-RSRP based reporting, where the largest measured value of L1-RSRP is quantized to a 7-bit value in the range [−140, −44] dBm with 1 dB step size, and the differential L1-RSRP is quantized to a 4-bit value. The differential L1-RSRP value is computed with 2 dB step size with a reference to the largest measured L1-RSRP value which is part of the same L1-RSRP reporting instance. The mapping between the reported L1-RSRP value and the measured quantity is described in [11, TS 38.133].

When the higher layer parameter groupBasedBeamReporting-r17in CSI-ReportConfig is configured, the UE shall indicate the CSI Resource Set associated with the largest measured value of L1-RSRP, and for each group, CRI or SSBRI of the indicated CSI Resource Set is present first.

If the higher layer parameter timeRestrictionForChannelMeasurements in CSI-ReportConfig is set to "notConfigured", the UE shall derive the channel measurements for computing L1-RSRP value reported in uplink slot n based on only the SS/PBCH or NZP CSI-RS, no later than the CSI reference resource, (defined in TS 38.211 [4]) associated with the CSI resource setting.

If the higher layer parameter time RestrictionForChannelMeasurements in CSI-ReportConfig is set to "Configured", the UE shall derive the channel measurements for computing L1-RSRP reported in uplink slot n based on only the most recent, no later than the CSI reference resource, occasion of SS/PBCH or NZP CSI-RS (defined in [4, TS 38.211]) associated with the CSI resource setting.

When the UE is configured with SSB-MTC-AddtionalPCI, a CSI-SSB-ResourceSet configured for L1-RSRP reporting includes one set of SSB indices and one set of PCI indices, where each SSB index is associated with a PCI index.

When the UE is configured with a CSI-ReportConfig with the higher layer parameter reportQuantity set to 'cri-RSRP-Index' or 'ssb-Index-RSRP-Index' an index of UE capability value set, indicating the maximum supported number of SRS antenna ports, is reported along with the pair of SSBRI/CRI and L1-RSRP.

5.2.1.5 Triggering/Activation of CSI Reports and CSI-RS

5.2.1.5.1 Aperiodic CSI Reporting/Aperiodic CSI-RS when the Triggering PDCCH and the CSI-RS have the Same Numerology For CSI-RS resource sets associated with Resource Settings configured with the higher layer parameter resourceType set to 'aperiodic', 'periodic', or 'semi-persistent', trigger states for Reporting Setting(s) (configured with the higher layer parameter reportConfigType set to 'aperiodic') and/or Resource Setting for channel and/or interference measurement on one or more component carriers are configured using the higher layer parameter CSI-AperiodicTriggerStateList. For aperiodic CSI report triggering, a single set of CSI triggering states are higher layer configured, wherein the CSI triggering states can be associated with any candidate DL BWP. A UE is not expected to receive more than one DCI with non-zero CSI request field per slot per cell. A UE is not expected to receive DCI with non-zero CSI request field within a cell group in a slot overlapping with any slot receiving DCI with non-zero CSI request field in the same cell group. A UE is not expected to be configured with different TCI-StateId's for the same aperiodic CSI-RS resource ID configured in multiple aperiodic CSI-RS resource sets with the same triggering offset in the same aperiodic trigger state. A UE is not expected to receive more than one aperiodic CSI report request for transmission in a given slot per cell. A UE is not expected to receive an aperiodic CSI report request for transmission in a slot overlapping with any slot having an aperiodic CSI report transmission in the same cell group. If a UE does not indicate its capability of CSItriggerStateContainingNonactiveBWP the UE is not expected to be triggered with a CSI report for a non-active DL BWP. Otherwise, when a UE is triggered with a CSI report for a DL BWP that is non-active when expecting to receive the most recent occasion, no later than the CSI reference resource, of the associated NZP CSI-RS, the UE is not expected to report the CSI for the non-active DL BWP and the CSI report associated with that BWP is omitted. When a UE is triggered with aperiodic NZP CSI-RS in a DL BWP that is non-active when expecting to receive the NZP CSI-RS, the UE is not expected to measure the aperiodic CSI-RS. In the carrier of the serving cell expecting to receive that associated NZP CSI-RS, if the active DL BWP when receiving the NZP CSI-RS is different from the active DL BWP when receiving the triggering DCI,
- the last symbol of the PDCCH span of the DCI carrying the BWP switching shall be no later than the last symbol of the PDCCH span of the DCI carrying the CSI trigger, irrespective of whether they are in the same carrier of a serving cell or not and irrespective of whether they are in the same SCS or not;
- the UE is not expected to have any other BWP switching in that carrier after the last symbol of the PDCCH span covering the DCI carrying the CSI trigger and before the first symbol of the triggered NZP CSI-RS or CSI-IM.
- when the PDCCH reception includes two PDCCH candidates from two respective search space sets, as described in clause 10.1 of [6, TS 38.213], the span that involves the PDCCH candidate that ends later in time is used.

A trigger state is initiated using the CSI request field in DCI.
. . .

5.2.1.5.2 Semi-Persistent CSI/Semi-Persistent CSI-RS

For semi-persistent reporting on PUSCH, a set of trigger states are higher layer configured by CSI-SemiPersistentOnPUSCH-TriggerStateList, where the CSI request field in DCI scrambled with SP-CSI-RNTI activates one of the trigger states. A UE is not expected to receive a DCI scrambled with SP-CSI-RNTI activating one semi-persistent CSI report with the same CSI-ReportConfigId as in a semi-persistent CSI report which is activated by a previously received DCI scrambled with SP-CSI-RNTI.

For semi-persistent reporting on PUCCH, the PUCCH resource used for transmitting the CSI report are configured by reportConfigType. Semi-persistent reporting on PUCCH is activated by an activation command as described in clause 6.1.3.16 of [10, TS 38.321], which selects one of the semi-persistent Reporting Settings for use by the UE on the PUCCH. When the UE would transmit a PUCCH with HARQ-ACK information in slot n corresponding to the PDSCH carrying the activation command, the indicated semi-persistent Reporting Setting should be applied starting from the first slot that is after slot $n+3N_{slot}^{subframe,\mu}$ where $\mu$ is the SCS configuration for the PUCCH.

For a UE configured with CSI resource setting(s) where the higher layer parameter resourceType set to 'semiPersistent'.

when a UE receives an activation command, as described in clause 6.1.3.12 of [10, TS 38.321], for CSI-RS resource set(s) for channel measurement and CSI-IM/NZP CSI-RS resource set(s) for interference measurement associated with configured CSI resource setting(s), and when the UE would transmit a PUCCH with HARQ-ACK information in slot n corresponding to the PDSCH carrying the selection command, the corresponding actions in [10, TS 38.321] and the UE assumptions (including QCL assumptions provided by a list of reference to TCI-State's, one per activated resource) on CSI-RS/CSI-IM transmission corresponding to the configured CSI-RS/CSI-IM resource configuration(s) shall be applied starting from the first slot that is after slot $$n + 3N_{slot}^{subframe,\mu} + \frac{2^{\mu}}{2^{\mu_{K_{mac}}}} \cdot k_{mac}$$

where $\mu$ is the SCS configuration for the PUCCH and $\mu_{K_{mac}}$ is the subcarrier spacing configuration for $k_{mac}$ with a value of 0 for frequency range 1, and $k_{mac}$ is provided by K-Mac or $k_{mac}=0$ if K-Mac is not provided. If a TCI-State referred to in the list is configured with a reference to an RS configured with qcl-Type set to 'typeD', that RS can be an SS/PBCH block, periodic or semi-persistent CSI-RS located in same or different CC/DL BWP.

when a UE receives a deactivation command, as described in clause 6.1.3.12 of [10, TS 38.321], for activated CSI-RS/CSI-IM resource set(s) associated with configured CSI resource setting(s), and when the UE would transmit a PUCCH with HARQ-ACK information in slot n corresponding to the PDSCH carrying the deactivation command, the corresponding actions in [10, TS 38.321] and UE assumption on cessation of CSI-RS/CSI-IM transmission corresponding to the deactivated CSI-RS/CSI-IM resource set(s) shall apply starting from the first slot that is after slot $$n + 3N_{slot}^{subframe,\mu} + \frac{2^{\mu}}{2^{\mu_{K_{mac}}}} \cdot k_{mac}$$

where $\mu$ is the SCS configuration for the PUCCH and $\mu_{K_{mac}}$ is the subcarrier spacing configuration for $k_{mac}$ with a value of 0 for frequency range 1, and $k_{mac}$ is provided by K-Mac or $k_{mac}=0$ if K-Mac is not provided.

. . .

In [3] 3GPP 38.321 v17.4.0, Scheduling Request, MAC reset, activation of beam for channel(s) TCI state activation MAC CE(s), and BFR MAC CE(s) are introduced:

5.4.4 Scheduling Request

The Scheduling Request (SR) is used for requesting UL-SCH resources for new transmission.

The MAC entity may be configured with zero, one, or more SR configurations. An SR configuration consists of a set of PUCCH resources for SR across different BWPs and cells. For a logical channel or for SCell beam failure recovery (see clause 5.17) and for consistent LBT failure recovery (see clause 5.21), at most one PUCCH resource for SR is configured per BWP. For a logical channel serving a radio bearer configured with SDT, PUCCH resource for SR is not configured for SDT. For beam failure recovery of BFD-RS set(s) of Serving Cell, up to two PUCCH resources for SR is configured per BWP. For positioning measurement gap activation/deactivation request, a dedicated SR configuration is configured.

Each SR configuration corresponds to one or more logical channels and/or to SCell beam failure recovery and/or to consistent LBT failure recovery and/or to beam failure recovery of a BFD-RS set and/or to positioning measurement gap activation/deactivation request. Each logical channel, SCell beam failure recovery, beam failure recovery of a BFD-RS set and consistent LBT failure recovery, may be mapped to zero or one SR configuration, which is configured by RRC. The SR configuration of the logical channel that triggered a BSR (clause 5.4.5) or the SCell beam failure recovery or the beam failure recovery of a BFD-RS set or the consistent LBT failure recovery (clause 5.21) (if such a configuration exists) or positioning measurement gap activation/deactivation request (clause 5.25) is considered as corresponding SR configuration for the triggered SR. Any SR configuration may be used for an SR triggered by Pre-emptive BSR (clause 5.4.7) or Timing Advance reporting (clause 5.4.8).

RRC configures the following parameters for the scheduling request procedure:
- sr-ProhibitTimer (per SR configuration);
- sr-TransMax (per SR configuration).

The following UE variables are used for the scheduling request procedure:
- SR_COUNTER (per SR configuration).

If an SR is triggered and there are no other SRs pending corresponding to the same SR configuration, the MAC entity shall set the SR_COUNTER of the corresponding SR configuration to 0.

When an SR is triggered, it shall be considered as pending until it is cancelled.

. . .

As long as at least one SR is pending, the MAC entity shall for each pending SR:
1> if the MAC entity has no valid PUCCH resource configured for the pending SR:
2> initiate a Random Access procedure (see clause 5.1) on the SpCell and cancel the pending SR.
1> else, for the SR configuration corresponding to the pending SR:
2> when the MAC entity has an SR transmission occasion on the valid PUCCH resource for SR configured; and
2> if sr-ProhibitTimer is not running at the time of the SR transmission occasion; and
2> if the PUCCH resource for the SR transmission occasion does not overlap with a measurement gap:
. . .
4> consider the SR transmission as a prioritized SR transmission.
4> consider the other overlapping uplink grant(s), if any, as a de-prioritized uplink grant(s), except for the overlapping uplink grant(s) whose simultaneous transmission is allowed by configuration of simultaneousPUCCH-PUSCH or simultaneousPUCCH-PUSCH-SecondaryPUCCHgroup or simultaneousSR-PUSCH-diff-PUCCH-Groups;
4> if the de-prioritized uplink grant(s) is a configured uplink grant configured with autonomousTx whose PUSCH has already started:
5> stop the configuredGrantTimer for the corresponding HARQ process of the de-prioritized uplink grant(s);
5> stop the cg-RetransmissionTimer for the corresponding HARQ process of the de-prioritized uplink grant(s).
4> if SR_COUNTER<sr-TransMax:
5> instruct the physical layer to signal the SR on one valid PUCCH resource for SR;
5> if LBT failure indication is not received from lower layers:
6> increment SR_COUNTER by 1;
6> start the sr-ProhibitTimer.
5> else if lbt-FailureRecoveryConfig is not configured:
6> increment SR_COUNTER by 1.
4> else:
5> notify RRC to release PUCCH for all Serving Cells;
5> notify RRC to release SRS for all Serving Cells;
5> clear any configured downlink assignments and uplink grants;
5> clear any PUSCH resources for semi-persistent CSI reporting;
5> initiate a Random Access procedure (see clause 5.1) on the SpCell and cancel all pending SRs.

5.12 MAC Reset

If a reset of the MAC entity is requested by upper layers or the reset of the MAC entity is triggered due to SCG deactivation as defined in clause 5.29, the MAC entity shall:
1> if the MAC reset is not due to SCG deactivation:
2> initialize Bj for each logical channel to zero;
1> initialize SBj for each logical channel to zero if Sidelink resource allocation mode 1 is configured by RRC;
1> if upper layers indicate SCG deactivation and bfd-and-RLM with value true is configured for the deactivated SCG:
2> stop (if running) all timers except beamFailureDetectionTimer associated with PSCell and timeAlignmentTimers.
1> else:
2> stop (if running) all timers, except MBS broadcast DRX timers;
2> consider all timeAlignmentTimers, inactivePosSRS-TimeAlignmentTimer, and cg-SDT-TimeAlignmentTimer, if configured, as expired and perform the corresponding actions in clause 5.2;
1> set the NDIs for all uplink HARQ processes to the value 0;
1> sets the NDIs for all HARQ process IDs to the value 0 for monitoring PDCCH in Sidelink resource allocation mode 1;
1> stop, if any, ongoing Random Access procedure;
1> discard explicitly signalled contention-free Random Access Resources for 4-step RA type and 2-step RA type, if any;
1> flush Msg3 buffer;
1> flush MSGA buffer;
1> cancel, if any, triggered Scheduling Request procedure;

1> cancel, if any, triggered Buffer Status Reporting procedure;
1> cancel, if any, triggered Power Headroom Reporting procedure;
1> cancel, if any, triggered consistent LBT failure;
1> cancel, if any, triggered BFR;
1> cancel, if any, triggered Sidelink Buffer Status Reporting procedure;
1> cancel, if any, triggered Pre-emptive Buffer Status Reporting procedure;
1> cancel, if any, triggered Timing Advance Reporting procedure;
1> cancel, if any, triggered Recommended bit rate query procedure;
1> cancel, if any, triggered Configured uplink grant confirmation;
1> cancel, if any, triggered configured sidelink grant confirmation;
1> cancel, if any, triggered Desired Guard Symbol query;
1> cancel, if any, triggered Positioning Measurement Gap Activation/Deactivation Request procedure;
1> cancel, if any, triggered SDT procedure;
1> flush the soft buffers for all DL HARQ processes, except for the DL HARQ process being used for MBS broadcast;
1> for each DL HARQ process, except for the DL HARQ process being used for MBS broadcast, consider the next received transmission for a TB as the very first transmission;
1> release, if any, Temporary C-RNTI;
1> if upper layers indicate SCG deactivation and bfd-and-RLM with value true is not configured; or
1> if the MAC reset is not due to SCG deactivation:
2> reset all BFI_COUNTERS;
1> reset all LBT_COUNTERs.
. . .

5.18.4 Activation/Deactivation of UE-Specific PDSCH TCI State

The network may activate and deactivate the configured TCI states for PDSCH of a Serving Cell or a set of Serving Cells configured in simultaneousTCI-UpdateList1 or simultaneousTCI-UpdateList2 by sending the TCI States Activation/Deactivation for UE-specific PDSCH MAC CE described in clause 6.1.3.14. The network may activate and deactivate the configured TCI states for a codepoint of the DCI Transmission configuration indication field as specified in TS 38.212 [9] for PDSCH of a Serving Cell by sending the Enhanced TCI States Activation/Deactivation for UE-specific PDSCH MAC CE described in clause 6.1.3.24. The configured TCI states for PDSCH are initially deactivated upon (re-)configuration by upper layers and after reconfiguration with sync.

The MAC entity shall:
1> if the MAC entity receives a TCI States Activation/Deactivation for UE-specific PDSCH MAC CE on a Serving Cell:
2> indicate to lower layers the information regarding the TCI States Activation/Deactivation for UE-specific PDSCH MAC CE.
1> if the MAC entity receives an Enhanced TCI States Activation/Deactivation for UE-specific PDSCH MAC CE on a Serving Cell:
2> indicate to lower layers the information regarding the Enhanced TCI States Activation/Deactivation for UE-specific PDSCH MAC CE.

5.18.5 Indication of TCI state for UE-specific PDCCH

The network may indicate a TCI state for PDCCH reception for a CORESET of a Serving Cell or a set of Serving Cells configured in simultaneousTCI-UpdateList1 or simultaneousTCI-UpdateList2 by sending the TCI State Indication for UE-specific PDCCH MAC CE described in clause 6.1.3.15. The network may also indicate two TCI states for PDCCH reception for a CORESET of a Serving Cell or a set of Serving Cells configured in simultaneousTCI-UpdateList1 or simultaneousTCI-UpdateList2 by sending the Enhanced TCI States Indication for UE-specific PDCCH MAC CE described in clause 6.1.3.44.

The MAC entity shall:
1> if the MAC entity receives a TCI State Indication for UE-specific PDCCH MAC CE on a Serving Cell:
2> indicate to lower layers the information regarding the TCI State Indication for UE-specific PDCCH MAC CE.
1> if the MAC entity receives an Enhanced TCI States Indication for UE-specific PDCCH MAC CE on a Serving Cell:
2> indicate to lower layers the information regarding the Enhanced TCI States Indication for UE-specific PDCCH MAC CE.

5.18.8 Activation/Deactivation of spatial relation of PUCCH resource

The network may activate and deactivate a spatial relation for a PUCCH resource of a Serving Cell by sending the PUCCH spatial relation Activation/Deactivation MAC CE described in clause 6.1.3.18. The network may also activate and deactivate a spatial relation for a PUCCH resource or a PUCCH resource group of a Serving Cell by sending the Enhanced PUCCH spatial relation Activation/Deactivation MAC CE described in clause 6.1.3.25. The configured spatial relation for a PUCCH resource is initially deactivated upon (re-)configuration by upper layers and after reconfiguration with sync. The network may also activate and deactivate the two spatial relations for a PUCCH resource or a PUCCH resource group of a Serving Cell by sending the PUCCH spatial relation Activation/Deactivation for multiple TRP PUCCH repetition MAC CE described in clause 6.1.3.45.

The MAC entity shall:
1> if the MAC entity receives a PUCCH spatial relation Activation/Deactivation MAC CE on a Serving Cell:
2> indicate to lower layers the information regarding the PUCCH spatial relation Activation/Deactivation MAC CE.
1> if the MAC entity receives an Enhanced PUCCH spatial relation Activation/Deactivation MAC CE on a Serving Cell:
2> indicate to lower layers the information regarding the Enhanced PUCCH spatial relation Activation/Deactivation MAC CE.
1> if the MAC entity receives a PUCCH spatial relation Activation/Deactivation for multiple TRP PUCCH repetition MAC CE on a Serving Cell:
2> indicate to lower layers the information regarding the PUCCH spatial relation Activation/Deactivation for multiple TRP PUCCH repetition MAC CE.
. . .

5.18.23 Unified TCI States Activation/Deactivation MAC CE

The network may activate and deactivate the configured unified TCI states of a Serving Cell or a set of Serving Cells configured in simultaneousU-TCI-UpdateList1, simultaneousU-TCI-UpdateList2, simultaneousU-TCI-UpdateList3 or simultaneousU-TCI-UpdateList4 by sending the Unified TCI States Activation/Deactivation MAC CE described in clause 6.1.3.47. The configured unified TCI states are initially deactivated upon (re-)configuration by upper layers and after reconfiguration with sync.

The MAC entity shall:

1> if the MAC entity receives a Unified TCI States Activation/Deactivation MAC CE on a Serving Cell:
2> indicate to lower layers the information regarding the Unified TCI States Activation/Deactivation MAC CE.

6.1.3.23 BFR MAC CES

The MAC CEs for BFR consists of either:
BFR MAC CE; or
Truncated BFR MAC CE.

The BFR MAC CE and Truncated BFR MAC CE are identified by a MAC subheader with LCID/eLCID as specified in Table 6.2.1-2 and Table 6.2.1-2b.

The BFR MAC CE and Truncated BFR MAC CE have a variable size. They include a bitmap and in ascending order based on the ServCellIndex, beam failure recovery information i.e. octets containing candidate beam availability indication (AC) for SCells indicated in the bitmap. For BFR MAC CE, a single octet bitmap is used when the highest ServCellIndex of this MAC entity's SCell for which beam failure is detected and the evaluation of the candidate beams according to the requirements as specified in TS 38.133 has been completed is less than 8, otherwise four octets are used. A MAC PDU shall contain at most one BFR MAC CE.

For Truncated BFR MAC CE, a single octet bitmap is used for the following cases, otherwise four octets are used:

the highest ServCellIndex of this MAC entity's SCell for which beam failure is detected and the evaluation of the candidate beams according to the requirements as specified in TS 38.133 has been completed is less than 8; or beam failure is detected for SpCell (as specified in Clause 5.17) and the SpCell is to be indicated in a Truncated BFR MAC CE and the UL-SCH resources available for transmission cannot accommodate the Truncated BFR MAC CE with the four octets bitmap plus its subheader as a result of LCP.

The fields in the BFR MAC CEs are defined as follows:

SP: This field indicates beam failure detection (as specified in clause 5.17) for the SpCell of this MAC entity. The SP field is set to 1 to indicate that beam failure is detected for SpCell only when BFR MAC CE or Truncated BFR MAC CE is to be included into a MAC PDU as part of Random Access Procedure (as specified in 5.1.3a and 5.1.4), otherwise, it is set to 0;

$C_i$ (BFR MAC CE): This field indicates beam failure detection (as specified in clause 5.17) and the presence of an octet containing the AC field for the SCell with ServCellIndex i as specified in TS 38.331 [5]. The $C_i$ field set to 1 indicates that beam failure is detected, the evaluation of the candidate beams according to the requirements as specified in TS 38.133 has been completed, and the octet containing the AC field is present for the SCell with ServCellIndex i. The $C_i$ field set to 0 indicates that the beam failure is either not detected or the beam failure is detected but the evaluation of the candidate beams according to the requirements as specified in TS 38.133 has not been completed, and the octet containing the AC field is not present for the SCell with ServCellIndex i. The octets containing the AC field are present in ascending order based on the ServCellIndex;

$C_i$ (Truncated BFR MAC CE): This field indicates beam failure detection (as specified in clause 5.17) for the SCell with ServCellIndex i as specified in TS 38.331 [5]. The $C_i$ field set to 1 indicates that beam failure is detected, the evaluation of the candidate beams according to the requirements as specified in TS 38.133 has been completed, and the octet containing the AC field for the SCell with ServCellIndex i may be present. The $C_i$ field set to 0 indicates that the beam failure is either not detected or the beam failure is detected but the evaluation of the candidate beams according to the requirements as specified in TS 38.133 has not been completed, and the octet containing the AC field is not present for the SCell with ServCellIndex i. The octets containing the AC field, if present, are included in ascending order based on the ServCellIndex. The number of octets containing the AC field included is maximised, while not exceeding the available grant size;

NOTE: The number of the octets containing the AC field in the Truncated BFR MAC CE can be zero.

AC: This field indicates the presence of the Candidate RS ID field in this octet. If at least one of the SSBs with SS-RSRP above rsrp-ThresholdBFR amongst the SSBs in candidateBeamRSSCellList or the CSI-RSs with CSI-RSRP above rsrp-ThresholdBFR amongst the CSI-RSs in candidateBeamRSSCellList is available, the AC field is set to 1; otherwise, it is set to 0. If the AC field set to 1, the Candidate RS ID field is present. If the AC field set to 0, R bits are present instead;

Candidate RS ID: This field is set to the index of an SSB with SS-RSRP above rsrp-ThresholdBFR amongst the SSBs in candidateBeamRSSCellList or to the index of a CSI-RS with CSI-RSRP above rsrp-ThresholdBFR amongst the CSI-RSs in candidateBeamRSSCellList. Index of an SSB or CSI-RS is the index of an entry in candidate BeamRSSCellList corresponding to the SSB or CSI-RS. Index 0 corresponds to the first entry in the candidate BeamRSSCellList, index 1 corresponds to the second entry in the list and so on. The length of this field is 6 bits.

Figure 5:
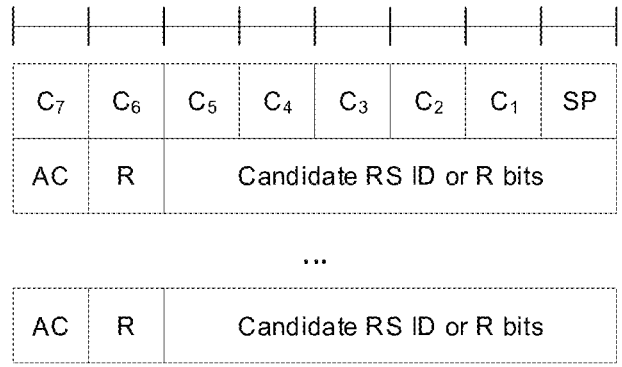
FIG. 5 is a reproduction of FIG. 6.1.3.23-1: BFR and Truncated BFR MAC CE with one octet Ci field, from 3GPP 38.321 v17.4.0.
Figure 6:
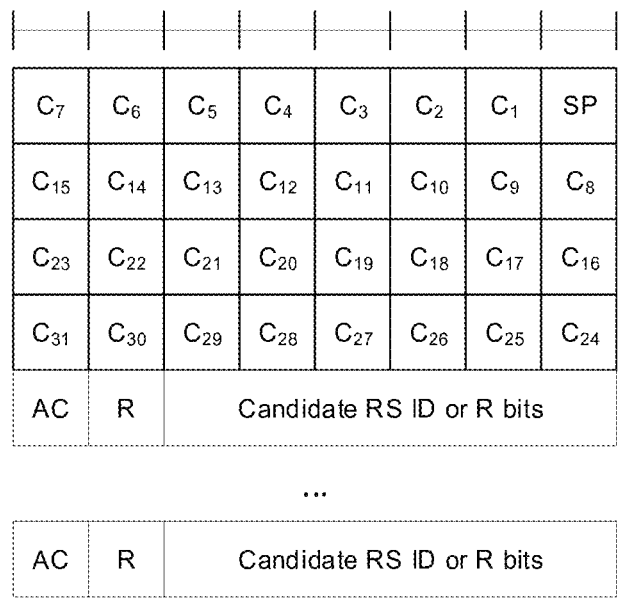
FIG. 6 is a reproduction of FIG. 6.1.3.23-2: BFR and Truncated BFR MAC CE with four octets Ci field, from 3GPP 38.321 v17.4.0.

FIG. 5 is a reproduction of FIG. 6.1.3.23-1: BFR and Truncated BFR MAC CE with one octet $C_i$ field, from 3GPP 38.321 v17.4.0.

FIG. 6 is a reproduction of FIG. 6.1.3.23-2: BFR and Truncated BFR MAC CE with four octets $C_i$ field, from 3GPP 38.321 v17.4.0.

In [4] 3GPP 38.331 v17.4.0, measurement report triggering and associated configurations are introduced:

5.5.4 Measurement report triggering 5.5.4.1 General

If AS security has been activated successfully, the UE shall:

1> for each measId included in the measIdList within VarMeasConfig:
2> if the corresponding reportConfig includes a reportType set to eventTriggered or periodical:
3> if the corresponding measObject concerns NR:
4> if the corresponding reportConfig includes measRSSI-ReportConfig:
5> consider the resource indicated by the rmtc-Config on the associated frequency to be applicable;
4> if the eventA1 or eventA2 is configured in the corresponding reportConfig:
5> consider only the serving cell to be applicable;

4> if the eventA3 or eventA5 is configured in the corresponding reportConfig:
  5> if a serving cell is associated with a measObjectNR and neighbours are associated with another measObjectNR, consider any serving cell associated with the other measObjectNR to be a neighbouring cell as well;
4> if the eventX2 is configured in the corresponding reportConfig:
  5> consider only the serving L2 U2N Relay UE to be applicable;
4> if corresponding reportConfig includes reportType set to periodical; or
4> for measurement events other than eventA1, eventA2, eventD1 or eventX2:
  5> if useAllowedCellList is set to true:
    6> consider any neighbouring cell detected based on parameters in the associated measObjectNR to be applicable when the concerned cell is included in the allowedCellsToAddModList defined within the VarMeasConfig for this measId;
  5> else:
    6> consider any neighbouring cell detected based on parameters in the associated measObjectNR to be applicable when the concerned cell is not included in the excludedCellsToAddModList defined within the VarMeasConfig for this measId;
. . .
2> else if the corresponding reportConfig includes a reportType set to reportCGI:
  3> consider the cell detected on the associated measObject which has a physical cell identity matching the value of the cellForWhichToReportCGI included in the corresponding reportConfig within the VarMeasConfig to be applicable;
2> else if the corresponding reportConfig includes a reportType set to reportSFTD:
  3> if the corresponding measObject concerns NR:
    4> if the reportSFTD-Meas is set to true:
      5> consider the NR PSCell to be applicable;
    4> else if the reportSFTD-NeighMeas is included:
      5> if cellsForWhichToReportSFTD is configured in the corresponding reportConfig:
        6> consider any NR neighbouring cell detected on the associated measObjectNR which has a physical cell identity that is included in the cellsForWhichToReportSFTD to be applicable;
      5> else:
        6> consider up to 3 strongest NR neighbouring cells detected based on parameters in the associated measObjectNR to be applicable when the concerned cells are not included in the excludedCellsToAddModList defined within the VarMeasConfig for this measId;
. . .
2> if the reportType is set to eventTriggered and if the entry condition applicable for this event, i.e. the event corresponding with the eventId of the corresponding reportConfig within VarMeasConfig, is fulfilled for one or more applicable cells for all measurements after layer 3 filtering taken during timeToTrigger defined for this event within the VarMeasConfig, while the VarMeasReportList does not include a measurement reporting entry for this measId (a first cell triggers the event):
  3> include a measurement reporting entry within the VarMeasReportList for this measId;
  3> set the numberOfReportsSent defined within the VarMeasReportList for this measId to 0;
  3> include the concerned cell(s) in the cellsTriggeredList defined within the VarMeasReportList for this measId;
. . .
  3> initiate the measurement reporting procedure, as specified in 5.5.5;
2> else if the reportType is set to eventTriggered and if the entry condition applicable for this event, i.e. the event corresponding with the eventId of the corresponding reportConfig within VarMeasConfig, is fulfilled for one or more applicable cells not included in the cellsTriggeredList for all measurements after layer 3 filtering taken during timeToTrigger defined for this event within the VarMeasConfig (a subsequent cell triggers the event):
  3> set the numberOfReportsSent defined within the VarMeasReportList for this measId to 0;
  3> include the concerned cell(s) in the cellsTriggeredList defined within the VarMeasReportList for this measId;
. . .
  3> initiate the measurement reporting procedure, as specified in 5.5.5;
. . .
2> else if the reportType is set to eventTriggered and if the entry condition applicable for this event, i.e. the event corresponding with the eventId of the corresponding reportConfig within VarMeasConfig, is fulfilled for one or more applicable transmission resource pools for all measurements taken during timeToTrigger defined for this event within the VarMeasConfig, while the VarMeasReportList does not include an measurement reporting entry for this measId (a first transmission resource pool triggers the event):
  3> include a measurement reporting entry within the VarMeasReportList for this measId;
  3> set the numberOfReportsSent defined within the VarMeasReportList for this measId to 0;
  3> include the concerned transmission resource pool(s) in the poolsTriggeredList defined within the VarMeasReportList for this measId;
  3> initiate the measurement reporting procedure, as specified in 5.5.5;
2> else if the reportType is set to eventTriggered and if the entry condition applicable for this event, i.e. the event corresponding with the eventId of the corresponding reportConfig within VarMeasConfig, is fulfilled for one or more applicable transmission resource pools not included in the poolsTriggeredList for all measurements taken during timeToTrigger defined for this event within the VarMeasConfig (a subsequent transmission resource pool triggers the event):
  3> set the numberOfReportsSent defined within the VarMeasReportList for this measId to 0;
  3> include the concerned transmission resource pool(s) in the poolsTriggeredList defined within the VarMeasReportList for this measId;
  3> initiate the measurement reporting procedure, as specified in 5.5.5;
2> if the reportType is set to eventTriggered and if the leaving condition applicable for this event is fulfilled for one or more applicable transmission resource pools included in the poolsTriggeredList defined within the VarMeasReportList for this measId for all measurements taken during timeToTrigger defined within the VarMeasConfig for this event:
  3> remove the concerned transmission resource pool(s) in the poolsTriggeredList defined within the VarMeasReportList for this measId;
  3> if the poolsTriggeredList defined within the VarMeasReportList for this measId is empty:
    4> remove the measurement reporting entry within the VarMeasReportList for this measId;
    4> stop the periodical reporting timer for this measId, if running
. . .
2> if reportType is set to periodical and if a (first) measurement result is available:
  3> include a measurement reporting entry within the VarMeasReportList for this measId;
  3> set the numberOfReportsSent defined within the VarMeasReportList for this measId to 0;
  3> if the corresponding reportConfig includes meas-RSSI-ReportConfig:
    4> initiate the measurement reporting procedure as specified in 5.5.5 immediately when RSSI sample values are reported by the physical layer after the first L1 measurement duration;
  3> else if the corresponding reportConfig includes the ul-DelayValueConfig:
    4> initiate the measurement reporting procedure, as specified in 5.5.5, immediately after a first measurement result is provided from lower layers of the associated DRB identity;
  3> else if the corresponding reportConfig includes the ul-ExcessDelayConfig:
    4> initiate the measurement reporting procedure, as specified in 5.5.5, immediately after a first measurement result is provided from lower layers of the associated DRB identity(ies) according to the configured threshold per DRB identity(ies);
  3> else if the reportAmount exceeds 1:
    4> initiate the measurement reporting procedure, as specified in 5.5.5, immediately after the quantity to be reported becomes available for the NR SpCell or for the serving L2 U2N Relay UE (if the UE is a L2 U2N Remote UE);
  3> else (i.e. the reportAmount is equal to 1):
    4> initiate the measurement reporting procedure, as specified in 5.5.5, immediately after the quantity to be reported becomes available for the NR SpCell and for the strongest cell among the applicable cells, or for the NR SpCell and for the strongest L2 U2N Relay UEs among the applicable L2 U2N Relay UEs; or initiate the measurement reporting procedure, as specified in 5.5.5, immediately after the quantity to be reported becomes available for the serving L2 U2N Relay UE and for the strongest cell among the applicable cells (if the UE is a L2 U2N Remote UE);
. . .
2> if reportType is set to rxTxPeriodical and if a (first) measurement result is available:
  3> include a measurement reporting entry within the VarMeasReportList for this measId;
  3> set the numberOfReportsSent defined within the VarMeasReportList for this measId to 0;
  3> initiate the measurement reporting procedure, as specified in 5.5.5;
2> upon expiry of the periodical reporting timer for this measId:
  3> initiate the measurement reporting procedure, as specified in 5.5.5.
2> if the corresponding reportConfig includes a reportType is set to reportSFTD:
  3> if the corresponding measObject concerns NR:
    4> if the drx-SFTD-NeighMeas is included:
      5> if the quantity to be reported becomes available for each requested pair of PCell and NR cell:
        6> stop timer T322;
        6> initiate the measurement reporting procedure, as specified in 5.5.5;
    4> else
      5> initiate the measurement reporting procedure, as specified in 5.5.5, immediately after the quantity to be reported becomes available for each requested pair of PCell and NR cell or the maximal measurement reporting delay as specified in TS 38.133 [14];
. . .
2> if reportType is set to reportCGI:
  3> if the UE acquired the SIBI or SystemInformationBlockType1 for the requested cell; or
  3> if the UE detects that the requested NR cell is not transmitting SIBI (see TS 38.213 [13], clause 13):
    4> stop timer T321;
    4> include a measurement reporting entry within the VarMeasReportList for this measId;
    4> set the numberOfReportsSent defined within the VarMeasReportList for this measId to 0;
    4> initiate the measurement reporting procedure, as specified in 5.5.5;
2> upon the expiry of T321 for this measId:
  3> include a measurement reporting entry within the VarMeasReportList for this measId;
  3> set the numberOfReportsSent defined within the VarMeasReportList for this measId to 0;
  3> initiate the measurement reporting procedure, as specified in 5.5.5.
2> upon the expiry of T322 for this measId:
  3> initiate the measurement reporting procedure, as specified in 5.5.5.

5.5.4.2 Event A1 (Serving becomes better than threshold)
The UE shall:
  1> consider the entering condition for this event to be satisfied when condition A1-1, as specified below, is fulfilled;
  1> consider the leaving condition for this event to be satisfied when condition A1-2, as specified below, is fulfilled;
  1> for this measurement, consider the NR serving cell corresponding to the associated measObjectNR associated with this event.
Inequality A1-1 (Entering condition)
$Ms - Hys > Thresh$
Inequality A1-2 (Leaving condition)
$Ms + Hys < Thresh$
The variables in the formula are defined as follows:
  Ms is the measurement result of the serving cell, not taking into account any offsets.

Hys is the hysteresis parameter for this event (i.e. hysteresis as defined within reportConfigNR for this event).

Thresh is the threshold parameter for this event (i.e. a1-Threshold as defined within reportConfigNR for this event).

Ms is expressed in dBm in case of RSRP, or in dB in case of RSRQ and RS-SINR.

Hys is expressed in dB.

Thresh is expressed in the same unit as Ms.

5.5.4.3 Event A2 (Serving becomes worse than threshold)

The UE shall:
1> consider the entering condition for this event to be satisfied when condition A2-1, as specified below, is fulfilled;
1> consider the leaving condition for this event to be satisfied when condition A2-2, as specified below, is fulfilled;
1> for this measurement, consider the serving cell indicated by the measObjectNR associated to this event.

Inequality A2-1 (Entering condition)
Ms+Hys<Thresh
Inequality A2-2 (Leaving condition)
Ms−Hys>Thresh The variables in the formula are defined as follows:
Ms is the measurement result of the serving cell, not taking into account any offsets.
Hys is the hysteresis parameter for this event (i.e. hysteresis as defined within reportConfigNR for this event).
Thresh is the threshold parameter for this event (i.e. a2-Threshold as defined within reportConfigNR for this event).
Ms is expressed in dBm in case of RSRP, or in dB in case of RSRQ and RS-SINR.
Hys is expressed in dB.
Thresh is expressed in the same unit as Ms.

5.5.4.4 Event A3 (Neighbour becomes offset better than SpCell)

The UE shall:
1> consider the entering condition for this event to be satisfied when condition A3-1, as specified below, is fulfilled;
1> consider the leaving condition for this event to be satisfied when condition A3-2, as specified below, is fulfilled;
1> use the SpCell for Mp, Ofp and Ocp.

NOTE 1: The cell(s) that triggers the event has reference signals indicated in the measObjectNR associated to this event which may be different from the NR SpCell measObjectNR.

Inequality A3-1 (Entering condition)
Mn+Ofn+Ocn−Hys>Mp+Ofp+Ocp+Off
Inequality A3-2 (Leaving condition)
Mn+Ofn+Ocn+Hys<Mp+Ofp+Ocp+Off The variables in the formula are defined as follows:
Mn is the measurement result of the neighbouring cell, not taking into account any offsets.
Ofn is the measurement object specific offset of the reference signal of the neighbour cell (i.e. offsetMO as defined within measObjectNR corresponding to the neighbour cell).
Ocn is the cell specific offset of the neighbour cell (i.e. cellIndividualOffset as defined within measObjectNR corresponding to the frequency of the neighbour cell), and set to zero if not configured for the neighbour cell.
Mp is the measurement result of the SpCell, not taking into account any offsets.
Ofp is the measurement object specific offset of the SpCell (i.e. offsetMO as defined within measObjectNR corresponding to the SpCell).
Ocp is the cell specific offset of the SpCell (i.e. cellIndividualOffset as defined within measObjectNR corresponding to the SpCell), and is set to zero if not configured for the SpCell.
Hys is the hysteresis parameter for this event (i.e. hysteresis as defined within reportConfigNR for this event).
Off is the offset parameter for this event (i.e. a3-Offset as defined within reportConfigNR for this event).
Mn, Mp are expressed in dBm in case of RSRP, or in dB in case of RSRQ and RS-SINR.
Ofn, Ocn, Ofp, Ocp, Hys, Off are expressed in dB.

NOTE 2: The definition of Event A3 also applies to CondEvent A3.

5.5.4.5 Event A4 (Neighbour becomes better than threshold)

The UE shall:
1> consider the entering condition for this event to be satisfied when condition A4-1, as specified below, is fulfilled;
1> consider the leaving condition for this event to be satisfied when condition A4-2, as specified below, is fulfilled.

Inequality A4-1 (Entering condition)
Mn+Ofn+Ocn−Hys>Thresh
Inequality A4-2 (Leaving condition)
Mn+Ofn+Ocn+Hys<Thresh The variables in the formula are defined as follows:
Mn is the measurement result of the neighbouring cell, not taking into account any offsets.
Ofn is the measurement object specific offset of the neighbour cell (i.e. offsetMO as defined within measObjectNR corresponding to the neighbour cell).
Ocn is the measurement object specific offset of the neighbour cell (i.e. cellIndividualOffset as defined within measObjectNR corresponding to the neighbour cell), and set to zero if not configured for the neighbour cell.
Hys is the hysteresis parameter for this event (i.e. hysteresis as defined within reportConfigNR for this event).
Thresh is the threshold parameter for this event (i.e. a4-Threshold as defined within reportConfigNR for this event).
Mn is expressed in dBm in case of RSRP, or in dB in case of RSRQ and RS-SINR.
Ofn, Ocn, Hys are expressed in dB.
Thresh is expressed in the same unit as Mn.

NOTE: The definition of Event A4 also applies to CondEvent A4.

5.5.4.6 Event A5 (SpCell becomes worse than threshold1 and neighbour becomes better than threshold2)

The UE shall:
1> consider the entering condition for this event to be satisfied when both condition A5-1 and condition A5-2, as specified below, are fulfilled;
1> consider the leaving condition for this event to be satisfied when condition A5-3 or condition A5-4, i.e. at least one of the two, as specified below, is fulfilled;
1> use the SpCell for Mp.

NOTE 1: The parameters of the reference signal(s) of the cell(s) that triggers the event are indicated in the measObjectNR associated to the event which may be different from the measObjectNR of the NR SpCell.
Inequality A5-1 (Entering condition 1)
Mp+Hys<Thresh1
Inequality A5-2 (Entering condition 2)
Mn+Ofn+Ocn−Hys>Thresh2
Inequality A5-3 (Leaving condition 1)
Mp−Hys>Thresh1
Inequality A5-4 (Leaving condition 2)
Mn+Ofn+Ocn+Hys<Thresh2
The variables in the formula are defined as follows:
  Mp is the measurement result of the NR SpCell, not taking into account any offsets.
  Mn is the measurement result of the neighbouring cell, not taking into account any offsets.
  Ofn is the measurement object specific offset of the neighbour cell (i.e. offsetMO as defined within measObjectNR corresponding to the neighbour cell).
  Ocn is the cell specific offset of the neighbour cell (i.e. cellIndividualOffset as defined within measObjectNR corresponding to the neighbour cell), and set to zero if not configured for the neighbour cell.
  Hys is the hysteresis parameter for this event (i.e. hysteresis as defined within reportConfigNR for this event).
  Thresh1 is the threshold parameter for this event (i.e. a5-Threshold1 as defined within reportConfigNR for this event).
  Thresh2 is the threshold parameter for this event (i.e. a5-Threshold2 as defined within reportConfigNR for this event).
  Mn, Mp are expressed in dBm in case of RSRP, or in dB in case of RSRQ and RS-SINR.
  Ofn, Ocn, Hys are expressed in dB.
  Thresh1 is expressed in the same unit as Mp.
  Thresh2 is expressed in the same unit as Mn.
. . .

PDSCH-Config

The PDSCH-Config IE is used to configure the UE specific PDSCH parameters . . .

PDSCH-Config Information Element

```
PDSCH-Config ::=                              SEQUENCE {
    dataScramblingIdentityPDSCH                   INTEGER (0..1023)
    OPTIONAL, -- Need S
    dmrs-DownlinkForPDSCH-MappingTypeA            SetupRelease { DMRS-DownlinkConfig }
    OPTIONAL, -- Need M
    dmrs-DownlinkForPDSCH-MappingTypeB            SetupRelease { DMRS-DownlinkConfig }
    OPTIONAL, -- Need M
    tci-StatesToAddModList                        SEQUENCE (SIZE (1..maxNrofTCI-States)) OF TCI-State
    OPTIONAL, -- Need N
    tci-StatesToReleaseList                       SEQUENCE (SIZE (1..maxNrofTCI-States)) OF TCI-StateId
    OPTIONAL, -- Need N
...
``` tci-StatesToAddModList
A list of Transmission Configuration Indicator (TCI) states indicating a transmission configuration which includes QCL-relationships between the DL RSs in one RS set and the PDSCH DMRS ports (see TS 38.214 [19], clause 5.1.5). If unifiedTCI-State Type is configured for the serving cell, no element in this list is configured.

ControlResourceSet

The IE ControlResourceSet is used to configure a time/frequency control resource set (CORESET) in which to search for downlink control information (see TS 38.213 [13], clause 10.1). For the UE not supporting multiple CORESET in FR1, in order to receive MBS multicast in CFR within the UE's active BWP, if a CORESET is not configured within the PDCCH-ConfigMulticast, the CORESET other than CORESET #0 configured within the UE's active BWP for scheduling unicast can be used for scheduling MBS multicast, and the CORESET is expected to be included completely within the CFR and the parameters configured in the CORESET are expected to be supported by the UE for MBS multicast.

ControlResourceSet Information Element

```
ControlResourceSet ::=                    SEQUENCE {
    controlResourceSetId                      ControlResourceSetId,
    frequencyDomainResources                  BIT STRING (SIZE (45)),
    duration                                  INTEGER (1..maxCoReSetDuration),
    cce-REG-MappingType                       CHOICE {
        interleaved                               SEQUENCE {
            reg-BundleSize                            ENUMERATED {n2, n3, n6},
            interleaverSize                           ENUMERATED {n2, n3, n6},
            shiftIndex                                INTEGER (0..maxNrofPhysicalResourceBlocks-1)
```

```
       OPTIONAL -- Need S
           },
         nonInterleaved                  NULL
       },
       precoderGranularity         ENUMERATED {sameAsREG-bundle, allContiguousRBs},
       tci-StatesPDCCH-ToAddList   SEQUENCE(SIZE (1..maxNrofTCI-StatesPDCCH)) OF TCI-StateId
   OPTIONAL, -- Cond NotSIB-initialBWP
       tci-StatesPDCCH-ToReleaseList   SEQUENCE(SIZE (1..maxNrofTCI-StatesPDCCH) OF TCI-StateId
   OPTIONAL, -- Cond NotSIB-initialBWP
       tci-Present InDCI               ENUMERATED {enabled}
   OPTIONAL, -- Need S
``` tci-StatesPDCCH-ToAddList
A subset of the TCI states defined in pdsch-Config, either with tci-States ToAddModList or dl-OrJointTCI-StateList, included in the BWP-DownlinkDedicated corresponding to the serving cell and to the DL BWP to which the ControlResourceSet belong to. They are used for providing QCL relationships between the DL RS(s) in one RS Set (TCI-State) and the PDCCH DMRS ports (see TS 38.213 [13], clause 6.). The network configures at most maxNrofTCI-StatesPDCCH entries. The QCL relationships defined herein do not apply to MBS broadcast.

BWP-UplinkDedicated

The IE BWP-UplinkDedicated is used to configure the dedicated (UE specific) parameters of an uplink BWP.

BWP-UplinkDedicated Information Element

```
BWP-UplinkDedicated ::=          SEQUENCE {
    pucch-Config                     SetupRelease { PUCCH-Config }
OPTIONAL, -- Need M
    pusch-Config                     SetupRelease { PUSCH-Config }
OPTIONAL, -- Need M
    configuredGrantConfig            SetupRelease { ConfiguredGrantConfig }
OPTIONAL, -- Need M
    srs-Config                       SetupRelease { SRS-Config }
OPTIONAL, -- Need M
    beamFailureRecoveryConfig        SetupRelease { BeamFailureRecoveryConfig }
OPTIONAL, -- Cond SpCellOnly
    ...,
    [[
    s1-PUCCH-Config-r16              SetupRelease { PUCCH-Config }
OPTIONAL, -- Need M
    cp-ExtensionC2-r16               INTEGER (1..28)
OPTIONAL, -- Need R
    cp-ExtensionC3-r16               INTEGER (1..28)
OPTIONAL, -- Need R
    useInterlacePUCCH-PUSCH-r16      ENUMERATED {enabled}
OPTIONAL, -- Need R
    pucch-ConfigurationList-r16      SetupRelease { PUCCH-ConfigurationList-r16 }
OPTIONAL, -- Need M
    lbt-FailureRecoveryConfig-r16    SetupRelease { LBT-FailureRecoveryConfig-r16 }
OPTIONAL, -- Need M
    configuredGrantConfigToAddModList-r16           ConfiguredGrantConfigToAddModList-r16
OPTIONAL, -- Need N
    configuredGrantConfigToReleaseList-r16          ConfiguredGrantConfigToReleaseList-r16
OPTIONAL, --Need N
    configuredGrantConfigType2DeactivationStateList-r16
ConfiguredGrantConfigType2DeactivationStateList-r16       OPTIONAL -- Need R
    ]],
    [[
    ul-TCI-StateList-r17             CHOICE {
        explicitlist                     SEQUENCE {
            ul-TCI-ToAddModList-r17             SEQUENCE (SIZE (1..maxUL-TCI-r17)) OF TCI-UL-State-r17    OPTIONAL, -- Need N
            ul-TCI-ToReleaseList-r17            SEQUENCE (SIZE (1..maxUL-TCI-r17)) OF TCI-UL-StateId-r17  OPTIONAL -- Need N
        },
        unifiedTCI-StateRef-r17          ServingCellAndBWP-Id-r17
    }
OPTIONAL, -- Need R
``` ul-TCI-StateList
Indicates the applicable UL TCI states for PUCCH, PUSCH and SRS.
ul-TCI-ToAddModList
Indicates a list of UL TCI states.
TCI-State
The IE TCI-State associates one or two DL reference signals with a corresponding quasi-colocation (QCL) type.

TCI-State Information Element

```
TCI-State ::=                   SEQUENCE {
    tci-StateId                 TCI-StateId,
    qcl-Type1                   QCL-Info,
    qcl-Type2                   QCL-Info
OPTIONAL, -- Need R
    ...,
    [[
    additionalPCI-r17           AdditionalPCIIndex-r17
OPTIONAL, -- Need R
    pathlossReferenceRS-Id-r17  PathlossReferenceRS-Id-r17
OPTIONAL, -- Cond JointTCI1
    ul-powerControl-r17         Uplink-powerControlId-r17
OPTIONAL -- Cond JointTCI
    ]]
}
QCL-Info ::=                    SEQUENCE {
    cell                        ServCellIndex
OPTIONAL, --Need R
    bwp-Id                      BWP-Id
OPTIONAL, -- Cond CSI-RS-Indicated
    referenceSignal             CHOICE {
        csi-rs                      NZP-CSI-RS-ResourceId,
        ssb                         SSB-Index
    },
    qcl-Type                    ENUMERATED {typeA, typeB, typeC, typeD},
    ...
}
```

QCL-Info Field Descriptions
bwp-Id
The DL BWP which the RS is located in. If the field is absent, the RS is located in the DL BWP in which the TCI-State is applied by the UE.
Cell
The UE's serving cell in which the referenceSignal is configured. If the field is absent, it applies to the serving cell in which the TCI-State is applied by the UE. The RS can be located on a serving cell other than the serving cell for which the TCI-State is applied by the UE only if the qcl-Type is configured as typeC or typeD. If the referenceSignal is set to csi-rs and unifiedTCI-StateType is configured, either both cell and bwp-Id are present or both cell and bwp-Id are absent. See TS 38.214 clause 5.1.5.
referenceSignal
Reference signal with which quasi-collocation information is provided as specified in TS 38.214 clause 5.1.5.
qcl-Type
QCL type as specified in TS 38.214 clause 5.1.5.

TCI-State Field Descriptions additionalPCI
Indicates the physical cell IDs (PCI) of the SSBs when referenceSignal is configured as SSB for both QCL-Type1 and QCL-Type2. In case the cell is present, the addition-alPCI refers to a PCI value configured in the list configured using additionalPCI-ToAddModList in the serving cell indicated by the field cell. Otherwise, it refers to a PCI value configured in a list additionalPCI-ToAddModList configured in the serving cell where the TCI-State is applied by the UE. When this field is present the cell for qcl-Type1 and qcl-Type2 is configured with same value, if present.
pathlossReferenceRS-Id
The ID of the reference signal (e.g. a CSI-RS or an SS block) used for PUSCH, PUCCH and SRS path loss estimation. This field refers to an element in the list configured using pathlossReferenceRSToAddModList in the serving cell and UL BWP where the TCI State is applied by the UE.
qcl-Type1, qcl-Type2
QCL information for the TCI state as specified in TS 38.214 clause 5.1.5.
tci-StateId
ID number of the TCI state.
ul-PowerControl
Configures power control parameters for PUCCH, PUSCH and SRS for this TCI state. The field is present here only if ul-powerControl is not configured in any BWP-Uplink-Dedicated of this serving cell. This field refers to an element in the list configured using uplink-PowerControlToAdd-ModList in the serving cell where the dl-OrJointTCI-State-ToAddModList is configured.
TCI-StateId
The IE TCI-StateId is used to identify one TCI-State configuration.
TCI-UL-State
The IE TCI-UL-State indicates the TCI state information for UL transmission.

```
TCI-UL-State-r17 ::=          SEQUENCE {
    tci-UL-StateId-r17            TCI-UL-StateId-r17,
    servingCellId-r17             ServCellIndex                    OPTIONAL,
 -- Need R
    bwp-Id-r17                    BWP-Id                           OPTIONAL,
 -- Cond CSI-RSorSRS-Indicated
    referenceSignal-r17           CHOICE {
        ssb-Index-r17                 SSB-Index,
        csi-RS-Index-r17              NZP-CSI-RS-ResourceId,
        srs-r17                       SRS-ResourceId
    },
    additionalPCI-r17             AdditionalPCIIndex-r17           OPTIONAL,
 -- Need R
    ul-powerControl-r17           Uplink-powerControlId-r17        OPTIONAL,
 -- Need R
    pathlossReferenceRS-Id-r17    PathlossReferenceRS-Id-r17       OPTIONAL,
 -- Cond Mandatory
    ...
}
```

TCI-UL-State Field Descriptions additionalPCI
Indicates the physical cell IDs (PCI) of the SSBs when referenceSignal is configured as SSB. In case the servingCellId is present, the additionalPCI refers to a PCI value configured in the list configured using additionalPCI-ToAddModList in the serving cell indicated by the field servingCellId. Otherwise, it refers to a PCI value configured in the list configured using additionalPCI-ToAddModList in the serving cell where the ul-TCI-StateList is applied by the UE.
bwp-Id
The DL BWP which the CSI-RS is located in or UL BWP where the SRS is located in.
servingCellId
The UE's serving cell in which the referenceSignal is configured. If the field is absent, it applies to the serving cell in which the TCI-UL-State is applied by the UE.
pathlossReferenceRS-Id
The ID of the reference Signal (e.g. a CSI-RS or a SS block) used for PUSCH, PUCCH and SRS path loss estimation. This field refers to an element in the list configured using pathlossReferenceRSToAddModList in the serving cell and UL BWP where the UL TCI State is applied by the UE.
ul-powerControl
Configures power control parameters for PUCCH, PUSCH and SRS for this TCI state. The field is present here only if ul-powerControl is not configured in any BWP-Uplink-Dedicated of this serving cell. This field refers to an element in the list configured using uplink-PowerControlToAddModList in the serving cell where the ul-TCI-ToAddModList is configured.
TCI-UL-StateId
The IE TCI-UL-StateId is used to identify one TCI-UL-State configuration.
6.3.2 Radio resource control information elements . . .
. . .
ReportConfigNR
The IE ReportConfigNR specifies criteria for triggering of an NR measurement reporting event or of a CHO, CPA or CPC event or of an L2 U2N relay measurement reporting event. For events labelled AN with N equal to 1, 2 and so on, measurement reporting events and CHO, CPA or CPC events are based on cell measurement results, which can either be derived based on SS/PBCH block or CSI-RS.
  Event A1: Serving becomes better than absolute threshold;
  Event A2: Serving becomes worse than absolute threshold;
  Event A3: Neighbour becomes amount of offset better than PCell/PSCell;
  Event A4: Neighbour becomes better than absolute threshold;
  Event A5: PCell/PSCell becomes worse than absolute threshold1 AND Neighbour/SCell becomes better than another absolute threshold2;
. . .

ReportConfigNR Information Element

```
ReportConfigNR ::=            SEQUENCE {
    reportType                    CHOICE {
        periodical                    PeriodicalReportConfig,
        eventTriggered                EventTriggerConfig,
        ...,
        reportCGI                     ReportCGI,
        reportSFTD                    ReportSFTD-NR,
        condTriggerConfig-r16         CondTriggerConfig-r16,
        cli-Periodical-r16            CLI-PeriodicalReportConfig-r16,
        cli-EventTriggered-r16        CLI-EventTriggerConfig-r16,
        rxTxPeriodical-r17            RxTxPeriodical-r17,
        reportOnScellActivation-r18   ReportOnScellActivation-r18
    }
}
...
EventTriggerConfig ::=        SEQUENCE {
    eventId                       CHOICE {
        eventA1                       SEQUENCE {
            a1-Threshold                  MeasTriggerQuantity,
            reportOnLeave                 BOOLEAN,
```

```
                hysteresis                      Hysteresis,
                timeToTrigger                   TimeToTrigger
            },
            eventA2                             SEQUENCE {
                a2-Threshold                    MeasTriggerQuantity,
                reportOnLeave                   BOOLEAN,
                hysteresis                      Hysteresis,
                timeToTrigger                   TimeToTrigger
            },
            eventA3                             SEQUENCE {
                a3-Offset                       MeasTriggerQuantityOffset,
                reportOnLeave                   BOOLEAN,
                hysteresis                      Hysteresis,
                timeToTrigger                   TimeToTrigger,
                useAllowedCellList              BOOLEAN
            },
            eventA4                             SEQUENCE {
                a4-Threshold                    MeasTriggerQuantity,
                reportOnLeave                   BOOLEAN,
                hysteresis                      Hysteresis,
                timeToTrigger                   TimeToTrigger,
                useAllowedCellList              BOOLEAN
            },
            eventA5                             SEQUENCE {
                a5-Threshold1                   MeasTriggerQuantity,
                a5-Threshold2                   MeasTriggerQuantity,
                reportOnLeave                   BOOLEAN,
                hysteresis                      Hysteresis,
                timeToTrigger                   TimeToTrigger,
                useAllowedCellList              BOOLEAN
            },
            eventA6                             SEQUENCE {
                a6-Offset                       MeasTriggerQuantityOffset,
                reportOnLeave                   BOOLEAN,
                hysteresis                      Hysteresis,
                timeToTrigger                   TimeToTrigger,
                useAllowedCellList              BOOLEAN
            },
            ...,
...
    },
    rsType                              NR-RS-Type,
    reportInterval                      ReportInterval,
    reportAmount                        ENUMERATED {r1, r2, r4, r8, r16, r32, r64, infinity},
    reportQuantityCell                  MeasReportQuantity,
    maxReportCells                      INTEGER (1..maxCellReport),
    reportQuantityRS-Indexes            MeasReportQuantity
OPTIONAL,     -- Need R
    maxNrofRS-IndexesToReport           INTEGER (1..maxNrofIndexesToReport)
OPTIONAL,     -- Need R
    includeBeamMeasurements             BOOLEAN,
    reportAddNeighMeas                  ENUMERATED {setup}
OPTIONAL,     -- Need R
    ...,
    [[
    measRSSI-Reportconfig-r16           MeasRSSI-ReportConfig-r16
OPTIONAL,     -- Need R
    useT312-r16                         BOOLEAN
OPTIONAL,     -- Need M
    includeCommonLocationInfo-r16       ENUMERATRED {true}
OPTIONAL,     -- Need R
    includeBT-Meas-r16                  SetupRelease {BT-NameList-r16}
OPTIONAL,     -- Need M
    includeWLAN-Meas-r16                SetupRelease {WLAN-NameList-r16}
OPTIONAL,     -- Need M
    includeSensor-Meas-r16              SetupRelease {Sensor-NameList-r16}
OPTIONAL,     -- Need M
    ]],
    [[
    coarseLocationRequest-r17           ENUMERATED {true}
OPTIONAL,     -- Need R
    reportQuantityRelay-r17             SL-MeasReportQuantity-r16
OPTIONAL,     -- Need R
    ]],
    [[
    numberOfTriggeringCells-r18         INTEGER (2..maxCellReport)
OPTIONAL,     -- Need R
    cellIndividualOffsetList-r18        SEQUENCE (SIZE (1..maxNrofCellMeas)) OF
CellIndividualOffsetList-r18 OPTIONAL, -- Need R
```

```
        eventX1-SD-Threshold1-r18              SL-MeasTriggerQuantity-r16
OPTIONAL,        -- Need S
        eventX2-SD-Threshold-r18               SL-MeasTriggerQuantity-r16
OPTIONAL,        -- Need S
-- Editor's Note: FFS if this is proper place for Event X1 thresolds.
     ]]
}
PeriodicalReportConfig ::=                SEQUENCE {
     rsType                                NR-RS-Type,
     reportInterval                        ReportInterval,
     reportAmount                          ENUMERATED {r1, r2, r4, r8, r16, r32, r64, infinity},
     reportQuantityCell                    MeasReportQuantity,
     maxReportCells                        INTEGER (1..maxCellReport),
     reportQuantityRS-Indexes              MeasReportQuantity
OPTIONAL,        -- Need R
     maxNrofRS-IndexesToReport             INTEGER (1..maxNrofIndexesToReport)
OPTIONAL,        -- Need R
     includeBeamMeasurements               BOOLEAN,
     useAllowedCellList                    BOOLEAN,
     ...,
     [[
     measRSSI-ReportConfig-r16             MeasRSSI-ReportConfig-r16
OPTIONAL,        -- Need R
     includeCommonLocationInfo-r16         ENUMERATED {true}
OPTIONAL,        -- Need R
     includeBT-Meas-r16                    SetupRelease {BT-NameList-r16}
OPTIONAL,        -- Need M
     includeWLAN-Meas-r16                  SetupRelease {WLAN-NameList-r16}
OPTIONAL,        -- Need M
     includeSensor-Meas-r16                SetupRelease {Sensor-NameList-r16}
OPTIONAL,        -- Need M
     ul-DelayValueConfig-r16               SetupRelease { UL-DelayValueConfig-r16 }
OPTIONAL,        -- Need M
     reportAddNeighMeas-r16                ENUMERATED {setup}
OPTIONAL         -- Need R
     ]],
     [[
     ul-ExcessDelayConfig-r17              SetupRelease { UL-ExcessDelayConfig-r17 }
OPTIONAL,        -- Need M
     coarseLocationRequest-r17             ENUMERATED {true}
OPTIONAL,        -- Need R
reportQuantityRelay-r17                   SL-MeasReportQuantity-r16
OPTIONAL         -- Need R
     ]]
}
NR-RS-Type ::=                            ENUMERATED {ssb, csi-rs}
MeasTriggerQuantity ::=                   CHOICE {
     rsrp                                  RSRP-Range,
     rsrq                                  RSRQ-Range,
     sinr                                  SINR-Range
}
MeasTriggerQuantityOffset ::=             CHOICE {
     rsrp                                  INTEGER (-30..30),
     rsrq                                  INTEGER (-30..30),
     sinr                                  INTEGER (-30..30)
}
MeasReportQuantity ::=                    SEQUENCE {
     rsrp                                  BOOLEAN,
     rsrq                                  BOOLEAN,
     sinr                                  BOOLEAN
}
MeasRSSI-ReportConfig-r16 ::=             SEQUENCE {
     channelOccupancyThreshold-r16         RSSI-Range-r16          OPTIONAL -- Need R
}
```

ReportConfigNR Field Descriptions reportType
Type of the configured measurement report. In MR-DC, network does not configure report of type reportCGI using SRB3. The condTriggerConfig is used for CHO, CPA or CPC configuration.

EventTriggerConfig Field Descriptions eventId
Choice of NR event triggered reporting criteria.
. . .
maxNrofRS-IndexesToReport
Max number of RS indexes to include in the measurement report for A1-A6 events.
maxReportCells
Max number of non-serving cells to include in the measurement report.
numberOfTriggeringCells
Indicates the number of cells detected that are required to fulfill an event for a measurement report to be triggered. This field is applicable only for the events concerning neighbor cells, i.e. eventA3, eventA4, eventA5, eventA3H1, eventA3H2, eventA4H1, eventA4H2, eventA5H1, eventA5H2.
. . .
reportAddNeighMeas
Indicates that the UE shall include the best neighbour cells per serving frequency.
reportAmount
Number of measurement reports applicable for eventTriggered as well as for periodical report types.
reportOnLeave
Indicates whether or not the UE shall initiate the measurement reporting procedure when the leaving condition is met for a cell in cells TriggeredList, as specified in 5.5.4.1.
Indicates whether or not the UE shall initiate the measurement reporting procedure when the leaving condition is met if configured in eventD1, eventD2, eventH1, eventH2 as specified in 5.5.4.1.
reportQuantityCell
The cell measurement quantities to be included in the measurement report.
reportQuantityRS-Indexes
Indicates which measurement information per RS index the UE shall include in the measurement report.
simulMultiTriggerSingleMeasReport
Indicates when multiple events with the same eventID satisfy the entering condition(s), whether to consider only the event with the smallest value between the altitude of the UE and the configured altitude threshold.
timeToTrigger
Time during which specific criteria for the event needs to be met in order to trigger a measurement report.
useAllowedCellList
Indicates whether only the cells included in the allow-list of the associated measObject are applicable as specified in 5.5.4.1.
. . .
Time To Trigger
The IE TimeToTrigger specifies the value range used for time to trigger parameter, which concerns the time during which specific criteria for the event needs to be met in order to trigger a measurement report. Value ms0 corresponds to 0 ms and behaviour as specified in 7.1.2 applies, value ms40 corresponds to 40 ms, and so on.

Figure 7:
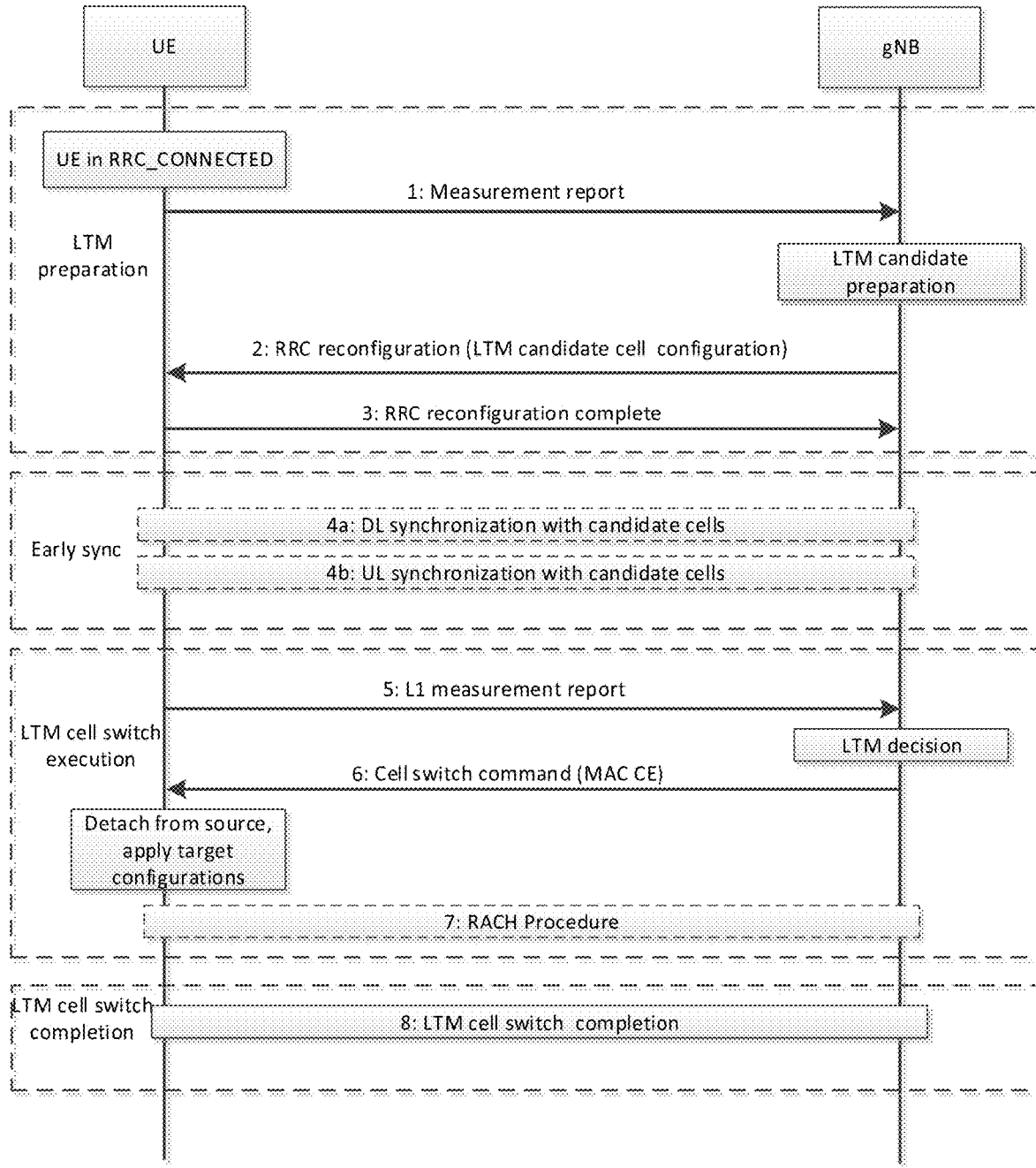
FIG. 7 is a reproduction of FIG. 9.2.3.5.2-1. Signaling procedure for LTM, from Draft 38.300 v 18.0.0.

In [5] Draft 38.300 v 18.0.0, L1/L2 mobility (LTM) is introduced:
9.2.3.5 L1/L2-Triggered Mobility
9.2.3.5.1 General
LTM is a procedure in which a gNB receives L1 measurement report(s) from a UE, and on their basis the gNB changes UE serving cell by a cell switch command signalled via a MAC CE. The cell switch command indicates an LTM candidate configuration that the gNB previously prepared and provided to the UE through RRC signalling. Then the UE switches to the target configuration according to the cell switch command. The LTM procedure can be used to reduce the mobility latency as described in Annex G.
When configured by the network, it is possible to activate TCI states of one or multiple cells that are different from the current serving cell. For instance, the TCI states of the LTM candidate cells can be activated in advance before any of those cells become the serving cell. This allows the UE to be DL synchronized with those cells, thereby facilitating a faster cell switch to one of those cells when cell switch is triggered.
. . .
LTM supports both intra-gNB-DU and intra-gNB-CU inter-gNB-DU mobility. LTM supports both intra-frequency and inter-frequency mobility, including mobility to inter-frequency cell that is not a current serving cell. LTM is supported only for licensed spectrum. The following scenarios are supported:
 PCell change in non-CA scenario and non-DC scenario;
 PCell and SCell(s) change in CA scenario;
 Dual connectivity scenario, PCell and MCG SCell(s) change and intra-SN PSCell and SCG SCell(s) change without MN involvement. LTM for simultaneous PCell and PSCell change is not supported.
While the UE has stored LTM candidate configurations the UE can also execute any L3 handover command sent by the network.
9.2.3.5.2 C-Plane Handling
Cell switch command is conveyed in a MAC CE, which contains the necessary information to perform the LTM cell switch.
The overall procedure for LTM is shown in FIG. 9.2.3.5.2-1 below. Subsequent LTM is done by repeating the early synchronization, LTM cell switch execution, and LTM cell switch completion steps without releasing other LTM candidate configurations after each LTM cell switch completion. The general procedure over the air interface is applicable to SCG LTM. Further details of SCG LTM can be found in TS 37.340 [21].
FIG. 7 is a reproduction of FIG. 9.2.3.5.2-1. Signaling procedure for LTM, from Draft 38.300 v 18.0.0.
The procedure for LTM is as follows:
 1. The UE sends a MeasurementReport message to the gNB. The gNB decides to configure LTM and initiates LTM preparation.
 2. The gNB transmits an RRCReconfiguration message to the UE including the LTM candidate configurations.
 3. The UE stores the LTM candidate configurations and transmits an RRCReconfiguration Complete message to the gNB.
 4a. The UE performs DL synchronization with the candidate cell(s) before receiving the cell switch command.
 4b. When UE-based TA measurement is configured, UE acquires the TA value(s) of the candidate cell(s) by measurement. UE performs early TA acquisition with the candidate cell(s) as requested by the network before receiving the cell switch command as specified in clause 9.2.6. This is done via CFRA triggered by a PDCCH order from the source cell, following which the UE sends preamble towards the indicated candidate cell. In order to minimize the data interruption of the source cell due to CFRA towards the candidate cell(s), the UE doesn't receive random access response from the network for the purpose of TA value acquisition and the TA value of the candidate cell is indicated in the cell switch command. The UE doesn't maintain the TA timer for the candidate cell and relies on network implementation to guarantee the TA validity.

5. The UE performs L1 measurements on the configured candidate cell(s) and transmits L1 measurement reports to the gNB. L1 measurement should be performed as long as RRC reconfiguration (step 2) is applicable.
6. The gNB decides to execute cell switch to a target cell and transmits a MAC CE triggering cell switch by including the candidate configuration index of the target cell. The UE switches to the target cell and applies the configuration indicated by candidate configuration index.
7. The UE performs the random access procedure towards the target cell, if UE does not have valid TA of the target cell as specified in clause 6.1.3.xy of TS 38.321 [6].
8. The UE completes the LTM cell switch procedure by sending RRCReconfigurationComplete message to target cell. If the UE has performed a RA procedure in step 7 the UE considers that LTM cell switch execution is successfully completed when the random access procedure is successfully completed. For RACH-less LTM, the UE considers that LTM cell switch execution is successfully completed when the UE determines that the network has successfully received its first UL data.

The steps 4-8 can be performed multiple times for subsequent LTM using the LTM candidate configuration(s) provided in step 2.

9.2.3.5.3 U-Plane Handling

After receiving an LTM cell switch command MAC CE, the UE performs MAC reset. Whether the UE performs RLC re-establishment and PDCP data recovery during cell switch is explicitly controlled by the network through RRC signalling.

In WID for mobility enhancement phase 4 (e.g., [6] RP-234036 New WID), objective regarding measurement reporting for LTM is introduced:

3 Justification

Layer 2 mobility (LTM) was introduced in Rel-18 and can offer improvements in handover latency and interruption time compared to Layer 3 based mobility. However, LTM as introduced in Rel-18 also has a number of limitations compared to Layer 3 mobility. This Rel-19 work item aims to remove a number of these limitations.

. . .

Layer 3 mobility uses layer 3 measurement reporting which supports UE evaluated events for triggering of measurement reports and reduces signalling overhead compared to periodic measurement reporting. Such event triggering is not supported by the L1 measurements that are used for LTM mobility.

. . .

4 Objective
4.1 Objective of SI or Core part WI or Testing part WI

. . .

Measurements related enhancements for purpose of supporting LTM: [RAN2, RAN1]

Measurement related enhancements are applicable to Intra-CU MCG/SCG LTM and Inter-CU MCG/SCG LTM Specify necessary components to support event triggered L1 measurement reporting [RAN2, RAN1]

RAN1 and RAN2 to progress independently on the event triggered measurements objectives of their respective MIMO and Mobility enhancement WIs. Review progress at RAN #105 to see if any modification of objectives is required to avoid/manage any overlap in the work Specify support for CSI-RS measurements for LTM procedures and enable CSI-RS based beam management, and/or other necessary physical layer operations on candidate cells before LTM [RAN1]

In Rel-18 3GPP specification (e.g., [7] 3GPP 38.321 v18.1.0), Cell-level energy saving and TCI state activation/deactivation for LTM candidate cells are introduced:

5.34 Cell-Level Energy Saving
5.34.1 General

Each Serving Cell may be configured by RRC with a periodic cell DTX pattern (i.e., Active and Non-Active Periods). The cell DTX operation affects UE's monitoring activity of PDCCH and configured downlink assignments in RRC_CONNECTED. For all activated Serving Cells with cell DTX configured and activated, the MAC entity may monitor PDCCH and configured downlink assignments using the cell DTX operation specified in clause 5.34.2.

Each Serving Cell may be configured by RRC with a periodic cell DRX pattern (i.e., Active and Non-Active Periods). The cell DRX operation controls Scheduling Request and configured uplink grant transmission activity in RRC_CONNECTED. For all activated Serving Cells with cell DRX configured and activated, the MAC entity may transmit configured uplink grant transmissions and Scheduling Request using the cell DRX operation specified in clause 5.34.3.

RRC controls cell DTX and cell DRX operation by configuring the following parameters in cellDTXDRX-Config per Serving Cell:

cellDTXDRXconfigType: defines whether only cell DTX is configured, only cell DRX is configured, or both are configured;

celldtxdrx-onDurationTimer: the active duration at the beginning of a cell DTX/DRX cycle;

celldtxdrx-StartOffset: defines the subframe where the cell DTX/DRX cycle starts;

celldtxdrx-SlotOffset: the delay before starting the celldtxdrx-onDurationTimer;

celldtxdrx-Cycle: the cell DTX/DRX cycle period.

cellDTXDRXactivationStatus: the initial activation status of cell DTX and cell DRX operation.

5.34.2 Cell Discontinuous Transmission

Cell DTX is configured if cellDTXDRXconfigType is set to dtx or dtxdrx. Cell DTX operation is activated and deactivated for each Serving Cell by:

receiving a cell DTX indication from lower layers indicating activation or deactivation of cell DTX operation, as specified in TS 38.213 [6];

configuring CellDTXDRX-Config by upper layers: if cell DTX is configured and cellDTXDRXactivationStatus is set to activated, cell DTX operation is activated upon cell DTX configuration; if cell DTX is configured and cellDTXDRXactivationStatus is set to deactivated, cell DTX operation is deactivated upon cell DTX configuration; if CellDTXDRX-Config is released, cell DTX operation is deactivated and all the corresponding configurations are released.

When cell DTX is configured and activated for a Serving Cell, the cell DTX Active Period includes the time while:
  celldtxdrx-onDurationTimer is running for the associated Serving Cell.

. . .

5.34.3 Cell Discontinuous Reception

Cell DRX is configured if cellDTXDRXconfigType is set to drx or dtxdrx. Cell DRX operation is activated and deactivated for each Serving Cell by:
  receiving a cell DRX indication from lower layers indicating activation or deactivation of cell DRX operation, as specified in TS 38.213 [6];
  configuring CellDTXDRX-Config by upper layers: if cell DRX is configured and cellDTXDRXactivationStatus is set to activated, cell DRX operation is activated upon cell DRX configuration; if cell DRX is configured and cellDTXDRXactivationStatus is set to deactivated, cell DRX operation is deactivated upon cell DRX configuration; if CellDTXDRX-Config is released, cell DRX operation is deactivated and all the corresponding configurations are released.

. . .

5.18.36 Candidate Cell TCI States Activation/Deactivation

The network may activate and deactivate the TCI states of LTM candidate cell(s) configured in CandidateTCI-State and CandidateTCI-UL-State by sending the Candidate Cell TCI States Activation/Deactivation MAC CE described in clause 6.1.3.76. The network deactivates the TCI state(s) for one LTM candidate cell by not including the corresponding TCI state ID field(s) in the Candidate Cell TCI States Activation/Deactivation MAC CE.

The MAC entity shall:
  1> if the MAC entity receives a Candidate Cell TCI States Activation/Deactivation MAC CE on a Serving Cell:
    2> indicate to lower layers the information regarding the Candidate Cell TCI States Activation/Deactivation MAC CE.

6.1.3.75 LTM Cell Switch Command MAC CE

The LTM Cell Switch Command MAC CE is identified by MAC subheader with eLCID as specified in Table 6.2.1-1b. It has a variable size with following fields (FIG. 6.1.3.75-1):
  Target Configuration ID: This field indicates the index of candidate target configuration to apply for LTM cell switch, corresponding to ltm-CandidateId minus 1 as specified in TS 38.331 [5]. The length of the field is 3 bits;
  Timing Advance Command: This field indicates whether the TA is valid for the LTM target cell (i.e. the SpCell corresponding to the target configuration indicated by Target Configuration ID field). If the value of this field is set to FFF, this field indicates that no valid timing adjustment is available for the PTAG of the LTM target cell; otherwise, this field indicates the index value TA used to control the amount of timing adjustment that the MAC entity has to apply in TS 38.213 [6], and that the UE can skip the Random Access procedure for this LTM cell switch. The length of the field is 12 bits. If tag-Id-ptr is configured for the TCI state indicated by the TCI state ID field in the LTM target cell and tag-Id-ptr is set to value n1, this field indicates the TA for the TAG indicated by the tag2-Id of the LTM target cell; otherwise, this field indicates the TA for the TAG indicated by the tag-id of the LTM target cell;
  TCI state ID: This field indicates and activates the TCI state for the LTM target cell (i.e. the SpCell of the target configuration indicated by the Target Configuration ID field). The TCI state is identified by TCI-StateId in ltm-DL-OrJointTCI-StateToAddModList as specified in TS 38.331 [5]. If the value of unifiedTCI-StateType in the configuration indicated by Target Configuration ID field is joint, this field is for joint TCI state, otherwise, this field is for downlink TCI state. The length of the field is 7 bits;
  UL TCI state ID: This field indicates and activates the uplink TCI state for the LTM target cell (i.e. the SpCell of the target configuration indicated by the Target Configuration ID field). The most significant bits of UL TCI state ID are considered as reserved bits and the remainder 6 bits indicate the TCI-UL-StateId in ltm-UL-TCI-StatesToAddModList as specified in TS 38.331 [5]. This field is included if the value of unifiedTCI-StateType in the configuration indicated by Target Configuration ID field is separate. The length of the field is 8 bits;
  C: This field indicates the presence of the contention-free Random Access Resources fields. If the value of this field is set to 1, the following fields are present: including Random Access Preamble index field, S/U field, SS/PBCH index field, PRACH Mask index field and Repetition number field. If the value of this field is set to 0, Random Access Preamble index field, SS/PBCH index field, PRACH Mask index field and Repetition number field are absent, and S/U field is considered as Reserved field.
  S/U: This field indicates which UL carrier to transmit the PRACH of the contention-free Random Access Resources. If the value of this field is set to 1, SUL is used; otherwise, NUL is used. The length of the field is 1 bit;
  Random Access Preamble index: This field indicates the Random Access Preamble index of the contention-free Random Access Resources. This field should not be set to 0b000000. The length of the field is 6 bits;
  SS/PBCH index: This field indicates the SS/PBCH that shall be used to determine the RACH occasion for the PRACH transmission of the contention-free Random Access Resources. The length of the field is 6 bits;
  PRACH Mask index: This field indicates the RACH occasion(s) associated with the SS/PBCH indicated by 'SS/PBCH index' for the PRACH transmission of the contention-free Random Access Resources. It indicates a subset of RACH occasion(s) from the rach-ConfigDedicated for the UL carrier (indicated by S/U field), (if provided, otherwise it indicates a subset of RACH occasion(s) from the rach-ConfigCommon for the UL carrier (indicated by S/U field) in the UL BWP configuration of firstActiveUplinkBWP-Id as specified in TS 38.331 [5]. The length of the field is 4 bits.

Figure 8:
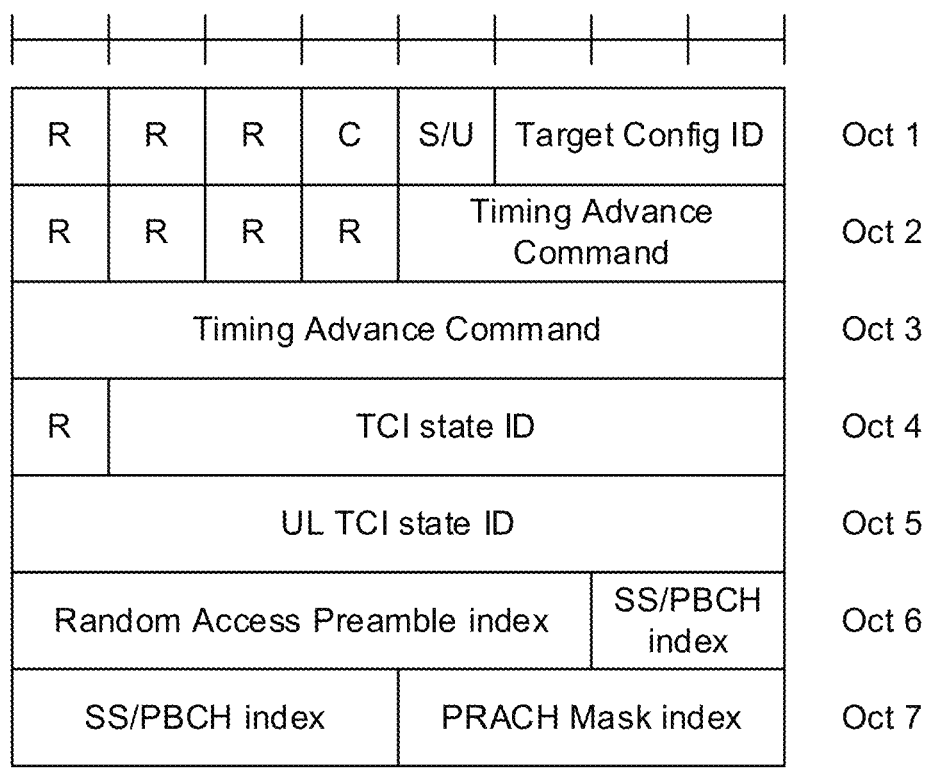
FIG. 8 is a reproduction of FIG. 6.1.3.75-1: LTM Cell Switch Command MAC CE, from 3GPP 38.321 v18.1.0.

FIG. 8 is a reproduction of FIG. 6.1.3.75-1: LTM Cell Switch Command MAC CE, from 3GPP 38.321 v18.1.0.

6.1.3.76 Candidate Cell TCI States Activation/Deactivation MAC CE

The Candidate Cell TCI States Activation/Deactivation MAC CE is identified by a MAC subheader with eLCID as specified in Table 6.2.1-1b. It has a variable size consisting of following fields:
  Candidate Cell ID: This field indicates the identity of an LTM candidate cell for which the MAC CE applies, corresponding to the ltm-CandidateId minus 1 as specified in TS 38.331 [5]. The length of the field is 3 bits;

$P_i$: This field indicates whether each TCI codepoint has multiple TCI states or a single TCI state. If the $P_i$ field is set to 1, the $i^{th}$ TCI codepoint includes the DL TCI state and the UL TCI state. If the $P_i$ field is set to 0, the $i^{th}$ TCI codepoint includes only the DL/joint TCI state or the UL TCI state. The codepoint to which a TCI state is mapped is determined by its ordinal position among all the TCI state ID fields;

D/U: This field indicates whether the TCI state ID in the same octet is for a joint/downlink or an uplink TCI state. If this field is set to 1, the TCI state ID in the same octet is for joint/downlink TCI state. If this field is set to 0, the TCI state ID in the same octet is for uplink TCI state;

TCI state ID: This field indicates the TCI state identified by TCI-StateId in ltm-DL-OrJointTCI-StateToAdd-ModList or TCI-UL-StateId in ltm-UL-TCI-States-ToAddModList as specified in TS 38.331 [5]. If D/U is set to 1, 7-bits length TCI state ID i.e. TCI-StateId as specified in TS 38.331 [5] is used. If D/U is set to 0, the most significant bit of TCI state ID is considered as the reserved bit and remaining 6 bits indicate the TCI-UL-StateId as specified in TS 38.331 [5]. The maximum number of activated TCI states is 16;

FIG. 9 is a reproduction of FIG. 6.1.3.76-1: Candidate Cell TCI state activation/deactivation MAC CE, rom 3GPP 38.321 v18.1.0.

In [8] Chair notes RAN1 #116 eom0, the following is provided:

Agreement

On UE-initiated/event-driven beam report, at least of following aspects should be included:
Trigger-event detection for beam reporting by UE
UE monitors RS to assess if a beam-reporting trigger condition has been met
FFS: Trigger condition for declaring beam-reporting event.
Beam-report transmission by UE
Signaling contents in the beam report
Down-selection one or more options (strive for one) between the following options as signaling medium/container for beam report transmission
MAC-CE
UCI
Others are not precluded.
On UE-initiated/event-driven beam report, the following aspects may be included:
UE requesting UL resource(s) for the beam report
UE notifying transmission of beam report
gNB preconfigured resources Agreement On UE-initiated/event-driven beam reporting, regarding trigger-event detection for beam reporting, RAN1 further study at least the following aspects: quality metrics, event-definition and threshold.
Further study trigger events, including the following example as a starting point.
Event-1: Quality of the current beam is worse than a certain threshold.
Event-2: Quality of at least one new beam, such as L1-RSRP, becomes a threshold value better than the current beam.
Event-3: Quality of a new beam is better than a certain threshold.
Event-4: Quality of the current beam is worse than a threshold 1, and quality of at least one new beam is better than a threshold 2.
Others are not precluded . . .

Agreement

On UE-initiated/event-driven beam reporting, at least support L1-RSRP as a measurement quantity on SSB for intra-cell and inter-cell, and periodic CSI-RS for beam management
Notes: measurement results may be contained in the beam report and/or used as quality metric(s) to initiate/trigger the reporting.

Agreement

On UE-initiated/event-driven beam reporting, regarding signaling content(s), at least support DL RS resource indicator and L1-RSRP In [9] Chair's notes RAN1 #116bis eom0, the following is provided:

Agreement

On beam report transmission procedure for UE-initiated/event-driven beam reporting, following modes are supported:
Mode A (dynamically scheduling UCI by gNB):
Step 1: UE transmits a first PUCCH (one-bit/multi-bit) to request a resource for a second UL channel to carry beam report
FFS: Request format, e.g., SR or a new UCI type.
Step 2: UE detects the DCI format to indicate a resource for a second UL channel to carry beam report.
Step 3: Beam report is transmitted in second UL channel.
FFS: Details on the second UL channel, e.g., whether the second UL channel is PUCCH, PUSCH or both
This mode is basic UE capability (i.e. all UE supporting UE-initiated/event-driven beam reporting should support this feature).
No new DCI format is introduced.
Mode B (UCI in pre-configured resource(s) for second UL channel):
Step 1: UE transmits a first PUCCH (one-bit/multi-bit) notifying a second UL channel to carry beam report
FFS: Notification format, e.g., SR or a new UCI type.
Step 2: UE transmits the beam report in the second UL channel.
FFS: Details on the second UL channel, e.g., whether the second UL channel is PUCCH, PUSCH or both
The notification in Step1 is in a separate reporting instance from the beam report in Step 2.
FFS: Whether UE receives acknowledge information with response to each step for all modes For above procedures, cross-CC beam reporting is supported for both modes.

Agreement

On UE-initiated/event-driven beam reporting, regarding trigger-event detection for beam reporting, at least support Event-2: Quality of at least one new beam, such as L1-RSRP, becomes a threshold value better than the current beam.
At least L1-RSRP is supported as quality metrics used for Event-2
FFS: Whether the network controls how the L1-RSRP is used to determine the triggering event
FFS: How the L1-RSRP is used to determine the triggering event (e.g. timer, counter, filter coefficient).

Regarding RS measurement for the new beam for Event-2, down-select one or more of the following:
  Option-3a (explicit manner): The RS(s) for new beam(s) are explicitly configured by RRC (e.g., reusing legacy configuration of RS measurement or in TCI-State) or MAC-CE
  Option-3b (implicit manner): The RS(s) for new beam(s) are implicitly derived from QCL RS(s) of activated TCI state(s).
  Option-3c (implicit manner): The RS(s) for new beam(s) are implicitly derived from QCL RS(s) of configured TCI state(s).
Agreement
On UE-initiated/event-driven beam reporting, regarding Event-2, the threshold value is RRC configured
Agreement
On UE-initiated/event-driven beam reporting, regarding Event-2, 'current beam' is a beam corresponding to the indicated TCI state.
  Regarding RS measurement for the current beam for Event-2, Option-2a is supported:
    Option-2a (implicit manner): The RS for current beam is implicitly derived from a QCL RS of indicated TCI state.
      FFS: The RS for current beam can be either the QCL RS in the indicated TCI state or the SSB which is QCLed with the QCL RS in the indicated TCI state.
    FFS: Option-2c (explicit manner): The RS for current beam is explicitly configured by RRC or MAC-CE. Note: SSB or CSI-RS can be configured
Agreement
On UE-initiated/event-driven beam reporting, further study the following trigger events:
  Event-1: Quality of the current beam is worse than a certain threshold.
  Event-3: Quality of a new beam is better than a certain threshold.
  Event-4: Quality of the current beam is worse than a threshold 1, and quality of at least one new beam is better than a threshold 2.
  Event-5: Absolute value of the difference between the quality of the current beam and the quality of at least one new beam is lower than a threshold.
  Event-6: When the current beam is not in the best K>1 beams (out of configured beams for measurement and reporting).
  Event-7a: Quality of at least one new beam, such as L1-RSRP, becomes a threshold value better than the RS derived from the activated TCI state with the worst quality.
  Event-7b: Quality of at least one new beam, such as L1-RSRP, becomes a threshold value better than the RS derived from the activated TCI state with the best quality.
  Event-8: Quality of M>1 new beams, such as L1-RSRP, become a threshold value better than the current beam.
  Event-9: Quality of at least one new beam, such as L1-RSRP, becomes a threshold value better than the configured reference RS (can be SSB or CSI-RS).
Agreement
On UE-initiated/event-driven beam reporting, regarding UL signaling content(s) of L1-RSRP report depending on Event-2, in a report instance, the following options are provided for down-selection (other options are not precluded) in RAN1 #117

Option-1 (variable size): N beam(s) are reported in the report instance, where $N \in \{1, 2, \ldots, N_{max}\}$.
  The N beam(s) should satisfy the condition of Event-2
  $N_{max}$ is configured by gNB.
  FFS: Whether the indication of payload size should be provided additionally.
Option-1a (variable size): N beam(s) are reported in the report instance, where $N \in \{1, 2, \ldots, N_{max}\}$. At least one of N reported beam(s) should satisfy the condition of Event-2
  $N_{max}$ is configured by gNB
  FFS: Whether the indication of payload size should be provided additionally.
  FFS: Details on how value of N is determined by the UE
Option-1b: N beam(s) are reported in the report instance, where $N \in \{1, 2, \ldots, N_{max}\}$.
  The N beam(s) should satisfy the condition of Event-2
  $N_{max}$ is configured by gNB
  Payload size does not vary as a function of N
  FFS: Zero-padding can be provided if N is less than $N_{max}$.
Option-2: Only N=1 beam is reported in the report instance
  The reported beam should satisfy the condition of Event-2
Option-3: N≥1 beam(s) are reported in the report instance, At least one of N reported beam(s) should satisfy the condition of Event-2.
  N is configured by gNB
Other options are not precluded.
FFS: Whether the measurement results for current beam is always reported or can be enabled by RRC.
FFS: When current beam is reported, whether the current beam is counted in the N reported beams.
The selected option shall satisfy Event-2.
In 3GPP TS 38.214 V17.3.0 (2022 September), TCI state related paragraph is quoted below:
5.1.5 Antenna ports quasi co-location
The UE can be configured with a list of up to M TCI-State configurations within the higher layer parameter PDSCH-Config to decode PDSCH according to a detected PDCCH with DCI intended for the UE and the given serving cell, where M depends on the UE capability maxNumberConfiguredTCIstatesPerCC. Each TCI-State contains parameters for configuring a quasi co-location relationship between one or two downlink reference signals and the DM-RS ports of the PDSCH, the DM-RS port of PDCCH or the CSI-RS port(s) of a CSI-RS resource. The quasi co-location relationship is configured by the higher layer parameter qcl-Type1 for the first DL RS, and qcl-Type2 for the second DL RS (if configured). For the case of two DL RSs, the QCL types shall not be the same, regardless of whether the references are to the same DL RS or different DL RSs. The quasi co-location types corresponding to each DL RS are given by the higher layer parameter qcl-Type in QCL-Info and may take one of the following values:
  'typeA': {Doppler shift, Doppler spread, average delay, delay spread}
  'typeB': {Doppler shift, Doppler spread}
  'typeC': {Doppler shift, average delay}
  'typeD': {Spatial Rx parameter}
The UE can be configured with a list of up to 128 TCIState configurations, within the higher layer parameter dl-OrJoint-TCIState List in PDSCH-Config for providing a reference signal for the quasi co-location for DM-RS of PDSCH and DM-RS of PDCCH in a CC, for CSI-RS, and to provide a reference, if applicable, for determining UL TX spatial filter for dynamic-grant and configured-grant based PUSCH and PUCCH resource in a CC, and SRS.

If the TCIState or UL-TCIState configurations are absent in a BWP of the CC, the UE can apply the TCIState or UL-TCIState configurations from a reference BWP of a reference CC. The UE is not expected to be configured with TCI-State, SpatialRelationInfo or PUCCH-SpatialRelationInfo, except SpatialRelationInfoPos in a CC in a band, if the UE is configured with dl-OrJoint-TCIStateList or UL-TCIState in any CC in the same band. The UE can assume that when the UE is configured with TCI-State in any CC in the CC list configured by simultaneousTCI-UpdateList1-r16, simultaneousTCI-UpdateList2-r16, simultaneousSpatial-UpdatedList1-r16, or simultaneousSpatial-UpdatedList2-r16, the UE is not configured with dl-OrJoint-TCIStateList or UL-TCIState in any CC within the same band in the CC list.

The UE receives an activation command, as described in clause 6.1.3.14 of [10, TS 38.321] or 6.1.3.47 of [10, TS 38.321], used to map up to 8 TCI states and/or pairs of TCI states, with one TCI state for DL channels/signals and/or one TCI state for UL channels/signals to the codepoints of the DCI field 'Transmission Configuration Indication' for one or for a set of CCs/DL BWPs, and if applicable, for one or for a set of CCs/UL BWPs. When a set of TCI state IDs are activated for a set of CCs/DL BWPs and if applicable, for a set of CCs/UL BWPs, where the applicable list of CCs is determined by the indicated CC in the activation command, the same set of TCI state IDs are applied for all DL and/or UL BWPs in the indicated CCs. If the activation command maps TCIState and/or UL-TCIState to only one TCI codepoint, the UE shall apply the indicated TCIState and/or UL-TCIState to one or to a set of CCs/DL BWPs, and if applicable, to one or to a set of CCs/UL BWPs once the indicated mapping for the one single TCI codepoint is applied as described in [11, TS 38.133].

When the bwp-id or cell for QCL-TypeA/D source RS in a QCL-Info of the TCI state is not configured, the UE assumes that QCL-TypeA/D source RS is configured in the CC/DL BWP where TCI state applies.

When tci-PresentInDCI is set as 'enabled' or tci-PresentDCI-1-2 is set for the CORESET, a UE configured with dl-OrJoint-TCIStateList with activated TCIState or UL-TCIState receives DCI format 1_1/1_2 providing indicated TCIState or UL-TCIState for a CC or all CCs in the same CC list configured by simultaneousTCI-UpdateList1-r17, simultaneousTCI-UpdateList2-r17, simultaneousTCI-UpdateList3-r17, simultaneousTCI-UpdateList4-r17. The DCI format 1_1/1_2 can be with or without, if applicable, DL assignment. If the DCI format 1_1/1_2/is without DL assignment, the UE can assume the following:
  CS-RNTI is used to scramble the CRC for the DCI
  The values of the following DCI fields are set as follows:
    RV=all '1's
    MCS=all '1's
    NDI=0
    Set to all '0's for FDRA Type 0, or all '1's for FDRA Type 1, or all '0's for dynamicSwitch (same as in Table 10.2-4 of [6, TS 38.213]).
  . . .

If a UE receives a higher layer configuration of dl-OrJoint-TCIStateList with a single TCIState, that can be used as an indicated TCI state, the UE obtains the QCL assumptions from the configured TCI state for DM-RS of PDSCH and DM-RS of PDCCH, and the CSI-RS applying the indicated TCI state.

If a UE receives a higher layer configuration of dl-OrJoint-TCIStateList with a single TCIState or a single UL-TCIState, that can be used as an indicated TCI state, the UE determines an UL TX spatial filter, if applicable, from the configured TCI state for dynamic-grant and configured-grant based PUSCH and PUCCH, and SRS applying the indicated TCI state.

When the UE would transmit a PUCCH with HARQ-ACK information or a PUSCH with HARQ-ACK information corresponding to the DCI carrying the TCI State indication and without DL assignment, or corresponding to the PDSCH scheduled by the DCI carrying the TCI State indication, and if the indicated TCI State is different from the previously indicated one, the indicated DLorJointTCIState or UL-TCIstate should be applied starting from the first slot that is at least beamAppTime symbols after the last symbol of the PUCCH or the PUSCH. The first slot and the beamAppTime symbols are both determined on the active BWP with the smallest SCS among the active BWP(s) of the carrier(s) applying the beam indication.

If a UE is configured with the higher layer parameter tci-PresentInDCI that is set as 'enabled' for the CORESET scheduling a PDSCH, the UE assumes that the TCI field is present in the DCI format 1_1 of the PDCCH transmitted on the CORESET. If a UE is configured with the higher layer parameter tci-PresentDCI-1-2 for the CORESET scheduling the PDSCH, the UE assumes that the TCI field with a DCI field size indicated by tci-PresentDCI-1-2 is present in the DCI format 1_2 of the PDCCH transmitted on the CORESET . . . .

5.1.6.1.2 CSI-RS for L1-RSRP and L1-SINR computation

If a UE is configured with a NZP-CSI-RS-ResourceSet configured with the higher layer parameter repetition set to 'on', the UE may assume that the CSI-RS resources, described in Clause 5.2.2.3.1, within the NZP-CSI-RS-ResourceSet are transmitted with the same downlink spatial domain transmission filter, where the CSI-RS resources in the NZP-CSI-RS-ResourceSet are transmitted in different OFDM symbols. If repetition is set to 'off', the UE shall not assume that the CSI-RS resources within the NZP-CSI-RS-ResourceSet are transmitted with the same downlink spatial domain transmission filter.

If the UE is configured with a CSI-ReportConfig with reportQuantity set to 'cri-RSRP', 'cri-SINR' or 'none' and if the CSI-ResourceConfig for channel measurement (higher layer parameter resourcesForChannelMeasurement) contains a NZP-CSI-RS-ResourceSet that is configured with the higher layer parameter repetition and without the higher layer parameter trs-Info, the UE can only be configured with the same number (1 or 2) of ports with the higher layer parameter nrofPorts for all CSI-RS resources within the set. If the UE is configured with the CSI-RS resource in the same OFDM symbol(s) as an SS/PBCH block, the UE may assume that the CSI-RS and the SS/PBCH block are quasi co-located with 'typeD' if 'typeD' is applicable. Furthermore, the UE shall not expect to be configured with the CSI-RS in PRBs that overlap with those of the SS/PBCH block, and the UE shall expect that the same subcarrier spacing is used for both the CSI-RS and the SS/PBCH block.

In 3GPP TS 38.213 V18.2.0 (2024 March), the following is provided:

11.2A Cancellation indication

If a UE is provided UplinkCancellation, the UE is provided, in one or more serving cells, search space sets for monitoring the first PDCCH candidate with a CCE aggregation level of $L_{CI}$ CCEs of each search space set for detection of a DCI format 2_4 [5, TS 38.212] with a CI-RNTI provided by ci-RNTI as described in clause 10.1. UplinkCancellation additionally provides to the UE a set of serving cells, by ci-ConfigurationPerServingCell, that includes a set of serving cell indexes and a corresponding set of locations for fields in DCI format 2_4 by positionInDCI a number of fields in DCI format 2_4, by positionInDCI-forSUL, for each serving cell for a SUL carrier, if the serving cell is configured with a SUL carrier an information payload size for DCI format 2_4 by dci-PayloadSize-ForCI an indication for time-frequency resources by time FrequencyRegion For a serving cell having an associated field in a DCI format 2_4, for the field denote by $N_{CI}$ a number of bits provided by ci-PayloadSize $B_{CI}$ a number of PRBs provided by frequencyRegionforCI in timeFrequencyRegion $T_{CI}$ a number of symbols, excluding symbols for reception of SS/PBCH blocks and DL symbols indicated by tdd-UL-DL-ConfigurationCommon, from a number of symbols that is provided by timeDurationforCI in time FrequencyRegion, if the PDCCH monitoring periodicity for the search space set with the DCI format 2_4 is one slot and there are more than one PDCCH monitoring occasions in a slot, or is equal to the PDCCH monitoring periodicity, otherwise.

GCI a number of partitions for the $T_{CI}$ symbols provided by timeGranularityforCI in time FrequencyRegion $G_{CI}$ sets of bits from the MSB of the $N_{CI}$ bits have a one-to-one mapping with $G_{CI}$ groups of symbols where each of the first $G_{CI} - T_{CI} + \lfloor T_{CI}/G_{CI} \rfloor \cdot G_{CI}$ groups includes $\lfloor T_{CI}/G_{CI} \rfloor$ symbols and each of the remaining $T_{CI} - \lfloor T_{CI}/G_{CI} \rfloor \cdot G_{CI}$ groups includes $\lceil T_{CI}/G_{CI} \rceil$ symbols. A UE determines a symbol duration with respect to a SCS configuration of an active DL BWP where the UE monitors PDCCH for DCI format 2_4 detection.

For a group of symbols, $N_{BI} = N_{CI}/G_{CI}$ bits from MSB of each set of bits have a one-to-one mapping with $N_{BI}$ groups of PRBs where each of the first $N_{BI} - B_{CI} + \lfloor B_{CI}/N_{BI} \rfloor \cdot N_{BI}$ groups includes $\lfloor B_{CI}/N_{BI} \rfloor$ PRBs and each of the remaining $B_{CI} - \lfloor B_{CI}/N_{BI} \rfloor \cdot N_{BI}$ groups includes $\lceil B_{CI}/N_{BI} \rceil$ PRBs. A UE determines a first PRB index as $N_{RFR}^{start} = O_{carrier} + RB_{start}$ and a number of contiguous RBs as $B_{CI} = L_{RB}$ from frequencyRegionforCI that indicates an offset $RB_{start}$ and a length $L_{RB}$ as RIV according to [6, TS 38.214], and from offsetToCarrier in FrequencyInfoUL-SIB or FrequencyInfoUL that indicates $O_{carrier}$ for a SCS configuration of an active DL BWP where the UE monitors PDCCH for DCI format 2_4 detection.

An indication by a DCI format 2_4 for a serving cell is applicable to a PUSCH transmission or an SRS transmission on the serving cell. If the PUSCH transmission or the SRS transmission is scheduled by a DCI format, the indication by the DCI format 2_4 is applicable to the PUSCH transmission or SRS transmission only if the last symbol of the PDCCH reception providing the DCI format is earlier than the first symbol of the PDCCH reception providing the DCI format 2_4.

For the serving cell, the UE determines the first symbol of the $T_{CI}$ symbols to be the first symbol that is after $T'_{proc,2}$ from the end of a PDCCH reception where the UE detects the DCI format 2_4, where $T'_{proc,2}$ is obtained from $T_{proc,2}$ for PUSCH processing capability 2 [6, TS 38.214] assuming $d_{2,1} = d_{offset} \cdot 2^{-\mu_{UL}}/2^{-\mu}$ where $d_{offset}$ is provided by delta_Offset, μ being the smallest SCS configuration between the SCS configuration of the PDCCH and the smallest SCS configuration HUL provided in scs-SpecificCarrierList of FrequencyInfoUL or FrequencyInfoUL-SIB. The UE does not expect to cancel the PUSCH transmission or the SRS transmission before a corresponding symbol that is $T_{proc,2}$ assuming that $d_{2,1} = 0$ after a last symbol of the PDCCH reception where the UE detects the DCI format 2_4.

A UE that detects a DCI format 2_4 for a serving cell cancels a PUSCH transmission or an actual repetition of a PUSCH transmission [6, TS 38.214] if the PUSCH transmission is with repetition Type B, as determined in clauses 9 and 9.2.5 or in clause 6.1 of [6, TS 38.214], or an SRS transmission on the serving cell if, respectively, the transmission is PUSCH with priority 0, if the UE is provided uplinkCancellationPriority, a group of symbols, from the $T_{CI}$ symbols, has at least one bit value of '1' in the corresponding set of $N_{BI}$ bits in the DCI format 2_4 and includes a symbol of the (repetition of the) PUSCH transmission or of the SRS transmission, and a group of PRBs, from the $B_{CI}$ PRBs, has a corresponding bit value of '1' in the set of bits corresponding to the group of symbols in the DCI format 2_4 and includes a PRB of the (repetition of the) PUSCH transmission or of the SRS transmission, where the cancellation of the (repetition of the) PUSCH transmission includes all symbols from the earliest symbol of the (repetition of the) PUSCH transmission that is in a group of symbols having corresponding bit values of '1' in the DCI format 2_4;

the cancellation of the SRS transmission includes only symbols that are in one or more groups of symbols having corresponding bit values of '1' in the DCI format 2_4.

If, based on an indication by a DCI format 2_4, a UE cancels a PUSCH transmission or an SRS transmission, the UE does not expect to be scheduled by a second DCI format to transmit a PUSCH or an SRS over symbols that include symbols of the cancelled PUSCH transmission or SRS transmission, where the last symbol of the PDCCH reception providing the second DCI format is no earlier than the first symbol of the PDCCH reception providing the DCI format 2_4.

12 Bandwidth Part Operation

. . .

A UE configured for operation in bandwidth parts (BWPs) of a serving cell, is configured by higher layers for the serving cell a set of at most four bandwidth parts (BWPs) for receptions by the UE (DL BWP set) in a DL bandwidth by parameter BWP-Downlink or by parameter initialDownlinkBWP with a set of parameters configured by BWP-DownlinkCommon and BWP-DownlinkDedicated, and a set of at most four BWPs for transmissions by the UE (UL BWP set) in an UL bandwidth by parameter BWP-Uplink or by parameter initialUplinkBWP with a set of parameters configured by BWP-UplinkCommon and BWP-UplinkDedicated.

For operation with shared spectrum channel access, a UE expects that the BWP configured by the parameter initialUplinkBWP provided in UplinkConfigCommonSIB is mapped to only a single RB set.

If a UE is not provided initialDownlinkBWP, an initial DL BWP is defined by a location and number of contiguous PRBs, starting from a PRB with the lowest index and ending at a PRB with the highest index among PRBs of a CORESET for Type0-PDCCH CSS set, after puncturing if any [4, TS 38.211], and a SCS and a cyclic prefix for PDCCH reception in the CORESET for Type0-PDCCH CSS set; otherwise, the initial DL BWP is provided by initialDownlinkBWP. For operation on the primary cell or on a secondary cell, a UE is provided an initial UL BWP by initialUplinkBWP. If the UE is configured with a supplementary UL carrier, the UE can be provided an initial UL BWP on the supplementary UL carrier by initialUplinkBWP.

If a UE has dedicated BWP configuration, the UE can be provided by firstActiveDownlinkBWP-Id a first active DL BWP for receptions and by firstActiveUplinkBWP-Id a first active UL BWP for transmissions on a carrier of the primary cell.

For each DL BWP or UL BWP in a set of DL BWPs or UL BWPs, respectively, the UE is provided the following parameters for the serving cell as defined in [4, TS 38.211] or [6, TS 38.214]:

- a SCS by subcarrierSpacing
- a cyclic prefix by cyclicPrefix
- a common RB N start BWP=$O_{carrier}$+$RB_{start}$ and a number of contiguous RBs $N_{BWP}^{size}$=$L_{RB}$ provided by locationAndBandwidth that indicates an offset $RB_{start}$ and a length $L_{RB}$ as RIV according to [6, TS 38.214], setting $N_{BWP}^{size}$=275, and a value $O_{carrier}$ provided by offsetToCarrier for the subcarrierSpacing
- an index in the set of DL BWPs or UL BWPs by respective BWP-Id
- a set of BWP-common and a set of BWP-dedicated parameters by BWP-DownlinkCommon and BWP-DownlinkDedicated for the DL BWP, or BWP-UplinkCommon and BWP-UplinkDedicated for the UL BWP [12, TS 38.331]

For unpaired spectrum operation, a DL BWP from the set of configured DL BWPs with index provided by BWP-Id is linked with an UL BWP from the set of configured UL BWPs with index provided by BWP-Id when the DL BWP index and the UL BWP index are same. For unpaired spectrum operation, a UE does not expect to receive a configuration where the center frequency for a DL BWP is different than the center frequency for an UL BWP when the BWP-Id of the DL BWP is same as the BWP-Id of the UL BWP.

For each DL BWP in a set of DL BWPs of the PCell, a UE can be configured CORESETs for every type of CSS sets and for USS as described in clause 10.1. The UE does not expect to be configured without a CSS set on the PCell in the active DL BWP If a UE is provided controlResourceSetZero and searchSpaceZero in PDCCH-ConfigSIB1 or PDCCH-ConfigCommon, the UE determines a CORESET for a search space set from controlResourcesetZero as described in clause 13 and for Tables 13-0 through 13-10, and determines corresponding PDCCH monitoring occasions as described in clause 13 and for Tables 13-11 through 13-15. If the active DL BWP is not the initial DL BWP, the UE determines PDCCH monitoring occasions for the search space set only if the CORESET bandwidth is within the active DL BWP and the active DL BWP has same SCS configuration and same cyclic prefix as the initial DL BWP.

For each UL BWP in a set of UL BWPs of the PCell, or of the PUCCH-SCell, or of the PUCCH-sSCell the UE is configured resource sets for PUCCH transmissions as described in clause 9.2.1.

A UE receives PDCCH and PDSCH in a DL BWP according to a configured SCS and CP length for the DL BWP. A UE transmits PUCCH and PUSCH in an UL BWP according to a configured SCS and CP length for the UL BWP.

If a bandwidth part indicator field is configured in a DCI format, the bandwidth part indicator field value indicates the active DL BWP, from the configured DL BWP set, for DL receptions as described in [5, TS 38.212]. If a bandwidth part indicator field is configured in a DCI format, the bandwidth part indicator field value indicates the active UL BWP, from the configured UL BWP set, for UL transmissions as described in [5, TS 38.212].

. . .

If a bandwidth part indicator field is configured in a DCI format and indicates an UL BWP or a DL BWP different from the active UL BWP or DL BWP, respectively, the UE shall for each information field in the DCI format
if the size of the information field is smaller than the one required for the DCI format interpretation for the UL BWP or DL BWP that is indicated by the bandwidth part indicator, the UE prepends zeros to the information field until its size is the one required for the interpretation of the information field for the UL BWP or DL BWP prior to interpreting the DCI format information fields, respectively
if the size of the information field is larger than the one required for the DCI format interpretation for the UL BWP or DL BWP that is indicated by the bandwidth part indicator, the UE uses a number of least significant bits of the DCI format equal to the one required for the UL BWP or DL BWP indicated by bandwidth part indicator prior to interpreting the DCI format information fields, respectively
for a DCI format 0_3, or for a DCI format 1_3, and for an information field that includes a number of blocks [5, TS 38.212], the above procedures apply separately for each block of the information field
set the active UL BWP or DL BWP to the UL BWP or DL BWP indicated by the bandwidth part indicator in the DCI format

. . .

A UE does not expect to detect a DCI format with a BWP indicator field that indicates an active DL BWP or an active UL BWP change with the corresponding time domain resource assignment field providing a slot offset value for a PDSCH reception or PUSCH transmission that is smaller than a delay required by the UE for an active DL BWP change or UL BWP change, respectively [10, TS 38.133].

If a UE detects a DCI format with a BWP indicator field that indicates an active DL BWP change for a cell, the UE is not required to receive or transmit in the cell during a time duration from the end of the third symbol of a slot where the UE receives the PDCCH that includes the DCI format in a scheduling cell until the beginning of a slot indicated by the slot offset value of the time domain resource assignment field in the DCI format.

If a UE detects a DCI format indicating an active UL BWP change for a cell, the UE is not required to receive or transmit in the cell during a time duration from the end of the third symbol of a slot where the UE receives the PDCCH that includes the DCI format in the scheduling cell until the beginning of a slot indicated by the slot offset value of the time domain resource assignment field in the DCI format.

A UE expects to detect a DCI format with a BWP indicator field that indicates an active UL BWP change or an active DL BWP change only if a corresponding PDCCH is received within the first 3 symbols of a slot. If the UE detects the DCI format from two PDCCH receptions in search space sets $s_i$ and $s_j$ that include searchSpaceLinkingId with same value, as described in clause 10.1, the UE considers the PDCCH reception where the UE detects the DCI format to be the one from the two PDCCH receptions that ends later.

For a serving cell, a UE can be provided by defaultDownlinkBWP-Id a default DL BWP among the configured DL BWPs. If a UE is not provided a default DL BWP by defaultDownlinkBWP-Id, the default DL BWP is the initial DL BWP.

If a UE is provided by bwp-InactivityTimer a timer value for the serving cell [11, TS 38.321] and the timer is running, the UE decrements the timer at the end of a subframe for FR1 or at the end of a half subframe for FR2 if the restarting conditions in [11, TS 38.321] are not met during the interval of the subframe for FR1 or of the half subframe for FR2.

For a cell where a UE changes an active DL BWP due to a BWP inactivity timer expiration and for accommodating a delay in the active DL BWP change or the active UL BWP change required by the UE [10, TS 38.133], the UE is not required to receive or transmit in the cell during a time duration from the beginning of a subframe for FR1, or of half of a subframe for FR2, that is immediately after the BWP inactivity timer expires until the beginning of a slot where the UE can receive or transmit.

When a UE's BWP inactivity timer for a cell within FR1 (or FR2) expires within a time duration where the UE is not required to receive or transmit for an active UL/DL BWP change in the cell or in a different cell within FR1 (or FR2), the UE delays the active UL/DL BWP change triggered by the BWP inactivity timer expiration until a subframe for FR1 or half a subframe for FR2 that is immediately after the UE completes the active UL/DL BWP change in the cell or in the different cell within FR1 (or FR2).

If a UE is provided by firstActiveDownlinkBWP-Id a first active DL BWP and by firstActiveUplinkBWP-Id a first active UL BWP on a carrier of a secondary cell, the UE uses the indicated DL BWP and the indicated UL BWP as the respective first active DL BWP on the secondary cell and first active UL BWP on the carrier of the secondary cell.

In New Radio (NR), a network could configure a User Equipment (UE) with beam reporting (e.g., periodic or semi-persistent beam reporting) or activate or trigger aperiodic beam reporting (e.g., Channel State Information (CSI) reporting) to acquire or obtain channel state information or channel quality or beam quality for data/control transmissions. Typically, beam reporting could be a CSI reporting with quantity corresponding to Reference Signal Received Power (RSRP). However, with frequent reporting, the UE could experience huge transmission overhead. On the other hand, with sparse reporting, the network may not be able to obtain the latest beam information in time and the quality of communication between the network and the UE could be deteriorated. In Rel-19 Multi-Input Multi-Output (MIMO) phase 5, UE initiated/event-driven beam management to reduce latency and/or overhead is discussed. The UE could initiate or trigger a beam report in response to some condition being met (e.g., quality of currently activated beam being lower than a threshold and/or quality of a new/candidate beam being higher than a threshold and/or quality of a new/candidate beam is a threshold value better than a current beam). In addition, in mobility enhancement phase 4, UE-initiated beam reporting is also introduced for candidate cells in order to perform faster L1/L2 Triggered-Mobility (LTM).

In current NR, there are other beam management mechanisms and/or other reporting and/or other procedures regarding beam changes and/or beam reporting. For example, a UE could change its (activated) beam for a Cell in response to receiving an activation Transmission Configuration Indication ($T_{CI}$) state Medium Access Control (MAC) Control Element (CE) associated with or indicating the Cell (or the Cell's Bandwidth Part (BWP)). With the introduction of UE-initiated beam reporting, the UE could have simultaneous ongoing beam reporting procedure and the other procedures. One issue could be that a network could receive outdated beam information or the UE could transmit unnecessary beam reporting information when the two procedures collide.

Figure 10A:
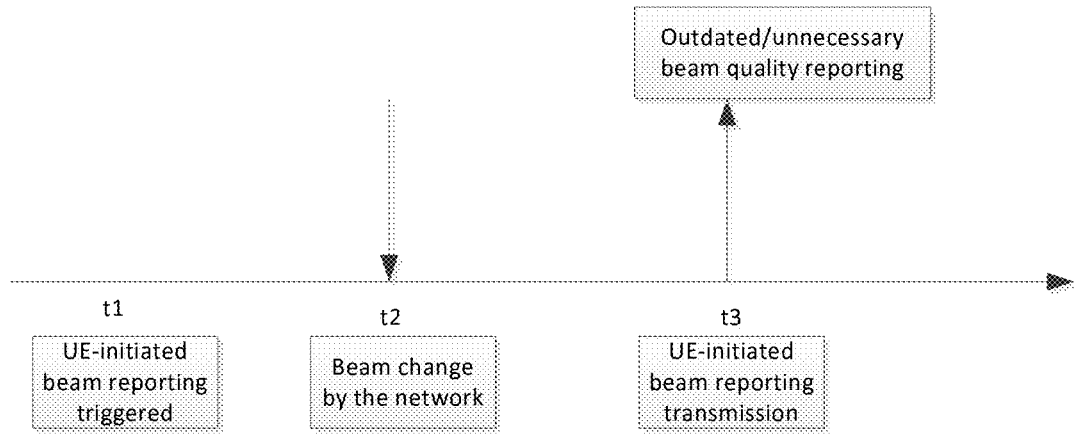
FIG. 10A is an example diagram showing an issue where a network could receive outdated beam information or the UE could transmit unnecessary beam reporting information when the two procedures collide, in accordance with embodiments of the present invention.

An example of the issue is shown in FIG. 10A. At timing t1, the UE triggers a (UE-initiated) beam reporting, e.g., due to deterioration of beam quality of a BWP or a Cell. The UE could assemble a Transport Block (TB) or MAC Protocol Data Unit (PDU) for transmission of a report at timing t3. Additionally and/or alternatively in certain embodiments, the UE could (prepare to or be configured with) Physical Uplink Control Channel (PUCCH) resource for the transmission of the report at timing t3. Additionally and/or alternatively in certain embodiments, the UE could trigger a Scheduling Request (SR) and/or initiate a random access procedure to the network for an Uplink (UL) grant for the report transmission. At timing t2, the network could provide beam change (e.g., $T_{CI}$ state reconfiguration, activation/deactivation via MAC CE, etc.) for the BWP or for the Cell to the UE. At timing t3, the UE transmits beam reporting to the network. As the beam may be changed by the network in t2, the reporting in t3 may not be up to date or may cause confusion to the network.

Figure 10B:
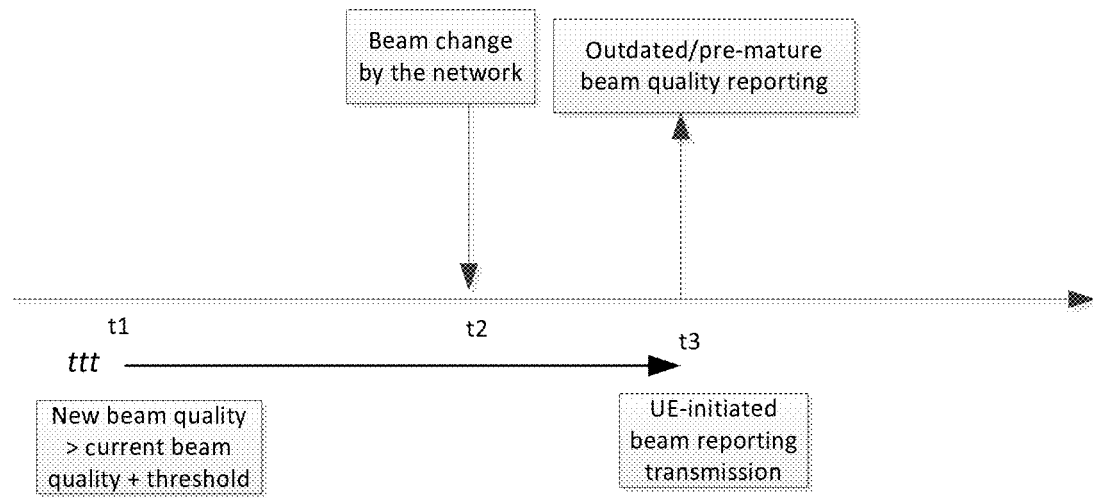
FIG. 10B is an example diagram showing that a UE could determine or discover that an event for triggering a report for a Cell is fulfilled at t1, in accordance with embodiments of the present invention.

Another example is shown in FIG. 10B. The UE could determine or discover that an event for triggering a report for a Cell is fulfilled at t1 (e.g., the event could be a quality of a new beam being a threshold value better than a current beam of a Cell). The UE could maintain or monitor the event for a time period with a value, timeToTrigger (ttt), wherein the UE could trigger the report in response to the event being fulfilled during ttt. At timing t2, the network provides a beam change for the Cell. The beam change could be a beam activation/deactivation MAC CE. The previous current beam could be deactivated and/or replaced by a second current beam. However, the monitoring for the event may still be ongoing (e.g., the referenced current beam for measuring the event may not be changed accordingly and/or the quality of the second current beam may be lower than the new beam for a short period of time), and the UE may trigger the report pre-maturely or unnecessarily.

With the present invention, methods are disclosed for handling UE-initiated beam reporting overlapping with other UE procedures or interactions between UE-initiated beam reporting and other UE procedures.

Handling of event(s), (triggered report,) Time-To-Trigger (TTT) for the following scenarios:
    Event: suspend/resume, discard/clear, or continue.
    Triggered report: discard/clear or keep.
    TTT: restart, stop, or continue.
    Different events, scenarios may be handled differently.
    MIMO:
        Event(s), (triggered report,) TTT for a Secondary Cell (SCell) when the SCell is deactivated.
        Event(s), (triggered report,) TTT for a Primary Secondary Cell (PSCell) when Secondary Cell Group (SCG) is deactivated.
        Event(s), (triggered report,) TTT for a SCell when active Downlink (DL) BWP of the SCell is switched to dormant BWP.
        Event(s), (triggered report,) TTT for a SCell when a Timing Advance (TA) timer is associated with a Cell for report transmission expiration.

Event(s), (triggered report,) TTT for a Cell when Beam Failure Recovery (BFR) for the Cell is ongoing.

Event(s), (triggered report,) TTT for a Cell when BFR for another Cell for report transmission is ongoing.

Event(s), (triggered report,) TTT for a Cell when a current beam of the Cell is changed.

LTM:

Event(s), (triggered report,) TTT for a candidate cell when $T_{CI}$ state(s) of the candidate cell is deactivated.

Event(s), (triggered report,) TTT for a candidate cell when activated $T_{CI}$ state(s) of the candidate cell is changed, e.g. all deactivated, some deactivated, from a first set to a second set, new activated $T_{CI}$ state(s).

Event(s), (triggered report,) TTT for a candidate cell when receiving an LTM command MAC CE to switch to the candidate cell.

Event(s), (triggered report,) TTT for a candidate cell when receiving an LTM command MAC CE to switch to another candidate cell.

Event(s), (triggered report,) TTT for a candidate cell when handover or LTM is ongoing.

Event(s), (triggered report,) TTT for a candidate cell when current beam of Primary Cell (PCell)/Special Cell (SpCell) is changed.

One concept of the present invention is that a UE could determine whether to perform (a part of) one or more actions for a UE-initiated beam reporting in response to one or more procedures.

The UE-initiated beam reporting could be associated with or be triggered for a Cell. The Cell could be a PCell or a SCell. Additionally and/or alternatively in certain embodiments, the Cell could be a candidate cell (associated with an LTM candidate configuration). The candidate cell could be a PCell associated with an LTM candidate configuration. Preferably in certain embodiments, the candidate cell corresponds to a cell associated with LTM candidate configuration (configured in a PCell).

A UE could perform one or more actions for a UE-initiated beam reporting in response to one or more procedures. Additionally and/or alternatively in certain embodiments, the UE could determine to not perform the one or more action(s) for a UE-initiated beam reporting in response to (a part of) the one or more procedures. Additionally and/or alternatively in certain embodiments, the UE could determine to perform the one or more action(s) for the UE-initiated beam reporting in response to a part of the one or more procedures, and not perform the one or more action(s) for the UE-initiated beam reporting in response to another part of the one or more procedures.

Additionally and/or alternatively in certain embodiments, the UE could perform a first part of the one or more actions for a UE-initiated beam reporting (associated with an event) in response to a first procedure in the one or more procedures and may not perform the other part of the one or more actions for a UE-initiated reporting in response to the first procedure. Additionally and/or alternatively in certain embodiments, the UE could perform a second part of the one or more actions for a UE-initiated beam reporting in response to a second procedure in the one or more procedures and may not perform another part of the one or more actions for a UE-initiated reporting in response to the second procedure.

The UE could determine whether to perform one action in the one or more actions for a UE-initiated beam reporting in response to a first procedure in the one or more procedures based on at least an event associated with the UE-initiated beam reporting. For example, the UE could perform the one action in response to the first procedure if or when the UE-initiated beam reporting is associated with a first event, and the UE may not perform the one action in response to the first procedure if or when the UE-initiated beam reporting is associated with a second event.

Additionally and/or alternatively in certain embodiments, the UE could determine whether to perform one action (in the one or more actions) for a UE-initiated beam reporting in response to a procedure based on at least the procedure. For example, the UE could perform the one action for the UE-initiated beam reporting in response to a first procedure, and the UE does not perform the one action in response to a second procedure.

The UE could determine whether to cancel a UE-initiated beam reporting based on at least (status of) a one or more procedures of the UE. The UE could cancel a UE-initiated beam reporting when or if (at least) there is a (ongoing) one or more procedures of the UE. The UE may not cancel the UE-initiated beam reporting when or if (at least) there is no (ongoing) one or more procedures of the UE. Additionally and/or alternatively in certain embodiments, the UE could cancel or stop (part of) the one or more procedures when or if (at least) there is a (triggered or ongoing) UE-initiated beam reporting.

A UE could determine whether to perform an action for a UE-Initiated (UEI) beam reporting in response to a procedure based on at least the type of the procedure. An example is shown in FIG. 11. For a UE-initiated beam reporting, in response to one of a one or more procedures, a procedure 1 (occurred during the ongoing UE-initiated beam reporting), the UE may not perform the actions (Actions 1 to 4) in the one or more actions. Additionally and/or alternatively in certain embodiments, in response to one of one or more procedures, procedure 2, the UE could perform Action 1 and 2 and does not perform Action 3 and 4. In response to one of the one or more procedures, procedure 3, the UE could perform Action 1 to 4.

Additionally and/or alternatively in certain embodiments, the UE could determine whether to perform an action for a UEI beam reporting in response to a procedure based on at least an event associated with the UEI beam reporting. Another example is shown in FIG. 12. For UE-initiated beam reporting associated with Event 1, the UE could perform Action 1 in response to Procedure 1 and 2. The UE does not perform Action 1 for UE-initiated beam reporting associated with Event 1 in response to Procedure 3. For UE-initiated beam reporting associated with Event 2, the UE could perform Action 1 in response to Procedure 1. The UE does not perform Action 1 for UE-initiated beam reporting associated with Event 1 in response to Procedure 2 and 3.

Figures 13A, 13B:
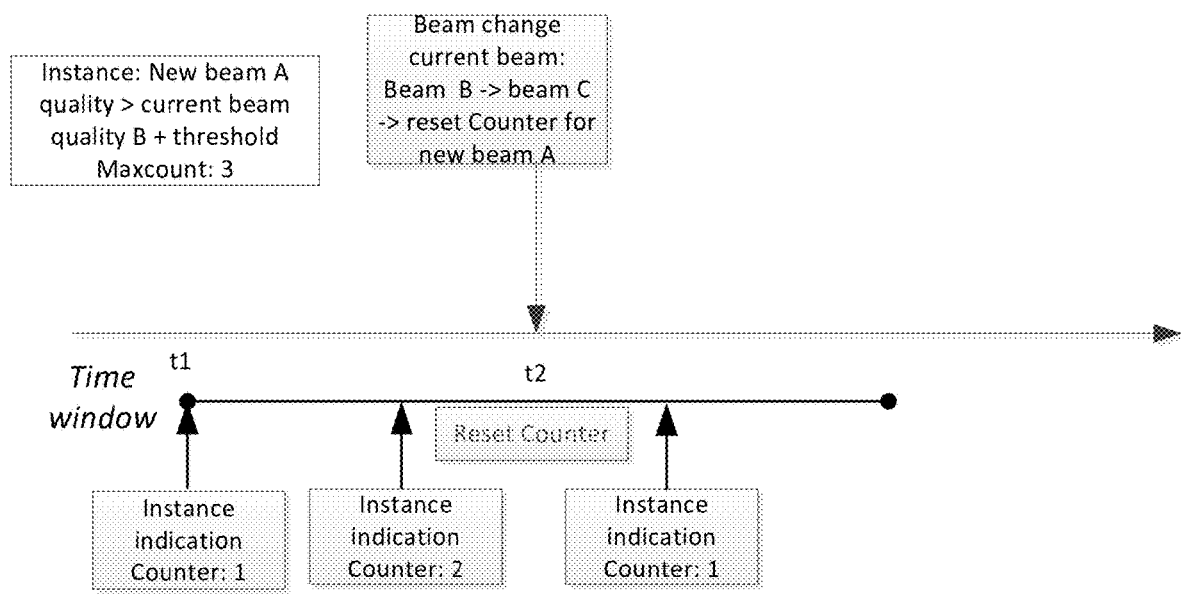
FIG. 13A is an example diagram showing that a UE determines whether to perform Action 1 and Action 2 for a UE-initiated beam reporting in response to a procedure based on different events related to the UE-initiated beam reporting, in accordance with embodiments of the present invention.
FIG. 13B is an example diagram showing that a UE could be configured with a UE-initiated beam reporting configuration (e.g., for MIMO) associated with a Serving Cell, in accordance with embodiments of the present invention.

Another example is shown in FIG. 13A. The UE performs Action 1 and Action 2 in response to procedure 1 for an Event-1 related UE-initiated beam reporting, and the UE performs Action 1 and does not perform Action 2 for an Event-2 related UE-initiated beam reporting in response to the Procedure 1.

LIST OF ACTIONS

The one or more actions for a UE-initiated beam reporting could (or may not) contain/comprise suspending the (ongoing) UE-initiated beam reporting. When suspending the UE-initiated beam reporting, the UE may not generate a UE-initiated beam report for the UE-initiated beam reporting.

The one or more actions for a UE-initiated beam reporting could (or may not) contain/comprise resuming the (suspended) UE-initiated beam reporting.

The one or more actions for a UE-initiated beam reporting could (or may not) contain/comprise suspending an event associated with the (ongoing) UE-initiated beam reporting. To suspend an event, the UE could stop performing measurements associated with the event and/or stop/disable triggering beam reporting associated with the event and/or stop/disable triggering beam reporting associated with a measurement object (e.g., associated with a Cell) associated with the UE-initiated beam reporting.

The one or more actions for a UE-initiated beam reporting could (or may not) contain/comprise resuming a (suspended) UE-initiated beam reporting. To resume an event, the UE could start performing measurement associated with the event and/or enable triggering beam reporting associated with the event and/or associated with a measurement object associated with the beam reporting.

The one or more actions for a UE-initiated beam reporting could (or may not) contain/comprise discarding or clearing or de-configuring or releasing an (configured) event of a UE-initiated beam reporting.

The one or more actions for a UE-initiated beam reporting could (or may not) contain/comprise cancelling or clearing a (or all) trigger(s) associated with the UE-initiated beam reporting.

The one or more actions for a UE-initiated beam reporting could (or may not) contain/comprise continuing the (ongoing) UE-initiated beam reporting.

The one or more actions for a UE-initiated beam reporting could (or may not) contain/comprise not cancelling a (or any) trigger associated with the UE-initiated beam reporting.

The one or more actions for a UE-initiated beam reporting could (or may not) contain/comprise starting or restarting a timer for determining a time period, wherein the UE triggers a UE-initiated beam reporting or transmits a UE-initiated beam report if (condition of) an event associated with the UE-initiated beam reporting is fulfilled for all measurements during the time period. The length of the timer could be set to a configured value for the event (e.g., timeToTrigger, or ttt).

The one or more actions for a UE-initiated beam reporting could (or may not) contain/comprise starting or restarting a timer for determining a time period, wherein the UE triggers a UE-initiated beam reporting or transmits a UE-initiated beam report if (condition of) an event associated with the UE-initiated beam reporting is fulfilled for a number of (consecutive) measurements during the time period. The length of the timer could be set to a configured value for the event (e.g., timeToTrigger, or ttt).

The one or more actions for a UE-initiated beam reporting could (or may not) contain/comprise resetting the timeToTrigger for an event associated with the UE-initiated beam reporting or associated with the Cell.

The one or more actions for a UE-initiated beam reporting could (or may not) contain/comprise continuing performing measurement during an ongoing timeToTrigger time period.

The one or more actions for a UE-initiated beam reporting could (or may not) contain/comprise re-initializing the consideration or re-counting the time of fulfilling the event for a time period determined by time ToTrigger of the event associated with the UE-initiated beam reporting or associated with the Cell.

LIST OF PROCEDURES

The one or more procedures could contain/comprise or correspond to a state change of a measurement Reference Signal (RS) associated with an event (e.g., serving cell deactivation, active BWP change, cell Discontinuous Transmission (DTX) active/inactive time associated with the measurement RS, BFR happens).

The one or more procedures could contain/comprise or correspond to a state change of UE-initiated reporting (e.g., serving cell deactivation, active BWP change, cell Discontinuous Reception (DRX) active/inactive time associated with UE-initiated reporting).

The one or more procedures are associated with a measurement RS associated with an event, and/or the one or more procedures do not contain/comprise a first specific procedure if the first specific procedure is not associated with the event.

The one or more procedures are associated with a measurement RS associated with an event, and/or the one or more procedures do not contain/comprise a first specific procedure if the first specific procedure does not have impact on or NOT make a state change of the measurement RS associated with the event.

The one or more procedures are associated with a measurement RS associated with an event, and/or the one or more procedures contain/comprise a second specific procedure if the second specific procedure has impact on or makes a state change of the measurement RS associated with the event.

In one example, an event corresponds to beam quality of a current beam associated with an RS on a first cell, and beam quality of a candidate beam associated with one or more RSs on a second cell. The first cell could be the same as or different than the second cell. If a first specific procedure does not change the state of the RS (e.g., deactivating third cell or changing active (DL) BWP associated with a third cell), the one or more procedures do not contain/comprise the first specific procedure. If a second specific procedure makes change to the state of the RS (e.g., deactivating the first cell or the second cell, or changing active (DL) BWP associated with the first cell or the second cell), the one or more procedures contain/comprise the second specific procedure.

The one or more procedures are associated with a UE-initiated report associated with an event, and/or the one or more procedures do not contain/comprise a first specific procedure if the first specific procedure is not associated with the event and/or preferably not associated with the UE-initiated report.

The one or more procedures are associated with a UE-initiated report associated with an event, and/or the one or more procedures do not contain/comprise a first specific procedure if the first specific procedure does not have impact on or does NOT make a state change of the UE-initiated report associated with the event.

The one or more procedures are associated with a UE-initiated report associated with an event, and/or the one or more procedures contain/comprise a second specific procedure if the second specific procedure has impact on or makes a state change of the UE-initiated report associated with the event.

In one example, an event corresponds to beam quality of a current beam associated with an RS on a first cell, and beam quality of a candidate beam associated with one or more RSs on a second cell. The UE could be (pre-)configured with a plurality of UL resources for transmitting UE-initiated reporting. Preferably in certain embodiments, the UE-initiated reporting is configured on a third cell (and/or a fourth cell). The first cell could be the same as or different than the second cell. If a first specific procedure does not change the state of UE-initiate reporting (e.g., deactivating third cell or changing active (UL) BWP associated with a fifth cell), the one or more procedures do not contain/comprise the first specific procedure. If a second specific procedure makes a change of state of the UE-initiate reporting (e.g., deactivating the third cell and/or the fourth cell, or changing active (UL) BWP associated with the third cell and/or the fifth cell), the one or more procedures contain/comprise the second specific procedure.

The one or more procedures could contain/comprise activation or deactivation of a Cell associated with the UE-initiated beam reporting.

The Cell could be an SCell. The UE-initiated beam reporting could be associated with a Secondary Cell.

The one or more procedures could contain/comprise activation or deactivation of an SCG. The UE-initiated beam reporting could be associated with a PSCell.

The one or more procedures could contain/comprise an active DL BWP (or UL BWP) associated with an SCell associated with the UE-initiated beam reporting being switched (e.g., switched to dormant BWP).

The one or more procedures could contain/comprise an active DL BWP (or UL BWP) associated with a PCell associated with the UE-initiated beam reporting being switched (e.g., switched to default BWP or another active BWP).

The one or more procedures could contain/comprise expiry/expiration of a timer (e.g., time AlignmentTimer) associated with TA associated with a Timing Advance Group (TAG). The TAG could be associated with a Cell on which the UE transmits a (UE-initiated) beam report in response to the UE-initiated beam reporting. The TAG could be associated with the Cell associated with the UE-initiated beam reporting.

The one or more procedures could (or may not) contain/comprise (triggering or initiation of) a beam failure recovery procedure on the Cell associated with the UE-initiated beam reporting. Additionally and/or alternatively in certain embodiments, the beam failure recovery procedure could be associated with a (different or second) Cell on which the UE transmits the UE-initiated beam report of the Cell. The one or more procedures could contain/comprise a triggered and not cancelled BFR. The one or more procedures could contain/comprise a random access procedure initiated for (PCell or SCell) beam failure recovery. The one or more procedures could contain/comprise triggering a Scheduling Request (SR) for a (SCell) beam failure recovery. The one or more procedures could contain/comprise a triggered and not cancelled SR for beam failure recovery. The one or more procedures could contain/comprise assembly and/or transmission of a BFR MAC CE.

Alternatively in certain embodiments, the one or more procedures may not contain/comprise a beam failure recovery procedure. The one or more procedures may not contain/comprise a triggered and not cancelled BFR. The one or more procedures may not contain/comprise a random access procedure initiated for (PCell or SCell) beam failure recovery. The one or more procedures may not contain/comprise triggering an SR for a (SCell) beam failure recovery. The one or more procedures may not contain/comprise a triggered and not cancelled SR for beam failure recovery. The one or more procedures may not contain/comprise assembly and/or transmission of a BFR MAC CE.

The one or more procedures could contain/comprise a beam change procedure (associated with the Cell associated with the UE-initiated beam reporting). The beam change procedure could contain/comprise receiving a Radio Resource Control (RRC) reconfiguration (message) indicating reconfiguration of one or more TCI states.

The beam change procedure could contain/comprise receiving a TCI state activation MAC CE (for Physical Downlink Shared Channel (PDSCH) and/or for Physical Downlink Control Channel (PDCCH) and/or for PUCCH and/or for Physical Uplink Shared Channel (PUSCH). The TCI state activation MAC CE could be for DL and/or UL beam change.

Alternatively in certain embodiments, the one or more procedures may not contain/comprise a beam change procedure.

Additionally and/or alternatively in certain embodiments, the one or more procedures could contain/comprise initiating a random access procedure. The random access procedure could be initiated for reconfiguration with sync. The random access procedure could be initiated for an LTM procedure.

Alternatively in certain embodiments, the one or more procedures may not contain/comprise the random access procedure.

Additionally and/or alternatively in certain embodiments, the random access procedure could be initiated for early UL synchronization for a candidate cell.

The one or more procedures could (or may not) contain/comprise a MAC reset. Alternatively in certain embodiments, the one or more procedures may not contain/comprise a MAC reset.

The one or more procedures could (or may not) contain/comprise a Serving Cell deactivation. Alternatively in certain embodiments, the one or more procedures may not contain/comprise a Serving Cell deactivation. The Serving Cell deactivation could contain/comprise receiving a SCell activation/deactivation MAC CE. Serving Cell deactivation could contain/comprise expiry of a SCell deactivation timer. The Serving Cell could be associated with (measurement object associated with) the UE-initiated beam reporting.

The one or more procedures could (or may not) contain/comprise a beam reporting initiated or requested by a network. The beam reporting could be a (periodic or aperiodic or semi-persistent) CSI reporting associated with a Cell.

Procedures for LTM Candidates

The one or more procedures could (or may not) contain/comprise a handover or reconfiguration with sync procedure. The one or more procedures could contain/comprise an LTM procedure (e.g., receiving an LTM Cell Switch command MAC CE) switching to the Cell associated with the UE-initiated beam reporting. Alternatively in certain embodiments, the one or more procedures could (or may not) contain/comprise an LTM procedure switching to a Cell not associated with the UE-initiated beam reporting (e.g., switching to another LTM candidate cell).

The one or more procedures could (or may not) contain/comprise an ongoing reconfiguration with sync procedure. Additionally and/or alternatively in certain embodiments, the one or more procedures could (or may not) contain/comprise an ongoing LTM procedure (to a Cell associated with the UE-initiated beam reporting or another Cell).

The one or more procedures could contain/comprise a beam change procedure (associated with the SpCell associated with the Cell of the UE-initiated beam reporting). The beam change procedure could contain/comprise receiving an RRC reconfiguration (message) indicating reconfiguration of one or more TCI states. The SpCell could be associated with or could be configured with an LTM candidate associated with the Cell associated with the UE-initiated beam reporting.

The one or more procedures could (or may not) contain/comprise reconfiguration or release of candidate cell(s).

The one or more procedures could (or may not) contain/comprise TCI states activation or deactivation associated with a Cell. The Cell could be an LTM candidate Cell associated with the UE-initiated beam reporting. The Cell could be a PCell or SpCell of an LTM candidate configuration (e.g., LTM-candidate).

The one or more procedures could contain/comprise change of activated TCI state(s) of a Cell. The Cell could be an LTM candidate cell associated with the UE-initiated beam reporting. The one or more procedures could (or may not) contain/comprise receiving a Candidate Cell TCI States Activation/Deactivation MAC CE indicating an ltm-CandidateId (e.g., indicating ltm-CandidateId or indicating ltm-CandidateId-1), wherein the ltm-CandidateId is associated with a Cell associated with the UE-initiated beam reporting. The Candidate Cell TCI States Activation/Deactivation MAC CE could indicate a change (e.g., activation/deactivation) of TCI states associated with the Cell associated with the UE-initiated beam reporting.

Additionally and/or alternatively in certain embodiments, the one or more procedures could contain/comprise change (e.g., activation/deactivation) of at least an activated TCI state associated with the (event of the) UE-initiated beam reporting. Additionally and/or alternatively in certain embodiments, the one or more procedures could contain/comprise change (e.g., activation/deactivation) of a (newly previously deactivated) TCI state associated with the (event or measurement object of the) UE-initiated beam reporting. Network Energy Saving (NES) on Cell on which the UE transmits report/on the measured Cell Additionally and/or alternatively in certain embodiments, the one or more procedures could contain/comprise a Cell being not in the cell DRX Active Period. The Cell could be associated with the UE-initiated beam reporting. Alternatively in certain embodiments, the Cell could be a Cell on which the UE transmits a (UE-initiated) beam report associated with the UE-initiated beam reporting. The Cell could be not in the cell DRX Active Period during or at a timing when the UE is configured or is available to transmit the report. The Cell could be not in the cell DRX Active Period during or at a timing when the UE triggers a report or performs measurement for the UE-initiated beam reporting. Different Handling Based on Different Types of UE-Initiated Beam Reports: For LTM (for Candidate Cell) or for Serving Cell The event(s) could be associated with a Serving Cell. Additionally and/or alternatively in certain embodiments, the event(s) could be associated with a candidate Cell.

Additionally and/or alternatively in certain embodiments, the UE could determine whether to perform one or more actions for a UE-initiated beam reporting associated with a Cell in response to (a part of) the one or more procedures (associated with the Cell) based on at least the type of the Cell or based on at least a type or purpose of the UE-initiated beam reporting.

The UE-initiated beam reporting associated with a Serving Cell could be for MIMO (enhancement), (intra-cell and/or inter-cell) beam management.

The UE-initiated beam reporting associated with a candidate cell could be for LTM.

For example, the UE could perform (a part of) the one or more actions for a UE-initiated beam reporting associated with a Serving Cell in response to the one or more procedures associated with the Serving Cell (e.g., a UE-initiated beam reporting initiated or triggered based on comparison between quality of a current beam of the Serving Cell and a candidate beam of the Serving Cell). The UE may not (be allowed to) perform (a part of) the one or more actions for a UE-initiated beam reporting associated with a candidate Cell (or LTM) in response to the one or more procedures (associated with the candidate Cell) (e.g., in response to a reconfiguration with sync procedure or in response to an LTM procedure).

For example, the UE could (re) start or reset or stop a timer or a counter (e.g., timeToTrigger) associated with a UE-initiated beam reporting associated with a Serving Cell in response to the one or more procedures associated with the Serving Cell. The UE may not (be allowed to) (re) start or reset or stop a timer or a counter (e.g., timeToTrigger) associated with a UE-initiated beam reporting associated with a candidate Cell (or LTM) in response to the one or more procedures (associated with the candidate Cell) (e.g., in response to a reconfiguration with sync procedure or in response to an LTM procedure).

For another example, the UE could reset a counter associated with a first UE-initiated beam reporting of a Serving Cell in response to a beam change of a current beam on the Serving Cell. The counter could be used to trigger the first UE initiated beam reporting of the Serving Cell. The UE could stop a first timer or consider the first timer to be expired in response to the beam change of the current beam on the Serving Cell. The first timer could be a time period or a time window associated with the first UE-initiated beam reporting. The first UE-initiated beam reporting could be associated with a candidate beam and a current beam associated with the Serving Cell. The first UE-initiated beam reporting may not be associated with LTM.

The UE may not reset or restart a second timer associated with a second UE-initiated beam reporting of a candidate cell in response to the beam change of the current beam. The second timer could be a time ToTrigger (ttt) associated with the second UE-initiated beam reporting of the candidate cell. The ttt could be a time during which an event needs to be met in order to trigger a measurement report. The event could be quality of a candidate beam being higher than quality of the current beam plus a threshold. The second UE-initiated beam reporting could be associated with a candidate beam of the candidate cell and a current beam of the Serving Cell. The second UE-initiated beam reporting could be an event-triggered L1 measurement reporting associated with LTM.

An example is shown in FIG. 13B. The UE could be configured with a UE-initiated beam reporting configuration (e.g., for MIMO) associated with a Serving Cell. The UE could be configured with a time window and a maximum number of instance (e.g., maxcount=3) and could maintain a counter (for candidate beam and/or for Serving Cell) for calculating instances for the UE-initiated beam reporting. The UE could receive an instance indication at timing t1 indicating quality of a new beam, beam A is larger than a quality of a current beam, beam B, plus a threshold. At timing t2, the UE could be indicated by a network to perform beam change from current beam B to beam C. The UE could, in response to the beam change, reset the counter(s) associated with the UE-initiated beam reporting for the Serving Cell.

Additionally and/or alternatively in certain embodiments, the UE could perform the (a part of) one or more actions for a UE-initiated beam reporting associated with a candidate Cell in response to the one or more procedures (associated with the candidate Cell) (e.g., in response to a reconfiguration with sync procedure or in response to an LTM procedure). The UE may not perform (a part of) one or more actions for a UE-initiated beam reporting associated with a Serving Cell in response to the one or more procedures associated with the Serving Cell.

Additionally and/or alternatively in certain embodiments, the UE could (re) start or reset or stop a timer or a counter (e.g., associated with timeToTrigger) associated with a UE-initiated beam reporting associated with a candidate Cell in response to the one or more procedures (associated with the candidate Cell) (e.g., in response to a reconfiguration with sync procedure or in response to an LTM procedure). The UE may not (re) start or reset or stop a timer or a counter (e.g., associated with timeToTrigger) associated with a UE-initiated beam reporting associated with a Serving Cell in response to the one or more procedures associated with the Serving Cell.

Collision with the One or More Procedures when the Beam Reporting is Ongoing

For example, the UE could suspend an event associated with a UE-initiated beam reporting associated with a Cell in response to a deactivation of the Cell. Additionally and/or alternatively in certain embodiments, the UE could resume the event in response to an activation of the Cell. The UE could cancel or discard a triggered UE-initiated beam reporting (or report) in response to deactivation of the Cell. Preferably in certain embodiments, the cell corresponds to cell with measurement RS associated with an event (associated with UE-initiated beam reporting) (e.g., cell that comprises/contains RS for measuring current beam or one or more candidate beam). Preferably in certain embodiments, the cell corresponds to the cell with UE-initiated reporting associated with an event (e.g., cell that comprises/contains UE-initiated reporting associated with a (triggered and not canceled) event).

Additionally and/or alternatively in certain embodiments, the UE could disable triggering beam reporting associated with the event associated with the UE-initiated beam reporting.

Figure 14:
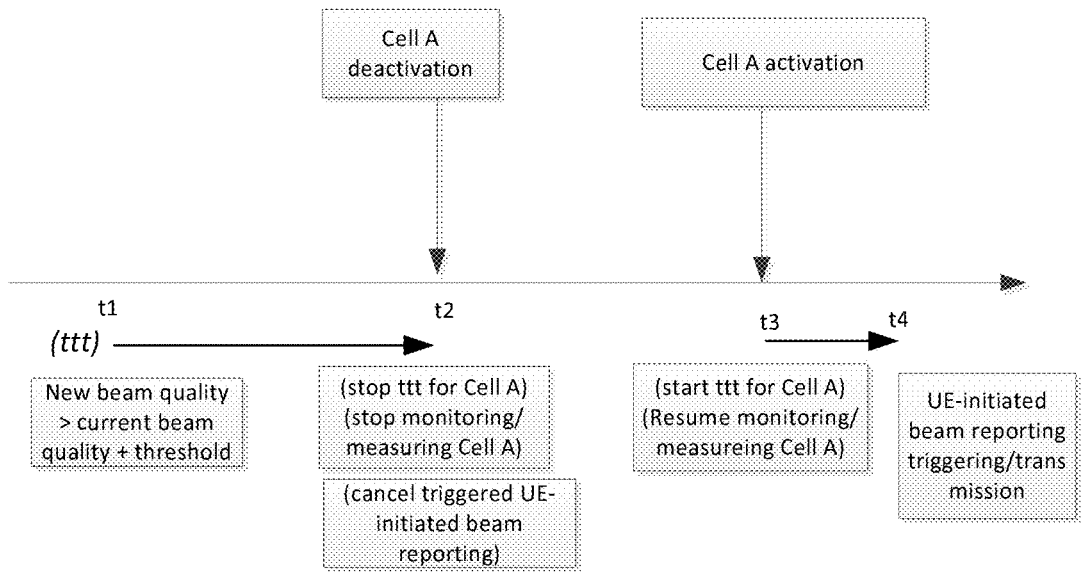
FIG. 14 is an example diagram showing that at timing t1, the UE measures (RS on or associated with) a Cell, Cell A, associated with a UE-initiated beam reporting, in accordance with embodiments of the present invention.

An example is shown in FIG. 14. At timing t1, the UE measures (RS on or associated with) a Cell, Cell A, associated with a UE-initiated beam reporting. Preferably in certain embodiments, or additionally, in FIG. 14, at timing t1, the UE triggers an event and determines to or attempts to transmit UE-initiated reporting on a Cell, Cell A. The UE could be configured with the UE-initiated beam reporting associated with the Cell A. The UE determines a quality of a new beam associated with Cell A is a threshold value better than a current beam of the Cell A (e.g., fulfilling (condition of) an event associated with the Cell A). The UE could maintain a timer or counter for detecting/judging if (condition of) the event fulfills for a time period (e.g., a length same as timeToTrigger, ttt). At timing t2, the UE receives a deactivation MAC CE indicating deactivation of Cell A. In response to the reception of Cell A deactivation, the UE could stop the timer/counter accumulation associated with the ttt of the UE-initiated beam reporting. If a trigger has been triggered (e.g., before t2) associated with the UE-initiated beam reporting, the UE could cancel the trigger in response to Cell A deactivation. The UE may not consider (condition of) the event to be fulfilled when the Cell A is deactivated. The UE may not trigger a UE-initiated beam reporting in when the Cell A is deactivated. At timing t3, the UE receives an activation MAC CE for Cell A. In response to Cell activation, the UE could resume the UE-initiated beam reporting. The UE could start or restart the timer or counter for ttt in response to Cell activation. The value (of the timer) could be continued/resumed since the last time the Cell A was deactivated. For example, the UE could trigger a UE-initiated beam reporting at t4 if or when sum of the time period [t1, t2] and [t3, t4] is equal to (or larger than) timeToTrigger associated with the UE-initiated beam reporting. Alternatively in certain embodiments, the UE could reset the value of the timer in response to Cell A deactivation (timing t2).

Figure 15:
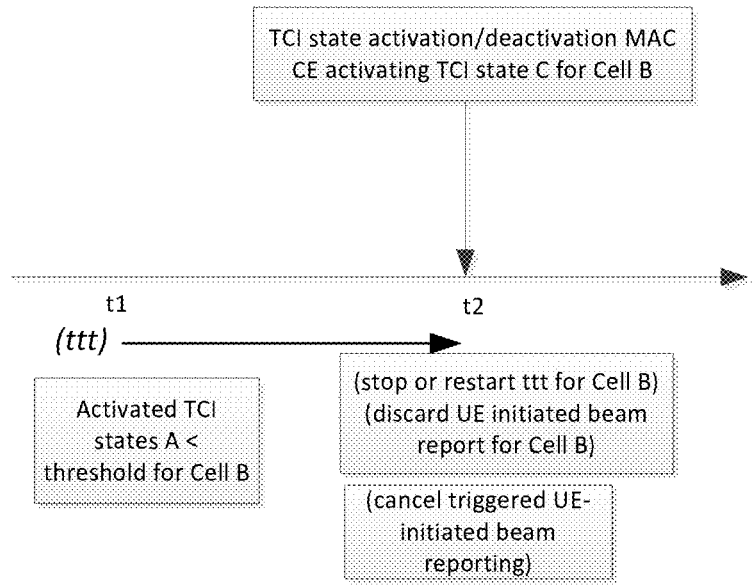
FIG. 15 is an example diagram showing that a UE could perform measurement (RS) on Cell B, in accordance with embodiments of the present invention.

For another example shown in FIG. 15, the UE could perform measurement (RS) on Cell B. Cell B could be a Serving Cell or a Candidate Cell. At timing t1, the UE discovers or determines an activated TCI state A's quality is lower than a threshold (e.g., fulfills (condition of) an event) which is an example but not limited to this event. Preferably in certain embodiments, at timing t1, the UE discovers or determines to trigger an event (e.g., fulfills (condition of) an event). The UE could maintain a timer or counter (e.g. ttt) for determining whether (condition of) the event is fulfilled for a timeToTrigger time period. At timing t2, the UE receives a TCI state activation/deactivation MAC CE indicating activation of TCI state C for Cell B (and/or deactivation of TCI state A). In response to the MAC CE, the UE could stop or restart the timer for timeToTrigger. The UE could consider a UE-initiated beam report (generated before t2) for Cell B as invalid. The UE could cancel triggered UE-initiated beam reporting for Cell B.

Figure 16:
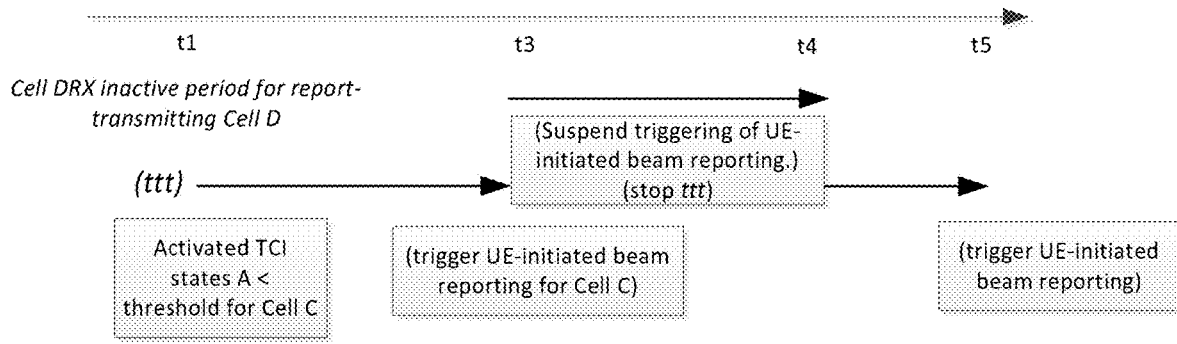
FIG. 16 is an example diagram showing that a UE could measure (RS on or associated with) Cell C and determine, at t1, an activated TCI state A's quality is smaller than a threshold for Cell C, in accordance with embodiments of the present invention.

For another example shown in FIG. 16, the UE could measure (RS on or associated with) Cell C and determine, at t1, an activated TCI state A's quality is smaller than a threshold for Cell C (e.g., fulfills (condition of) an event) which is an example but not limited to this event. Preferably in certain embodiments, at timing t1, the UE discovers or determines to trigger an event (e.g., fulfills (condition of) an event). The UE could trigger a UE-initiated beam reporting for Cell C (if (condition of) the event is fulfilled for a time period, ttt). The UE may be configured to transmit a UE-initiated beam report of Cell C on a Cell D. Cell D could be configured with Cell-level Energy saving and is not in the Cell DRX active period at time period (t3, t4). The UE could suspend (e.g., refrain from) triggering of UE-initiated beam reporting when or in response to Cell D not being in the Cell DRX active period. The UE may not generate a UE-initiated beam report when the Cell D is not in the Cell DRX active period.

For another example, the UE could cancel a triggered UE-initiated beam reporting of a Cell if or when a TA timer associated with a second Cell expires. The UE could be indicated or configured to transmit UE-initiated beam report of the Cell on the second Cell.

For example, the UE could cancel or stop a (triggered or ongoing) UE-initiated beam reporting in response to triggering of a BFR. The UE could cancel or stop a (triggered or ongoing) UE-initiated beam reporting of a first Serving Cell in response to triggering of a BFR of the first Serving Cell. The UE may not cancel or stop a UE-initiated beam reporting of a first Serving Cell in response to triggering of a BFR of a second Serving Cell.

For another example, the UE may not trigger a BFR for a Serving Cell when there is a (triggered or ongoing) UE-initiated beam reporting associated with at least the Serving Cell.

For another example, the UE could (re) start or reset or stop a timer or a counter associated with a UE-initiated beam reporting of (the BWP of) the Cell in response to triggering of a BFR of (the BWP of) the first Serving Cell.

For another example, the UE could (re) start or reset or stop the timer or the counter associated with a UE-initiated beam reporting of (the BWP of) the Cell in response to (successful) completion of a beam failure recovery procedure associated with a triggered BFR of (the BWP of) the first Serving Cell.

For another example, the UE could cancel or stop a (triggered or ongoing) UE-initiated beam reporting in response to a beam change procedure. The UE could cancel or stop a (triggered or ongoing) UE-initiated beam reporting of (a BWP of) a first Serving Cell in response to a beam change procedure of (the BWP of) the first Serving Cell. The UE may not cancel or stop a UE-initiated beam reporting of a first Serving Cell in response to a beam change procedure of a second Serving Cell. The UE may not cancel or stop a UE-initiated beam reporting of a first BWP of the first Serving Cell in response to a beam change procedure of a second BWP of the first Serving Cell.

For another example, the UE could (re) start or reset or stop a timer or a counter associated with UE-initiated beam reporting of (the BWP of) the first Serving Cell in response to a beam change procedure of (the BWP of) the first Serving Cell. The timer or the counter could be used or configured to trigger or prohibit the UE-initiated beam reporting of the Cell.

For another example, the UE may not perform a beam change procedure for a (BWP of a) Serving Cell when there is a (triggered or ongoing) UE-initiated beam reporting associated with at least (the BWP of) the Serving Cell.

For another example, the UE could cancel or stop a (triggered or ongoing) UE-initiated beam reporting in response to (initiation of) a random access procedure. The UE could cancel or stop a (triggered or ongoing) UE-initiated beam reporting of a first Serving Cell (or a first candidate cell) in response to (initiation of) a random access procedure associated with the first Serving Cell (or the first candidate cell). The UE may not cancel or stop a UE-initiated beam reporting of a first Serving Cell (of a first candidate cell) in response to (initiation of) a random access procedure not associated with the first Serving Cell (of a second candidate cell).

For another example, the UE may not initiate a random access procedure (for early UL synchronization) for a Serving Cell (or a candidate cell) when or if (at least) there is a (triggered or ongoing) UE-initiated beam reporting associated with at least the Serving Cell (or the candidate cell).

For another example, the UE could cancel or stop a (triggered or ongoing) UE-initiated beam reporting in response to (initiation of) a MAC reset. The UE could cancel or stop a (triggered or ongoing) UE-initiated beam reporting of a first Serving Cell in response to a MAC reset associated with (a MAC entity of) the first Serving Cell. The UE may not cancel or stop a UE-initiated beam reporting of a first Serving Cell in response to a MAC reset not associated with the first Serving Cell.

For another example, the UE could (re) start or reset or stop a timer or a counter associated with a UE-initiated beam reporting of (the BWP of) the Cell in response to a MAC reset associated with the Cell.

For another example, the UE may not perform a MAC reset associated with a Serving Cell when there is a (triggered or ongoing) UE-initiated beam reporting associated with at least the Serving Cell.

For another example, the UE could cancel or stop a (triggered or ongoing) UE-initiated beam reporting in response to (triggering of) a SCell deactivation. The UE could cancel or stop a (triggered or ongoing) UE-initiated beam reporting of a first Serving Cell in response to deactivation the first Serving Cell (or in response to receiving a deactivation MAC CE for deactivating the first Serving Cell, or in response to expiry of a SCell deactivation timer of the first Serving Cell). The UE may not cancel or stop a UE-initiated beam reporting of a first Serving Cell in response to deactivation of a second Serving Cell.

For another example, the UE could (re) start or reset or stop a timer or a counter associated with a UE-initiated beam reporting of (the BWP of) the Cell in response to (triggering of) a deactivation of the Cell.

For another example, the UE could (re) start or reset or stop a timer or a counter associated with a UE-initiated beam reporting of (the BWP of) the Cell in response to (triggering of) an activation of the Cell.

For another example, the UE could (re) start or reset or stop the timer or the counter associated with a UE-initiated beam reporting of (the BWP of) the Cell in response to (successful) completion of a deactivation of the Cell.

For another example, the UE may not perform deactivation of a Serving Cell when there is a (triggered or ongoing) UE-initiated beam reporting associated with at least the Serving Cell.

For another example, the UE could cancel or stop a (triggered or ongoing) UE-initiated beam reporting of a first Serving Cell in response to receiving an aperiodic CSI report request associated with the first Serving Cell from a network. Alternatively in certain embodiments, the UE may not cancel or stop a (triggered or ongoing) UE-initiated beam reporting of a first Serving Cell when receiving an aperiodic CSI report request associated with the first Serving Cell from a network.

For another example, the UE could cancel or stop a (triggered or ongoing) UE-initiated beam reporting of a first Serving Cell in response to initiation of a reconfiguration with sync procedure, or in response to receiving a reconfiguration with sync message from a network. Alternatively in certain embodiments, the UE may not cancel or stop a (triggered or ongoing) UE-initiated beam reporting of a first Serving Cell in response to initiation of a reconfiguration with sync procedure, or in response to receiving a reconfiguration with sync message from a network (that is not associated with the first Serving Cell).

For another example, the UE could cancel or stop a (triggered or ongoing) UE-initiated beam reporting of a first Serving Cell in response to initiation of an LTM procedure, or in response to receiving an LTM cell switch command MAC CE from a network. Alternatively in certain embodiments, the UE may not cancel or stop a (triggered or ongoing) UE-initiated beam reporting of a first Serving Cell in response to initiation of an LTM procedure, or in response to receiving an LTM cell switch command MAC CE from a network (that is not associated with the first Serving Cell).

Figure 17:
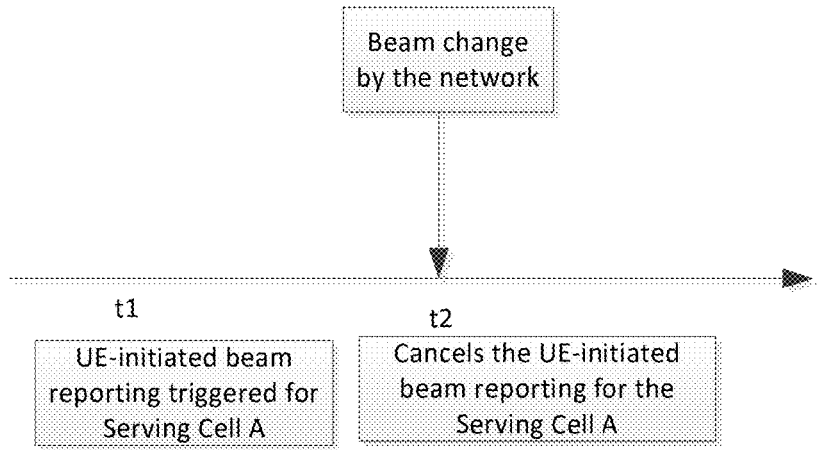
FIG. 17 is an example diagram showing that at timing t1, a UE triggers a UE-initiated beam reporting for a Serving Cell A, in accordance with embodiments of the present invention.

An example is shown in FIG. 17. At timing t1, the UE triggers a UE-initiated beam reporting for a Serving Cell A (e.g., due to current beam quality lower than a threshold). At timing t2, the UE receives a beam change indication associated with the Serving Cell A from a network (e.g., a TCI state activation/deactivation MAC CE or RRC reconfiguration of TCI states). In response to the beam change indication, the UE cancels or stops the triggered UE-initiated beam reporting.

Does not Trigger Report Based on the First Procedure is Ongoing

Additionally and/or alternatively in certain embodiments, the UE could determine whether to trigger or initiate or perform the UE-initiated beam reporting based on at least whether there is an ongoing one or more procedures. The UE may not trigger or initiate or perform the UE-initiated beam reporting for a Serving Cell if or when (at least) there is an ongoing one or more procedures associated with the Serving Cell.

For example, the UE may not (be allowed to) trigger or initiate or perform a UE-initiated beam reporting when or if (at least) there is a triggered (and not cancelled) BFR. The UE may not (be allowed to) trigger a UE-initiated beam reporting of a Serving Cell when or if (at least) there is a triggered (and not cancelled) BFR of the Serving Cell. The UE could trigger a UE-initiated beam reporting of a first Serving Cell if or when (at least) there is no triggered BFR of the first Serving Cell.

For another example, the UE may not trigger or initiate or perform a UE-initiated beam reporting for a Cell when or if (at least) there is an ongoing beam failure recovery procedure associated with the Cell. For example, the UE may not trigger or initiate or perform a UE-initiated beam reporting when the ra-responswindow and/or contention resolution timer is running. The UE could trigger a UE-initiated beam reporting of a first Serving Cell if or when (at least) there is no ongoing beam failure recovery procedure of the first Serving Cell. The ongoing beam failure recovery procedure could include a random access procedure (initiated for beam failure recovery). The ongoing beam failure recovery procedure could include a triggered and not cancelled SR associated with beam failure recovery (e.g., SR triggered for SCell BFR).

Additionally and/or alternatively in certain embodiments, the UE may not trigger or initiate or perform a UE-initiated beam reporting for a Cell when or if (at least) there is an ongoing random access procedure associated with the Cell. Alternatively in certain embodiments, the UE could trigger or initiate or perform a UE-initiated beam reporting for a Cell when or if (at least) an ongoing random access procedure associated with the Cell is not initiated for beam failure recovery.

Additionally and/or alternatively in certain embodiments, the UE may not trigger or initiate or perform a UE-initiated beam reporting for a Cell when or if (at least) there is an ongoing beam change procedure (associated with the Cell). Alternatively in certain embodiments, the UE could trigger or initiate or perform a UE-initiated beam reporting for a Cell when or if (at least) an ongoing beam change procedure is not associated with the Cell.

Additionally and/or alternatively in certain embodiments, the UE may not trigger or initiate or perform a UE-initiated beam reporting for a Cell when or if (at least) there is an ongoing MAC reset procedure (associated with the Cell). Alternatively in certain embodiments, the UE could trigger or initiate or perform a UE-initiated beam reporting for a Cell when or if (at least) an ongoing MAC reset is not associated with the Cell.

Additionally and/or alternatively in certain embodiments, the UE may not trigger or initiate or perform a UE-initiated beam reporting for a Cell when or if (at least) there is an ongoing Serving Cell deactivation procedure (associated with the Cell). Alternatively in certain embodiments, the UE could trigger or initiate or perform a UE-initiated beam reporting for a Cell when or if (at least) an ongoing Serving Cell deactivation procedure is not associated with the Cell.

Additionally and/or alternatively in certain embodiments, the UE may not trigger or initiate or perform a UE-initiated beam reporting for a Cell when or if (at least) there is an ongoing reconfiguration with sync procedure (associated with the Cell). Alternatively in certain embodiments, the UE could trigger or initiate or perform a UE-initiated beam reporting for a Cell when or if (at least) an ongoing reconfiguration with sync procedure is not associated with the Cell (e.g., associated with another Cell group from the Cell).

For another example, the UE may not trigger a UE-initiated beam reporting of a first Serving Cell in response to an ongoing LTM procedure, or in response to receiving an LTM cell switch command MAC CE from a network. Alternatively in certain embodiments, the UE may not trigger a UE-initiated beam reporting of a first Serving Cell in response to an ongoing LTM procedure, or in response to receiving an LTM cell switch command MAC CE from a network (that is not associated with the first Serving Cell).

Figure 18:
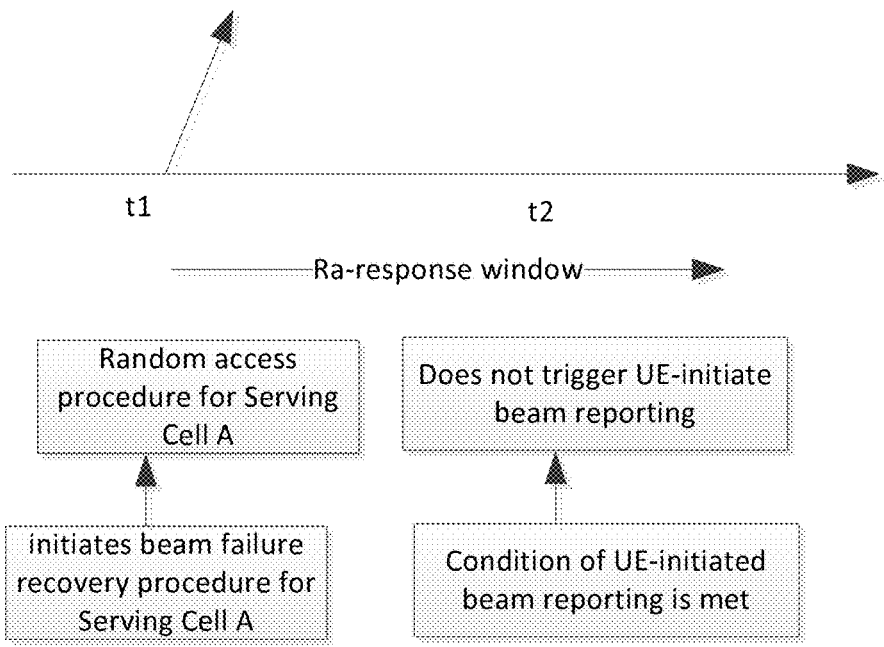
FIG. 18 is an example diagram showing that at timing t1, a UE initiates a beam failure recovery procedure for Serving Cell A (e.g., an SpCell), in accordance with embodiments of the present invention.

An example is shown in FIG. 18. At timing t1, the UE initiates a beam failure recovery procedure for Serving Cell A (e.g., an SpCell). The beam failure recovery procedure could contain/comprise a random access procedure for the Serving Cell A. The UE performs random access preamble transmission to the network in the random access procedure. The UE starts a window/timer (e.g., random access response window) in response to transmission of the preamble. During the window/when the timer is running, a condition of UE-initiated beam reporting (associated with the Serving Cell A) was met at timing t2 (e.g., quality of current activated beam is lower than a threshold and/or candidate beam quality being higher than a threshold). The UE may not initiate or trigger a UE-initiate beam reporting due to the window/timer is running and/or due to there is an ongoing random access procedure (for the Serving Cell A beam failure recovery).

in Parallel

Additionally and/or alternatively in certain embodiments, the UE could perform the UE-initiated beam reporting for a Cell when there is a part of the one or more procedures ongoing. For example, the UE may not cancel or stop the UE-initiated beam reporting associated with a Cell if or when (at least) receiving deactivation indication of the Cell.

Different Handling Based on Different Types of UE-Initiated Beam Reports: For LTM (for Candidate Cell) or for Serving Cell Additionally and/or alternatively in certain embodiments, when or if (at least) there is an ongoing one or more procedures, the UE could determine whether to trigger or initiate or perform the UE-initiated beam reporting based on at least a type or purpose of the UE-initiated beam reporting. For example, the UE could initiate or perform UE-initiated beam reporting for LTM or for the candidate cell when or if (at least) (one of) the one or more procedures is ongoing. For another example, the UE may not perform UE-initiated beam reporting for the Serving Cell(s) when or if (at least) (one of) the one or more procedures is ongoing.

For example, when or if (at least) there is an ongoing one or more procedures (e.g., BFR, beam change procedure, MAC reset or handover or an LTM procedure) the UE could trigger or initiate or perform a UE-initiated beam reporting for an L1 measurement report for LTM or for a candidate cell. When or if (at least) there is an ongoing one or more procedures (e.g., BFR, beam change procedure, MAC reset or handover or an LTM procedure) the UE may not trigger or initiate or perform a UE-initiated beam reporting for a Serving Cell.

Alternatively in certain embodiments, when or if (at least) there is an ongoing one or more procedures (e.g., BFR, beam change procedure, MAC reset or handover or an LTM procedure) the UE may not trigger or initiate or perform a UE-initiated beam reporting for an L1 measurement report for LTM or for a candidate cell. When or if (at least) there is an ongoing one or more procedures (e.g., BFR, beam change procedure, MAC reset or handover or an LTM procedure) the UE could trigger or initiate or perform a UE-initiated beam reporting for a Serving Cell.

Figure 19:
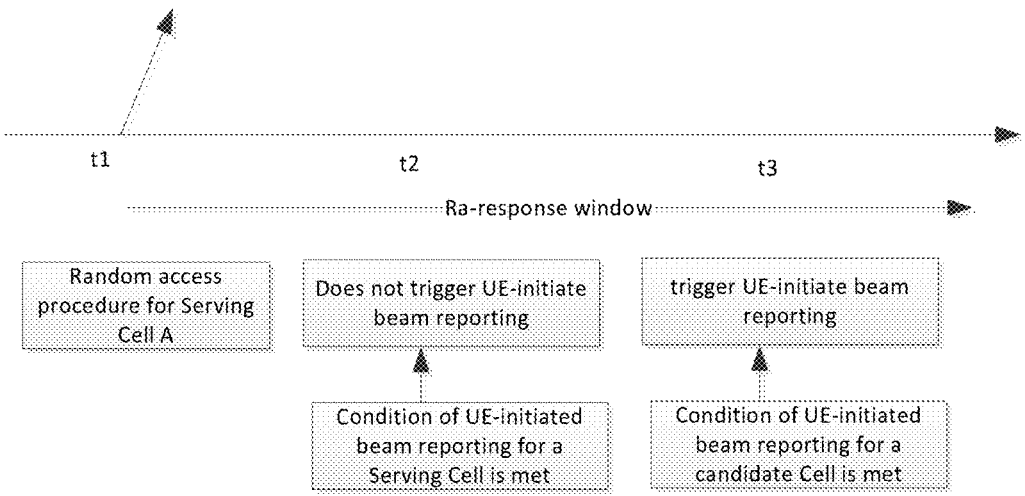
FIG. 19 is an example diagram showing that a UE initiates or performs a random access procedure (e.g., Handover, reconfiguration with sync, or LTM) at timing t1, in accordance with embodiments of the present invention.

An example is shown in FIG. 19. A UE initiates or performs a random access procedure (e.g., Handover, reconfiguration with sync, or LTM) at timing t1. The UE performs a preamble transmission and starts a random access response window. When the window is running at timing t2, a condition for a UE-initiated beam reporting for a Serving Cell is met. The UE does not trigger the UE-initiated beam reporting. At timing t3, a condition for UE-initiated beam reporting for a candidate cell is met, the UE could trigger the UE-initiated beam reporting for the candidate cell when the window is running.

Prioritization Between Different Types of UE-Initiated Beam Reporting

Additionally and/or alternatively in certain embodiments, the UE could determine whether to prioritize a first UE-initiated beam reporting or a second UE-initiated beam reporting based on at least types of the first and the second UE-initiated beam reporting.

A type of a UE-initiated beam reporting could be a reporting for a candidate cell or LTM. A type of a UE-initiated beam reporting could be a reporting for a Serving Cell.

For example, the UE could prioritize a first UE-initiated beam reporting associated with or in response to a candidate cell (or LTM) over a second UE-initiated beam reporting associated with a Serving Cell.

Alternatively in certain embodiments, the UE could prioritize a first UE-initiated beam reporting associated with or in response to a Serving Cell over a second UE-initiated beam reporting associated with a candidate cell (or LTM).

Additionally and/or alternatively in certain embodiments, the UE could be configured with a priority associated with (prioritization of) UE-initiated beam reporting. For example, a network could configure the UE to prioritize UE-initiated beam reporting for the Serving Cell (over the candidate cell), or the network could configure the UE to prioritize UE-initiated beam reporting for the candidate Cell (over the Serving cell). Alternatively in certain embodiments, each of measurement object (e.g., Serving Cell, candidate cell) could be configured with priority for UE-initiated beam reporting.

Various examples and embodiments of the present invention are described below. For the methods, alternatives, concepts, examples, and embodiments detailed above and herein, the following aspects and embodiments are possible.

A UE-initiated beam reporting could be a CSI reporting. A UE-initiated beam reporting could be an event-driven beam reporting.

A UE-initiated beam reporting (procedure) of a Cell could contain/comprise measuring (RS on) the Cell. The UE-initiated beam reporting (procedure) of the Cell could contain/comprise determining a beam quality of the Cell fulfilled one or more events associated with (measurement objects of) the Cell (for a period of time). The UE-initiated beam reporting could contain/comprise triggering a UE-initiated beam reporting when one or more events have been fulfilled for a period of time (alternatively in certain embodiments, the UE could trigger a UE-initiated beam reporting (at once) when (condition of) one or more events have been fulfilled).

A measurement object associated with a UE-initiated beam reporting could be associated with a Cell and/or a $T_{CI}$ state or beam associated with the Cell. The measurement object could be configured with or be associated with an event.

The UE-initiated beam reporting could be triggered or initiated in response to one or more condition(s) being met.

The one or more condition(s) could contain/comprise condition(s) associated with beam quality. For example, a condition could be the quality of a (currently) activated beam being lower than or equal to a threshold. Additionally and/or alternatively in certain embodiments, a condition could be the quality of a candidate beam being higher than or equal to a threshold. The one or more conditions could be associated with or based on measurement report triggering event.

Additionally and/or alternatively in certain embodiments, the condition could contain/comprise a candidate beam quality being higher hand or equal to a (currently) activated beam quality (for a period of time, e.g., timeToTrigger).

The UE-initiated beam reporting could contain/comprise determining whether to trigger the reporting based on at least measured beam quality.

The condition could be associated with a (configured) event.

An event could be the quality of a new (measured) beam of a Cell is a threshold value better than a current beam.

An event could be the quality of a current beam is lower than a threshold.

An event could be the quality of a new (measured) beam of a Cell is better than a threshold (+ an offset).

An event could be associated with an eventId in EventTriggerConfig.

Preferably in certain embodiments, the current beam corresponds to an RS in an indicated TCI state which corresponds to Quasi Co-Location (QCL) type-D.

Preferably in certain embodiments, the current beam corresponds to a Synchronization Signal Block (SSB) associated with an RS in an indicated TCI state which corresponds to QCL type-D.

Preferably in certain embodiments, the current beam corresponds to an RS in an activated TCI state which corresponds to QCL type-D (with worst beam quality or best beam quality among more than one activated TCI states).

Preferably in certain embodiments, the more than one activated TCI state is activated by a TCI state (de) activation MAC CE.

Preferably in certain embodiments, an indicated TCI state or activated TCI corresponds to DL or joint TCI state. The beam quality could include RSRP, Reference Signal Received Quality (RSRQ), Received Signal Strength Indicator (RSSI), and/or Signal-To-Interference Plus Noise Ratio (SINR) associated with a beam.

A UE-initiated beam reporting could contain/comprise a trigger (of the reporting).

The UE-initiated beam reporting could contain/comprise triggering and/or transmitting an SR.

The UE-initiated beam reporting could contain/comprise initiating a random access (RA) procedure.

UE-initiated beam reporting could contain/comprise assembling a beam report (e.g., the beam report could be MAC CE and/or an RRC message and/or a PUCCH signal).

The UE-initiated beam reporting could contain/comprise transmitting a beam report to a network.

The UE-initiated beam reporting could be initiated and/or configured for a Serving Cell. Additionally and/or alternatively in certain embodiments, the UE-initiated beam reporting could be initiated and/or configured for a candidate cell or a non-Serving Cell.

The UE-initiated beam reporting could be an event-triggered L1 measurement reporting associated with LTM. Alternatively in certain embodiments, the UE-initiated beam reporting may not be associated with LTM (and/or could be associated with a Serving Cell).

The UE-initiated beam reporting could contain/comprise cancelling a trigger of the beam reporting.

The UE-initiated beam reporting of a Cell could contain/comprise performing measurements for (BWP of) the Cell. The UE-initiated beam reporting could contain/comprise a trigger of the UE-initiated beam reporting. The UE-initiated beam reporting could contain/comprise generating and/or transmitting a UE-initiated beam report (associated with at least the Cell).

The UE could cancel the UE-initiated beam reporting in response to an initiation of the one or more procedures.

The UE could cancel the UE-initiated beam reporting in response to an acknowledgement of the beam report from the network. The acknowledgement could be a UL grant for new transmission associated with a Hybrid Automatic Repeat Request (HARQ) process used to transmit the beam report. The acknowledgement could be a beam activation/deactivation MAC CE. Additionally and/or alternatively in certain embodiments, the UE could cancel the UE-initiated beam reporting (associated with a Cell) in response to transmitting the corresponding UE-initiated beam report (reporting information associated with the Cell).

When cancelling or stopping a UE-initiated beam reporting, the UE could stop corresponding procedure(s) contained in the UE-initiated beam reporting (mentioned above).

When cancelling or stopping a UE-initiated beam reporting, the UE could stop or restart a timer for calculating or determining whether to trigger a UE-initiated beam reporting (e.g., a timeToTrigger-like timer).

The cancellation or stopping of the UE-initiated beam reporting could contain/comprise stopping the random access procedure. Additionally and/or alternatively in certain embodiments, the cancellation or stopping of the UE-initiated beam reporting could contain/comprise stopping one or more timers associated with the UE-initiated beam reporting (e.g., timeToTrigger for the beam reporting or timers associated with the random access procedures and/or associated with the SR).

The cancellation or stopping of the UE-initiated beam reporting of a Cell could contain/comprise not including or reporting (beam) information associated with the Cell in a UE-initiated beam report. The cancellation or stopping of the UE-initiated beam reporting of a Cell could contain/comprise (re)starting or resetting or stopping a timer or a counter associated with UE-initiated beam reporting of the Cell.

The timer or the counter could be used or configured to trigger or prohibit the UE-initiated beam reporting of the Cell. The timer or the counter could be used to judge or detect whether an event is fulfilled within a time period. The event could be considered to be fulfilled if or when, for example, a quality of a new beam is greater than or equal to a quality of a current beam plus a threshold. The event could be considered to be fulfilled, or a UE-initiated beam reporting could be triggered if or when a number of instances is greater than or equal to a threshold in the time period. The instance could be associated with a quality of a new beam or candidate beam and/or a quality of a current beam/indicated beam. For example, an instance could be indicated by a physical layer of the UE if or when the quality of a new beam is larger than or equal to the quality of a current beam plus a threshold. The counter could be maintained for a Cell and/or for a new beam, candidate beam, or current beam.

The UE could be configured with a measurement object(s) associated with the UE-initiated beam reporting.

A measurement object could contain/comprise a Serving Cell and/or a non-serving cell.

A measurement object could be associated with SSB and/or Channel State Information Reference Signal (CSI-RS) associated with the Serving Cell and/or the non-Serving Cell.

To prioritize a UE-initiated beam reporting over one or more procedures, the UE stops the procedure and continues the reporting.

To prioritize a first one or more procedures over a UE-initiated beam reporting, the UE stops/cancels the reporting and continues the one or more procedures.

The reporting and the first one or more procedures could be overlapped in time domain.

The reporting and the procedure could be associated with a same serving cell and/or a same MAC entity and/or a same Cell group (e.g., Master Cell Group (MCG) or SCG).

The beams could be replaced by or referred to as SSB, CSI-RS, and/or (DL or UL) TCI states.

The Cell could be a Serving Cell, candidate cell, and/or a neighboring cell.

A candidate cell could be an LTM candidate Cell. A neighboring cell could be a cell associated with a measurement object. The candidate cell and the neighboring cell are not Serving Cells.

A UE-initiated beam report (generated in response to a UE-initiated beam reporting) could be a PUCCH signaling and/or a MAC CE and/or Uplink Control Information (UCI) on PUSCH. The UE-initiated beam report could indicate at least one of measurement object(s) associated with the UE-initiated beam reporting or the associated Cell.

Regarding a container carrying the UE-initiated report, basically MAC CE or UCI could be considered. The MAC CE may have latency due to the need of an UL grant for transmitting the MAC CE. On the other hand, the UCI may require a network node to configure a plurality of periodic UL resources for transmission. However, only part of them will be used by the UE for transmitting the UE-initiated report (i.e., when a condition of an event is met). In order to solve this issue, a Pre-Notification (PN) could be used to indicate at least usage of future one or more periodic UL resources associated with the UE-initiated report. Depending on whether to transmit the UE-initiated report on a periodic UL resource or whether to trigger the UE-initiated report or whether there is a pending UE-initiated report, the UE determines whether to transmit the PN and/or sets the PN to indicate usage of a periodic UL resource. In one example, when the UE-initiated report is not triggered or the UE will not transmit the UE-initiated report using a periodic UL resource or there is not a pending UE-initiated report, the UE could skip transmitting the PN and/or the UE does not use the periodic UL resource. Typically, one PN could be a sequence-based signal to indicate usage of future one or more periodic UL resources. In one example, the sequence-based signal could be Sounding Reference Signal (SRS) or SR or PUCCH format 0 with different cyclic shift mapping to "used" or "not used" in an example. If there is a need to carry more information in addition to used/not used, PUCCH format 0 with more cyclic shifts or other PUCCH formats (e.g., PUCCH format 1, 2, 3, or 4) could be considered. Although the PN could be transmitted along with UL resource for the UE-initiated report similar to Configured Grant Uplink Control Information (CG-UCI) on a PUSCH which the CG-UCI indicating usage of future CG PUSCH resources, it may not be useful due to the triggering being more dynamic instead rather than a periodic manner. The PN could be considered to be transmitted along with a same Transmission Time Interval (TTI) as the UL resource. The PN could be transmitted in different Orthogonal Frequency-Division Multiplexing (OFDM) symbols as the UL resource. A set of contiguous OFDM symbols in a TTI could be used as the PN area for carrying the PN (e.g., 1-st and/or 2-nd symbol in a TTI (e.g., symbol 0 and symbol 1 in a slot)). The PN area may be shared to a plurality of UEs. Alternatively in certain embodiments, the PN area could be dedicated to a UE. Alternatively in certain embodiments, one or more PNs are dedicated to the UE. Alternatively in certain embodiments, a second one or more PNs are common to the UE. Typically, in order to have better resource efficiency in a network node, a time gap or limitation between the PN and the corresponding UL resource needs to be adopted. The time gap or limitation is used to guarantee the network node has enough time for switching and/or for other usage.

With introduction of the UEI report, there are two modes for resource allocation for the UEI report. Mode A corresponds to dynamic scheduling while mode B corresponds to a (pre-)configured resource for transmitting the UEI report.

For mode A, the UE will transmit a scheduling request to the network node. After the transmission of the scheduling request, the UE monitors Downlink Control Information (DCI) with scheduling information (and/or with a request for a pending UEI report). The UE transmits the UEI report on the resource scheduled by the DCI.

For mode B, one PN would be used to notify usage of (pre-)configured resources which could enhance resource efficiency when deploying more (pre-)configured resources for latency reduction. Typically, the PN resource and (pre-)configured resources are configured in a different instance/timing/TTI. Alternatively in certain embodiments, the PN resource and (pre-)configured resources are configured in the same instance/timing/TTI. Once a condition of an event is fulfilled, the UE triggers the event and/or the UE triggers to transmit a UEI report.

Before the UE transmits the UEI report, the UEI report is pending. Before the UE cancels the triggering of the event, the UEI report is pending. Before the UE receives a response from the network node, the UEI report is pending. Before the end of a latency bound of the event, the UEI report is pending.

For a pending UEI report, for mode A, the UE will determine or select a valid resource. The UE will transmit a scheduling request on the determined/selected resource. The UE will monitor DCI with scheduling information (and/or with a request for the pending UEI report). The DCI could indicate the request is used for requesting a UEI report or a network node triggered report. One code-point in a bit field could be used to indicate whether the request is used for requesting the UEI report or the network node triggered report. The bit field could be a CSI request. Based on the code-point of the bit field, the UE could determine whether the DCI requests for the network node triggered report or UEI report. If the UE has pending more than one UEI report, once the UE receives the DCI, the UE determines one UEI report among the more than one UEI report. Alternatively in certain embodiments, the UE could multiplex the more than one UEI report (if resource scheduled by the DCI with an accommodate code rate could accommodate the more than one UEI report).

For a pending UEI report, for mode B, the UE will determine or select a valid PN resource and/or valid (pre-)configured resource for transmitting the UEI report. The UE will transmit the PN on the determined/selected PN resource and transmit the pending UEI report on the determined/selected (pre-)configured resource.

For mode B, due to a different time instance between a PN resource and a (pre-)configured resource for transmitting the UEI report, there may be a general issue that once the UE changes the characteristic during the PN resource and the (pre-)configured resource for transmitting the UEI report or the UE change characteristic for the PN and the UEI report and the mapping of the PN and the (pre-)configured resource will disappear. In order to make an aligned understanding between a UE and a network node when a PN is transmitted, it needs further design.

Concept

This concept is to design handling of a PN and a UEI report when the UE detects one or more specific events. the PN and UEI report are associated with one or more events associated with UE triggered beam management.

The one or more specific events correspond to:
DL/UL BWP change indicated or triggered by a network node or UE,
Activated cell DTX/DRX with inactive time overlapping with the PN or UEI report,
Updating/changing of Activated beam is received,
Activated beam is applied,
Updating/changing of Indicated beam is received,
Indicated beam is applied,
Transmitting HARQ in response to receiving a DL signal for updating/changing of an activated beam,
Transmitting HARQ in response to receiving a DL signal for indicating updating/changing an indicated beam,
Candidate beam is changed or activated or reconfigured,
Serving cell, with a configured resource for the PN and/or resource for the UEI report, are deactivated,
Resource for the PN and/or resource for the UEI report is reconfigured,
Serving cell, with configured resource for the PN and/or resource for the UEI report, are switched or changed from a first serving cell to a second serving cell,
Request from a network node for a report (e.g., Next Generation Node B (gNB) requested beam report),
Overlapping with a timing for transmitting a network based report, and/or
UL cancellation according to a UE-specific signal (e.g., dynamic schedule DCI) or group common signal (e.g., DCI format 2_4).

Preferably in certain embodiments, one method is that a UE does not expect to receive a configuration associated with the one or more specific events and the UEI report.

Figure 23:
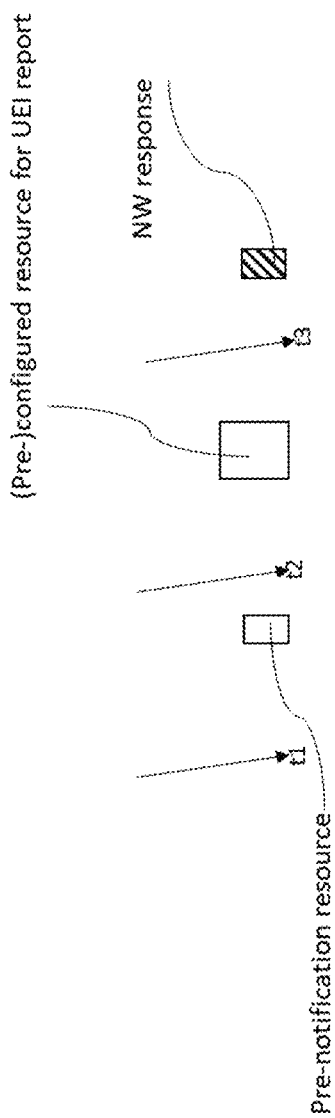
FIG. 23 is an example diagram showing a method mainly targeting a solution for the one or more specific events exist/happen/trigger in or overlapping with timing t1, in accordance with embodiments of the present invention.

Preferably in certain embodiments, a possible method could be illustrated below (e.g., mainly targeting a solution for the one or more specific events exist/happen/trigger in or overlapping with timing t1 in FIG. 23):

Before a UE transmits a PN for a UEI report (or should before a UE transmits a PN for a UEI report with a time offset), the UE determines whether a PN resource and/or resource for the UEI report is valid or not.

Before a UE transmits a PN for a UEI report (or should before a UE transmits a PN for a UEI report with a time offset), the UE determines whether a bundle of PN resources and/or resources for a UEI report overlap with a timing or resource or report associated with one or more specific events.

Before a UE transmits a PN for a UEI report (or should before a UE transmits a PN for a UEI report with a time offset), the UE does not determine a PN resource and/or resource for a UEI report when a bundle of PN resources and resources for a UEI report overlap with a timing or resource or report associated with one or more specific events.

Before a UE transmits a PN for a UEI report (or should before a UE transmits a PN for a UEI report with a time offset), the UE does not determine a PN resource and/or resource for a UEI report when at least one of a PN resource or a resource for a UEI report overlaps with a timing or resource or report associated with one or more specific events.

Before a UE transmits a PN for a UEI report (or should before a UE transmits a PN for a UEI report with a time offset), the UE determines a second PN resource and/or second resource for a UEI report when at least one of a first PN resource or a first resource for a UEI report overlaps with a timing or resource or report associated with one or more specific events. Preferably in certain embodiments, the second PN resource and/or the second resource for the UEI report is without overlapping with the timing or resource or report associated with one or more specific events. Preferably in certain embodiments, the second PN resource and/or the second resource for the UEI report is at or after the one or more specific events finished or being cancelled.

Preferably in certain embodiments, a possible method could be illustrated below (e.g., mainly a targeting solution for the one or more specific events existing/happening/triggering in or overlapping with timing t2 in FIG. 23):

A UE transmits a PN for a UEI report, and after the PN transmission (and before transmission of the UEI report), the UE does not expect the one or more specific events to happen.

A UE transmits a PN for a UEI report, and after the PN transmission (and before transmission of the UEI report), the UE assumes there is no one or more specific events happening.

A UE transmits a PN for a UEI report, and after the PN transmission (and before transmission of the UEI report), the UE suspends triggering of one or more specific events.

A UE transmits a PN for a UEI report, and after the PN transmission (and before transmission of the UEI report), the PN transmission will delay the triggering of one or more specific events A UE transmits a PN for a UEI report, and after the PN transmission (and before transmission of the UEI report), the UE prioritizes to transmit the UEI report (over one or more specific events or reports associated with one or more specific events).

A UE transmits a PN for a UEI report, and after the PN transmission (and before transmission of the UEI report), the UE determines to maintain validation (due to the PN transmission) for the UEI report transmission.

A UE transmits a PN for a UEI report, and after the PN transmission (and before transmission of the UEI report), the UE keeps the UEI report pending.

A UE transmits a PN for a UEI report, and after the PN transmission (and before transmission of the UEI report), the UE determines a later valid PN resource and valid resource for the UEI report.

A UE transmits a PN for a UEI report, and after the PN transmission (and before transmission of the UEI report), the UE cancels the triggered event and/or the UE cancels or clears the UEI report.

A UE transmits a PN for a UEI report, and after the PN transmission (and before transmission of the UEI report), the UE does not cancel the transmission of the UEI report or keep the transmission of the UEI report on a corresponding resource for the UEI report.

A UE transmits a PN for a UEI report, and after the PN transmission (and before transmission of the UEI report), the UE changes a mode associated with the UEI report from mode-B to mode-A (after the one or more specific events within a window). Preferably in certain embodiments, the window is referenced to a timing of one or more specific events. Preferably in certain embodiments, the window is referenced to a timing of finishing or completing or cancelling of one or more specific events.

A UE transmits a PN for a UEI report, and after the PN transmission (and before transmission of the UEI report), the UE expects to receive a DL signal from a network node to request a pending UEI report (after the one or more specific events).

Preferably in certain embodiments, a possible method could be illustrated below (e.g., mainly targeting a solution for the one or more specific events existing/happening/triggering in or overlapping with timing t3 in FIG. 23):

After a UE transmits a UEI report (or after a UE transmits a UEI report with a time offset), the UE does not expect that one of the one or more specific events happens before a duration (e.g., the duration starts with or without an offset referenced to the timing of transmitting the UEI report, and/or the duration is use for monitoring a Network (NW) response).

After a UE transmits a UEI report (or after a UE transmits a UEI report with a time offset), the UE delays the triggering of the one of the one or more specific events.

After a UE transmits a UEI report (or after a UE transmits a UEI report with a time offset), the UE assumes that one of the one or more specific events does not happen until an end of a duration or the UE receives a network node response.

After a UE transmits a UEI report (or after a UE transmits a UEI report with a time offset), the UE cancels triggering of the one of the one or more specific events.

After a UE transmits a UEI report (or after a UE transmits a UEI report with a time offset), the UE suspends triggering one or more specific events (until receiving a network node response of the UEI report).

After a UE transmits a UEI report (or after a UE transmits a UEI report with a time offset), the UE determines that the one or more specific events is dynamically indicated by the network node as a network node response.

After a UE transmits a UEI report (or after a UE transmits a UEI report with a time offset), the UE prioritizes to handle the one or more specific events and/or deprioritizes to the monitor NW response.

Once the UE transmits a UEI report on a (pre-)configured resource, the UE will attempt to detect a network node response. The network node response will be an explicit signal. Preferably in certain embodiments, the explicit signal will be an activation signal or an indication signal to change or update or indicate a new current beam or a new candidate beam. Preferably in certain embodiments, the new candidate beam or new current beam is associated with the UEI report or the reported event (in the UEI report). Preferably in certain embodiments, the explicit signal could be an event based signal. Preferably in certain embodiments, once the UE transmits the UEI report, the UE monitors the signal. Preferably in certain embodiments, when the UE does not transmit the UEI report, the UE does not monitor the signal. Preferably in certain embodiments, the UE could be configured with a search space for monitoring the signal. Preferably in certain embodiments, the signal could be a UEI search space (in addition to a BFR search space). Alternatively in certain embodiments, once the UE transmits the UEI report, the UE monitors the signal in the BFR search space (which is adding a new purpose via the BFR search space). Preferably in certain embodiments, the signal is with Cyclic Redundancy Check (CRC) scrambled by Cell Radio Network Temporary Identifier (C-RNTI) (or Configured Scheduling Radio Network Temporary Identifier (CS-RNTI) or Modulation and Coding Scheme Radio Network Temporary Identifier (MCS-RNTI), or UE-dedicated RNTI). Preferably in certain embodiments, when something different than a BFR procedure is ongoing, the UE monitors the signal based on a current indicated TCI state. Preferably in certain embodiments, the current indicated TCI state means or corresponds for monitoring a (UE-specific) DL channel/signal. Preferably in certain embodiments, if the BFR search space or the UEI search space is associated with Control Resource Set (CORESET) 0 or a CORESET not followed unified TCI state, the UE monitors the signal on the BFR search space or the UEI search space based on a TCI state associated with CORESET 0 or a CORESET not followed unified TCI state. More specifically, the TCI state will be activated and/or indicated by a MAC CE. Preferably in certain embodiments, the UE will monitor the signal for a duration. Preferably in certain embodiments, the duration is configured by a network node. Preferably in certain embodiments, the UE will stop monitoring the signal once exceeding the duration or the UE receives the signal. Preferably in certain embodiments, if the UE does not detect the signal (during the duration), the UE will retransmit the UEI report (if latency requirement of the UEI report is also satisfied). Preferably in certain embodiments, for retransmission of the UEI report, the UE will increase the transmit power for retransmission of the UEI report.

The UE could transmit a PN via a first resource for the PN and transmit a UEI report via a first resource for the UEI report, wherein the first resource for the UEI report is associated with the PN or the first resource for the PN. After transmitting the UEI report, the UE may receive a network node response, for the UEI report, e.g. indicating Negative Acknowledgement (NACK) or unsuccessful transmission/reception. In response to the network node response, the UE could retransmit the UEI report via a second resource for the UEI report. Or the UE could trigger and transmit a second UEI report via the second resource for the UEI report (associated with a triggered and not canceled event). The second resource for the UEI report could be associated with a second resource for the PN. The UE may not need to perform transmission of a second PN via the second resource for the PN (in response to the network node response). Preferably in certain embodiments, a network node response could provide an interval comprising a number of closest resources for UEI (associated with a pending event). Preferably in certain embodiments, a network node response could provide a number of (later/future) closest resources for UEI (associated with pending event). Preferably in certain embodiments, based on an indication of the network node response, the UE could trigger and transmit a second UEI report via the second resource for the UEI report (associated with a triggered and not canceled event). In other words, the UE could skip the transmission of the second PN via the second resource for the PN (in response to the network node response).

The second resource for the UEI report could be the closest resource for the UEI report (configured for the UE) after a timing of receiving the network node response (plus a time offset). The first resource for UEI and the second resource for UEI could be in the same frequency (e.g. fully overlapped in frequency domain). (Time domain allocation and/or frequency domain allocation of) the second resource for the UEI report could be indicated by the network node response.

The network node response could be transmitted via a PDCCH.

Alternatively in certain embodiments, a network node response (indicating NACK or unsuccessful transmission/reception) may block one or more PN resources and/or (pre-)configured resources for the UEI report. Preferably in certain embodiments, once the UE receives a network node response, the UE would determine that mode-B changing to mode-A, and/or the UE assumes a time interval that the UE is not allowed to transmit the PN and/or the UEI report on the (pre-)configured resource. Alternatively in certain embodiments, the UE will receive indication from a network node changing from mode-A to mode-B. Preferably in certain embodiments, before receiving indication from the network node changing from mode-A to mode-B, the UE assumes the PN resource and/or the resource for the UEI report is not available for transmission. Preferably in certain embodiments, if during the time interval or if before receiving indication from the network node changing from mode-A to mode-B, once the UE triggers an event, the UE transmits a scheduling request to the network node and monitors a DCI scheduling resource for transmitting the UEI report. Preferably in certain embodiments, length of the time interval is (pre-)configured or (pre-) defined. Preferably in certain embodiments, the block of one or more PN resources and/or (pre-)configured resources for the UEI report due to the network node response is per event, per BWP, per serving cell, per cell group, per PUCCH group, or per intra-frequency band. Preferably in certain embodiments, for the PN resource and/or (pre-)configured resource for the UEI report associated with a different event or different BWP, a different serving cell, a different cell group, a different PUCCH group, an inter-frequency band, the block due to the network node response does not impact. Preferably in certain embodiments, after the time interval, the UE will change mode-A to mode-B.

Preferably in certain embodiments, the signal will indicate whether to increase transmit power for retransmission of the UEI report. Preferably in certain embodiments, the retransmission is a changed mode from mode-B to mode-A. Alternatively in certain embodiments, the UE will autonomously perform retransmission of the UEI report. Preferably in certain embodiments, the UE (re)transmits the UEI report on a next (pre-)configured resource for transmitting the UEI report. Preferably in certain embodiments, when the UE transmits the PN and does not or cannot transmit the UEI report (due to the one or more specific events), the UE will monitor the network node's DCI for a scheduling resource for retransmission of the UEI report. Alternatively in certain embodiments, the UE will (re)transmit the UEI report on a next/future (pre-)configured resource for the UEI report. Preferably in certain embodiments, the UE will transmit the next PN associated with the next/future (pre-)configured resource for the UEI report. Preferably in certain embodiments, the UE can skip transmitting the PN associated with the next/future (pre-)configured resource (directly). Alternatively in certain embodiments, the UE can skip transmitting the PN associated with the next/future (pre-)configured resource. Preferably in certain embodiments, (instead), the PN or granting is given by the network node's indication. Preferably in certain embodiments, as the network node receives the PN wand without receiving the UEI report, the network node could (directly) indicate (re)transmission of the UEI report on the (pre-)configured resource. Preferably in certain embodiments, a signaling detail could be to reuse dynamic DCI scheduling or using an indicator for indicating one or more (pre-)configured resources for retransmission of the UEI report.

Preferably in certain embodiments, the UE cancels the triggered event when the UE receives the network node response.

Preferably in certain embodiments, the UE cancels the triggered event in response to the end of a duration. Preferably in certain embodiments, the duration is used to implicitly cancel the triggered event (when the UE does not receive the network node response). Preferably in certain embodiments, the duration is with or without an offset starting from the timing or the next symbol or the next slot of the (pre-)configured resource for transmitting the UEI report.

Preferably in certain embodiments, once the UE receives the signal, the UE could determine the network node has received the UEI report. The network node response will be an indication (e.g., one bit in DCI indicating received). The network node response will be a group common signal. Alternatively in certain embodiments, the network node response will be a UE-specific signal. Preferably in certain embodiments, the network node response will be a DCI with or without (DL/UL) scheduling information. Preferably in certain embodiments, the UE could be configured with a group common RNTI to monitor the network node response. Preferably in certain embodiments, the explicit signal will be CRC scrambled by the group common RNTI (dedicated for the UEI report). Preferably in certain embodiments, the UE could be configured with one or more starting positions to indicate an information block. Preferably in certain embodiments, each information block is associated with one PN resource and/or one (pre-)configured resource for transmitting the UEI report. Preferably in certain embodiments, grouping may happen such that one information block is associated with one or more PN resources and/or one or more (pre-)configured resources for transmitting the UEI report. Preferably in certain embodiments, based on the information block associated with the resource for the (already) transmitted UEI report, the UE could determine whether the network node has received or not and/or the UE needs to retransmit or not. Alternatively in certain embodiments, once the UE transmits the UEI report, the network node response is not needed, and/or the UE does not retransmit the UEI report. Unless the resource (pre-)configured with or associated with a repetition number or aggregation factor, the UE does not perform retransmission on the UEI report. Preferably in certain embodiments, the UE does not expect to be configured with both a repetition number for the resource associated with UEI report. Preferably in certain embodiments, when a UL BWP is configured or associated with an aggregation factor (being larger than 1), the UE assumes no repetition for the resource for transmitting the UEI report. Preferably in certain embodiments, no matter whether the aggregation factor is larger than 1, the UE assumes no aggregation for the resource for transmitting the UEI report. Preferably in certain embodiments, the UE does not expect that the aggregation factor configured in a UL BWP for transmitting the UEI report will be larger than 1. Preferably in certain embodiments, the UE does not expect that the repetition number associated with the resource for transmitting the UEI report will be larger than 1. Alternatively in certain embodiments, the UE could determine the number of resources, according to the repetition or the number of the aggregation factor, for transmitting the UEI report. Preferably in certain embodiments, one PN resource is associated with one (pre-)configured resource. Preferably in certain embodiments, when repetition or aggregation is applied or assumed (e.g., larger than 1), the UE may transmit more than one PN resource for notifying the network node. Alternatively in certain embodiments, the UE may transmit one PN resource associated with one (pre-)configured resource. Preferably in certain embodiments, the remaining number of resources, according to the repetition minus one or the aggregation factor minus one, follow the one (pre-)configured resource. Preferably in certain embodiments, the remaining number of resources are associated with the same format and the same number of starting and number of symbols and Physical Resource Blocks (PRBs) and the one (pre-)configured resource. Preferably in certain embodiments, the remaining number of resources, according to the repetition number minus one or the aggregation factor minus one, is determined based on future available (consecutive) TTIs. Preferably in certain embodiments, the future available (consecutive) TTIs are at least configured with symbols and/or PRBs as flexible or UL for determining the same format of the one (pre-)configured resource. Preferably in certain embodiments, the UE will transmit the UEI report on the one (pre-)configured resource and on the remaining number of resources. Alternatively in certain embodiments, the UE will transmit the UEI report on up to the number of the aggregation factor or repetition number. Preferably in certain embodiments, one PN resource is associated with a number of (pre-)configured resources. Preferably in certain embodiments, the number of (pre-)configured resources associated with one PN resource are used for repetition or aggregation. Preferably in certain embodiments, the number of (pre-)configured resources are in a different TTI. Preferably in certain embodiments, the number of (pre-)configured resources are with the same (PUCCH) format.

A first method is that a UE transmits a PN for a UEI report, and after the PN transmission, the UE does not expect to receive a BWP switch command from a network node. In one example, resources of both the PN and UEI report could be determined as a bundle. Preferably in certain embodiments, within/during the bundle, the UE does not expect to receive the BWP switch command from the network node. Preferably in certain embodiments, each bundle of resources for the PN and UEI report is configured per BWP. Preferably in certain embodiments, during a time period referenced to the PN transmission, the UE does not expect to receive the BWP switch command from a network node. Preferably in certain embodiments, the time period ends when or in response to the UE transmitting the UEI report. Preferably in certain embodiments, the time period may start from an end of the PN transmission. Preferably in certain embodiments, the time period may start from the next symbol after the PN transmission. Preferably in certain embodiments, the time period may start with an offset after the PN transmission. Preferably in certain embodiments, the offset may correspond to round trip time, and/or the network node's processing time. Preferably in certain embodiments, the UE may receive the BWP switch command within the offset. Preferably in certain embodiments, a value of the offset may be configured or pre-defined. Preferably in certain embodiments, value of the offset may be the same or different between different events. Preferably in certain embodiments, for a same serving cell, a same UL BWP, a same frequency band, a same cell group, the UE expects to be configured with a same offset value or uses or determines a same value of offset. Preferably in certain embodiments, one UEI report is triggered in response to one event. Preferably in certain embodiments, the UE may multiplex one or more UEI reports to transmit in one time instance once there is more than one event triggered (and not cancelled). Preferably in certain embodiments, once the UE receives a BWP switch command during the PN and UEI report (e.g., t1 refers to the PN transmission, t2 refers to the BWP switch command reception, and t3 refers to the UEI report transmission, and t1 is before t2 and t2 is before t3), the UE does not cancel the triggered event. Preferably in certain embodiments, the UE maintains a timer per (DL) BWP. Preferably in certain embodiments, the timer corresponds to bwp-InactivityTimer. Preferably in certain embodiments, the UE starts or restarts the timer (of the DL BWP) when at least receiving PDCCH, addressed to C-RNTI or CS-RNTI indicating downlink assignment or uplink grant, in the BWP. Preferably in certain embodiments, the UE starts or restarts the timer when at least receiving PDCCH addressed to C-RNTI or CS-RNTI scheduling downlink assignment or uplink grant for the BWP. Preferably in certain embodiments, the UE switches active BWP once the timer expires. More specifically, the UE changes active DL BWP to a default DL BWP (which serves mainly for power saving purpose). Preferably in certain embodiments, due to the UEI report being initiated by UE, the UE may face whether to switch active BWP change or transmits the PN and UEI report. Preferably in certain embodiments, the UE may determine whether to change the active BWP due to the timer expiring based on at least whether there is a triggered event (and not cancelled). Preferably in certain embodiments, the UE may determine whether to change the active BWP due to the timer expiring based on at least whether the UE has transmitted one PN and yet transmitted the UEI report. Preferably in certain embodiments, based on the determination that there is a triggered event (and not cancelled), the UE may delay to switch change the active BWP (due to the timer expiration). Preferably in certain embodiments, based on the determination that there is no triggered event (or the triggered event has been cancelled), the UE switches the active BWP (due to the timer expires). Preferably in certain embodiments, based on the determination that the UE has transmitted one PN and yet transmitted the UEI report, the UE may delay to switch change the active BWP (due to the timer expiration). Preferably in certain embodiments, based on the determination that the UE has NOT transmitted one PN or has transmitted the UEI report, the UE does not delay to switch change the active BWP (due to the timer expiration). Preferably in certain embodiments, based on the above, the UE delays to switch the active BWP at least to the timing that the UE transmits the UEI report. Preferably in certain embodiments, the UEI report and PN are (pre-)configured resources. Preferably in certain embodiments, the UE is configured or operates in Mode-B (transmitting the UEI report via the (pre-)configured resource). Preferably in certain embodiments, the UE may suspend the timer or NOT switch the active BWP before transmitting the UEI report. Alternatively in certain embodiments, the UE does not transmit the UEI report in an old active BWP (e.g., resource for the UEI report in the old active BWP is after the timing that the timer expires). Preferably in certain embodiments, the UE may transmit the PN in the old active BWP (before the timer expires). Preferably in certain embodiments, the UE needs to transmit the PN and UEI report on another resource in a new active BWP. Preferably in certain embodiments, the UE could be configured with a different plurality of resources for the UEI report. Preferably in certain embodiments, the UE could be configured with a different plurality of resources for the PN. Preferably in certain embodiments, the UE determines a valid resource for the PN (and valid resource for the UEI report) based on a configuration associated with the new active BWP. Preferably in certain embodiments, valid means the resource does not overlap (partially or fully) in time domain with BWP switching time. Preferably in certain embodiments, valid means the resource after a timing, which is the first slot or the first symbol that the UE finishes active BWP switching, or which is after a BWP switching time, or which is the beginning of a slot where the UE can receive or transmit. Alternatively in certain embodiments, the UE cancels the triggered event due to the timer expiring, and/or the UE switches the active BWP due to the timer expiring. Alternatively in certain embodiments, once the UE determines a condition for one event is fulfilled (or once one event is triggered), the UE starts or restarts the timer. Preferably in certain embodiments, one rationale is that due to the triggered event, the UE has a request to perform a UL transmission, it is not considered to change the active BWP to default BWP. Alternatively in certain embodiments, once the UE determines the condition for one event is fulfilled (or once one event is triggered), the UE suspends the timer. More specifically, the UE suspends the timer until the UE transmits the UEI report (e.g., last symbol of the resource for the UEI report). More specifically, the UE suspends the timer until the UE transmits the PN (e.g., last symbol of the resource for the PN).

The UE could start or restart the timer (associated with an active DL BWP) associated with a Serving Cell in response to transmission of the PN (e.g. via PUCCH) on the Serving Cell. Alternatively and/or additionally, the UE could start or restart the timer (associated with the active DL BWP) associated with the Serving Cell in response to transmission of the UEI report (e.g. via PUCCH) on the Serving Cell.

A second method is that a UE transmits a PN for a UEI report, and after the PN transmission, the UE receives a BWP switch command from a network node. Preferably in certain embodiments, the UE does not transmit the UEI report on a first UL resource on a previous UL BWP. Preferably in certain embodiments, after/in response to changing active BWP to a new BWP comprising a second UL resource which the corresponding PN resource is within BWP switching time and/or within a time interval that the UE is not allowed to transmit or the UE does not transmit. Preferably in certain embodiments, the time interval may start from the next symbol of the CORESET comprising DCI format indicating a BWP switch. Preferably in certain embodiments, the length of the time interval could be (pre-)configured, and/or depends on UE capability, and/or depends on frequency range is FR1, or FR2. Preferably in certain embodiments, the UE does not transmit the UEI report on the second resource. Preferably in certain embodiments, when there is no valid PN resource for the second resource, the UE does not transmit the UEI report on the second resource. Preferably in certain embodiments, the second resource may be a most earlier/earliest UL resource for the UEI report after the active BWP change. Preferably in certain embodiments, based on a determination that there is no valid PN resource associated with the second resource after the UE changes active BWP, the UE does not transmit the UEI report on the second resource. Preferably in certain embodiments, when a third resource which is later than the second resource and the third resource is associated with a valid PN resource after the UE changes the active BWP to the new active BWP. Preferably in certain embodiments, the second resource and the third resource are associated with a UEI report. Preferably in certain embodiments, the UE could be configured with a plurality of resources for transmitting the UEI report once the UEI report is triggered (which is pending and not cancelled). Preferably in certain embodiments, the plurality of resources comprise the second resource and the third resource.

A third method is indication of PN in an old active BWP could be applied to a new active BWP. In one example, indication of the PN is commonly applied to TTI(s) in one serving cell. Preferably in certain embodiments, indication of the PN in a first BWP could associate with usage of a resource for the UEI report in a first BWP and a second BWP, wherein the first BWP and the second BWP are in or associated with a same serving cell. Preferably in certain embodiments, one PN resource could associate with one or more resources for the UEI report, wherein the one or more resources for the UEI report could associate with a same or different BWP. Preferably in certain embodiments, one resource for the UEI report could associate with one or more PN resources in a same or different BWP. Preferably in certain embodiments, at least when the UE transmits the PN in one PN resource in a first BWP, a resource for the UEI report in a second BWP associated with the one PN resource is used for transmission. In one example, the UE could be configured with more than one BWP. Preferably in certain embodiments, the UE is (pre-)configured with a PN resource in one or each of the more than one BWPs. Preferably in certain embodiments, the UE is (pre-)configured with a resource for the UEI report in one or each of the more than one BWPs. Preferably in certain embodiments, the UE determines a PN resource is activated when the UE is in the active BWP that the PN resource is located in. Preferably in certain embodiments, the UE determines whether a PN resource is activated or not based on whether the PN resource is in the active BWP or not. Preferably in certain embodiments, the UE does not transmit the PN (even if there is a triggered event) on the PN resource in the non-active BWP. Preferably in certain embodiments, there may be some exceptions that the UE may be configured with a dormant BWP which the UE does not expect to be configured with the PN resource and/or the resource for the UEI report. Preferably in certain embodiments, the UE determines a resource for the UEI report is activated when the UE is in the active BWP that the resource for the UEI report is located. Preferably in certain embodiments, the UE determines whether a resource for the UEI report is activated or not based on whether the resource for the UEI report is in the active BWP or not. Preferably in certain embodiments, the UE does not transmit the UEI report (even if there is a triggered event) on the resource for the UEI report in the non-active BWP. Preferably in certain embodiments, there may be some exceptions that the UE may be configured with a dormant BWP which the UE does not expect to be configured with the PN resource and/or the resource for the UEI report. Except a new active BWP is a dormant BWP, the UE transmits the PN on the PN resource in the old active BWP and transmits the UEI report on the resource for the UEI report in the new active BWP. The PN may not be transmitted in the new active BWP (after switching from the old active BWP to the new active BWP and) before transmitting the UEI report in the new active BWP. the resource for the UEI report, in the old active BWP, associated with the PN transmitted in the old active BWP may be within a time period for switching from the old active BWP to the new active BWP. The PN resource, in the new active BWP, associated with the UEI report transmitted in the new active BWP may be within a time period for switching from the old active BWP to the new active BWP. Preferably in certain embodiments, association between the PN resource in the old active BWP and the resource for the UEI report in the new active BWP may be based on an implicit determination or explicit signal. Preferably in certain embodiments, the explicit signal may be RRC, MAC CE, and/or DCI. Preferably in certain embodiments, the explicit signal may provide association between a first resource (for PN) in a first BWP and a second resource (for UEI report) in a second BWP. Preferably in certain embodiments, the first BWP could be the same or different than the second BWP. Preferably in certain embodiments, the first BWP and the second BWP correspond to a same serving cell. Preferably in certain embodiments, the new active BWP and the old active BWP correspond to the same serving cell. Preferably in certain embodiments, implicit determination may be that the UE based on the PN resource's periodicity (e.g., $t_1$, $t_{1+n}$, $t_{1+2n}$, $t_{1+3n}$ denotes periodic PN resource in one BWP) determines a PN resource is associated with one or more resources for the UEI report within one or more future periodicities. Preferably in certain embodiments, the one or more resources for the UEI report could be configured in the first BWP or the second BWP which is the same or different than the BWP of the PN resource. In the third method, when the UE transmits a PN on a PN resource in the old active BWP and switches to active BWP, the UE could transmit the UEI report on a cross-BWP associated resource for UEI.

Preferably in certain embodiments, a first PN resource in a first BWP is associated with a first resource for the UEI report in the first BWP.

Preferably in certain embodiments, a first PN resource in a first BWP is associated with a second resource for the UEI report in the second BWP.

Preferably in certain embodiments, based on a time interval after or associated with the first PN resource, the UE could determine the second resource could be associated with the first PN resource. Preferably in certain embodiments, if the second resource is within the time interval, after the BWP switch, the UE could transmit the UEI report (without transmitting the PN in the second BWP) on the second resource. Preferably in certain embodiments, if the second resource is NOT within the time interval (e.g., later than the timer interval), after a BWP switch, the UE will determine a third PN resource associated with a third resource for the UEI report in the second BWP, and/or the UE transmits the PN on the third PN resource and/or the UEI report on the third resource.

Preferably in certain embodiments, based on a same (resource) identity or a same identifier (associated to the first PN resource) or configured association between the PN resource and the resource for the UEI report among different BWPs, the UE could determine the second resource could be associated with the first PN resource. Preferably in certain embodiments, if the second resource and the first resource are configured with a same (resource) identity (or associated to the first PN resource), after a BWP switch, the UE could transmit the UEI report on the second resource.

Preferably in certain embodiments, the UE does not transmit the UEI report on the first resource.

If a (UL) BWP is deactivated, (any or all of) the PN resource(s) and/or resource(s) for the UEI report on the BWP may be suspended. If the BWP is activated, (any or all of) the PN resource(s) and/or the resource(s) for the UEI report on the BWP may be resumed or (re-)initialize. Alternatively in certain embodiments, if the BWP is deactivated, (any or all of) the PN resource(s) and/or resource(s) for the UEI report on the BWP may be cleared.

Figure 24:
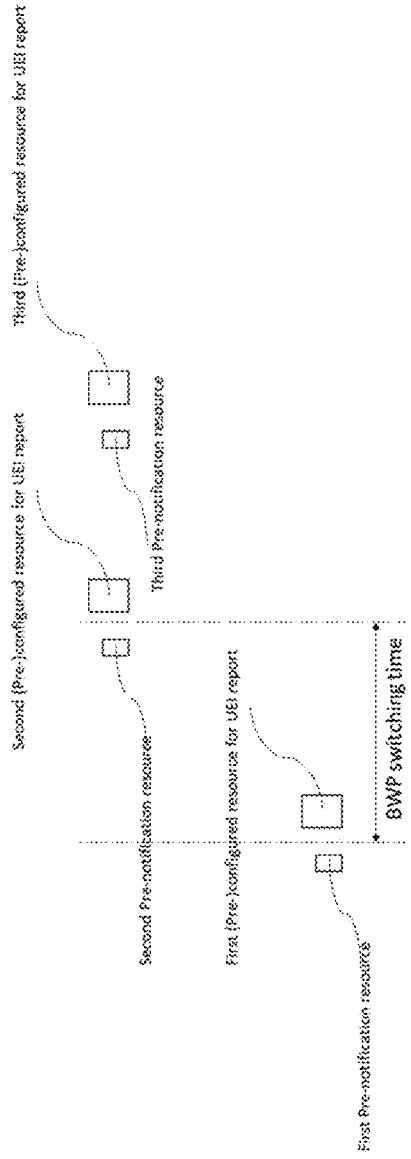
FIG. 24 is an example diagram showing a first PN resource and a first (pre-)configured resource for the UEI report are in a first BWP and a second PN resource and a second (pre-)configured resource for the UEI report are in a second BWP, in accordance with embodiments of the present invention.
Figure 25:
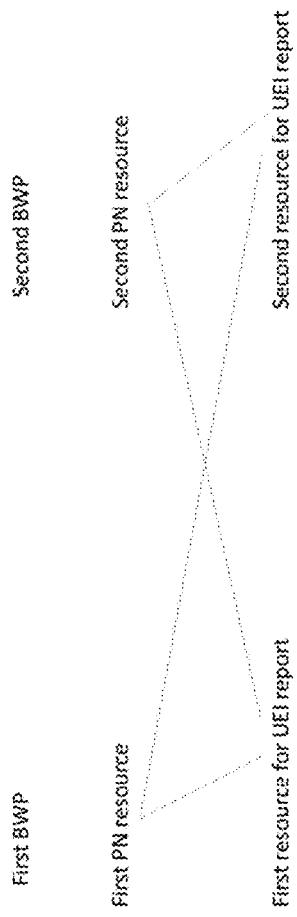
FIG. 25 is an example diagram showing that the UE could be configured with an association, that each PN resource could correspond to more than one resource for UEI in one or more BWPs (for supporting cross-BWP indication of the PN resource and the resource for the UEI report), in accordance with embodiments of the present invention.

For example, in FIG. 24, a first PN resource and a first (pre-)configured resource for the UEI report are in a first BWP and a second PN resource and a second (pre-)configured resource for the UEI report are in a second BWP. In this example, a first resource for the UEI report are within a BWP switching time. In this example, second PN resources are within the BWP switching time which in another example could be after the BWP switching time. In this example, a third PN resource and a third resource for the UEI report are after the BWP switching time. The UE may transmit the PN on the first PN resource and receives a BWP switch command. In one example, the UE could transmit the UEI report on the second resource for UEI. Based on association between the first PN resource in a first BWP and the second resource for the UEI report in the second BWP, (if the second resource for the UEI report is later than the BWP switching time), the UE could transmit the UEI report on the second resource for the UEI report. Preferably in certain embodiments, the association could be implicitly derived or determined or based on an explicit signal. Preferably in certain embodiments, implicit determination or derivation for the association is based on a time interval, same identity, or same identifier. Preferably in certain embodiments, a resource identity or identifier in a different BWP could be reused. Preferably in certain embodiments, a resource identity or identifier could be global for one or more BWPs in one serving cell for transmitting the UEI report. Preferably in certain embodiments, the association could be a time interval starting from the first PN resource or periodicity of the PN resource in one BWP. Preferably in certain embodiments, the UE could be configured with an association as shown as FIG. 25, that each PN resource could correspond to more than one resource for UEI in one or more BWPs (for supporting cross-BWP indication of the PN resource and the resource for the UEI report). Preferably in certain embodiments, even if the second PN resource is later than the BWP switching time (not shown in FIG. 24), the UE once transmits the PN on the first PN resource, the UE could directly transmit the UEI report on the second resource for the UEI report. Preferably in certain embodiments, the UE does not need to transmit the PN again on the second PN resource. Preferably in certain embodiments, even the second PN resource is not available for transmission, the UE could transmit the UEI report on the second resource for the UEI report. In another example, the UE will delay a BWP switching time till transmitting the UEI report on the first resource for the UEI report. Preferably in certain embodiments, the UE transmits the PN on the third PN resource (again). Preferably in certain embodiments, the UE transmits the UEI report on the third resource for the UEI report.

The UE may be configured with a configuration for Network Energy Saving (NES). The UE may be configured with a cell DRX comprising a cell DRX pattern for a cell inactive time and a cell active time. Preferably in certain embodiments, the cell inactive time means the network node is in energy saving operation. Preferably in certain embodiments, the cell active time means the network node is in normal operation.

Preferably in certain embodiments, the cell DRX pattern could be configured semi-statically. Preferably in certain embodiments, the cell DRX pattern could be activated or deactivated based on a dynamic signal. Preferably in certain embodiments, when the dynamic signal indicates activated for a time interval or a period, the time interval or the period may comprise one or more cell DRX patterns (which means the network will have some energy saving gain during the cell inactive time). Preferably in certain embodiments, when the dynamic signal indicates deactivated for a time interval or a period, the time interval or the period does not comprise any cell DRX pattern (which means the network will be in cell active time during the time interval or the period).

In a first method, the UE expects that the resource for the PN and the resource for the UEI report shall be configured within a cell active time. Preferably in certain embodiments, the UE expects that a bundle of PN resources and resources for the UEI report shall be configured with the cell active time. Preferably in certain embodiments, the UE does not expect that one PN resource is within the cell active time and the resource for the UEI report is within the cell inactive time. Preferably in certain embodiments, (if allows the network node to configure at least one resource of the PN or the UEI report is within the cell inactive time), when there is a triggered event, the UE determines a valid resource for transmitting the UEI report based on both resources for the PN and for the UEI report are within the cell active time. Preferably in certain embodiments, the UE determines whether the PN resource and the resource for the UEI report is within the cell active time or not based on a semi-static configuration and/or a dynamic signal. For simplicity purposes, the PN resource and the resource for the UEI report is configured within one time interval or period that a single dynamic signal indicates. Preferably in certain embodiments, the UE does not expect that the PN resource is associated with a first dynamic signal (or within a first time interval or a first period that a first dynamic signal indicates) while the resource for transmitting the UEI report is associated with a second dynamic signal (or within a second time interval or a second period that a second dynamic signal indicates). Alternatively in certain embodiments, the UE determines a resource for the UEI report is not valid based on that a PN resource and resource for the UEI report are associated with a different dynamic signal (e.g., an earlier dynamic signal for the PN while a later dynamic signal for the UEI report). More specifically, the resource for the UEI report may be in a cell DRX inactive time. Preferably in certain embodiments, the UE determines a resource for the UEI report is not valid based on that a PN resource and resource for the UEI report are associated with a different dynamic signal and at least one resource for the PN or for UEI report is in the cell DRX inactive time. Preferably in certain embodiments, the UE determines a valid resource for transmitting the UEI report based on that both the resource for the PN and for the UEI report are within the cell DRX active time. Preferably in certain embodiments, the cell DRX active time may be based on one or more dynamic signals and/or semi-static cell DRX patterns. Preferably in certain embodiments, when the UE determines a valid resource for transmitting the UEI report, the UE determines that at least the PN resource is within the cell DRX active time.

In a second method, the UE expects not to be simultaneously configured with both a cell DRX and a UEI report. Preferably in certain embodiments, when a cell is configured with the cell DRX, the UE does not expect to be configured with the UEI report. Preferably in certain embodiments, when a cell is configured with the cell DRX, the UE does not expect to be configured with Mode-B for the UEI report (e.g., Mode-A for the UEI report is allowed to be configured simultaneously with the cell DRX).

Figure 20:
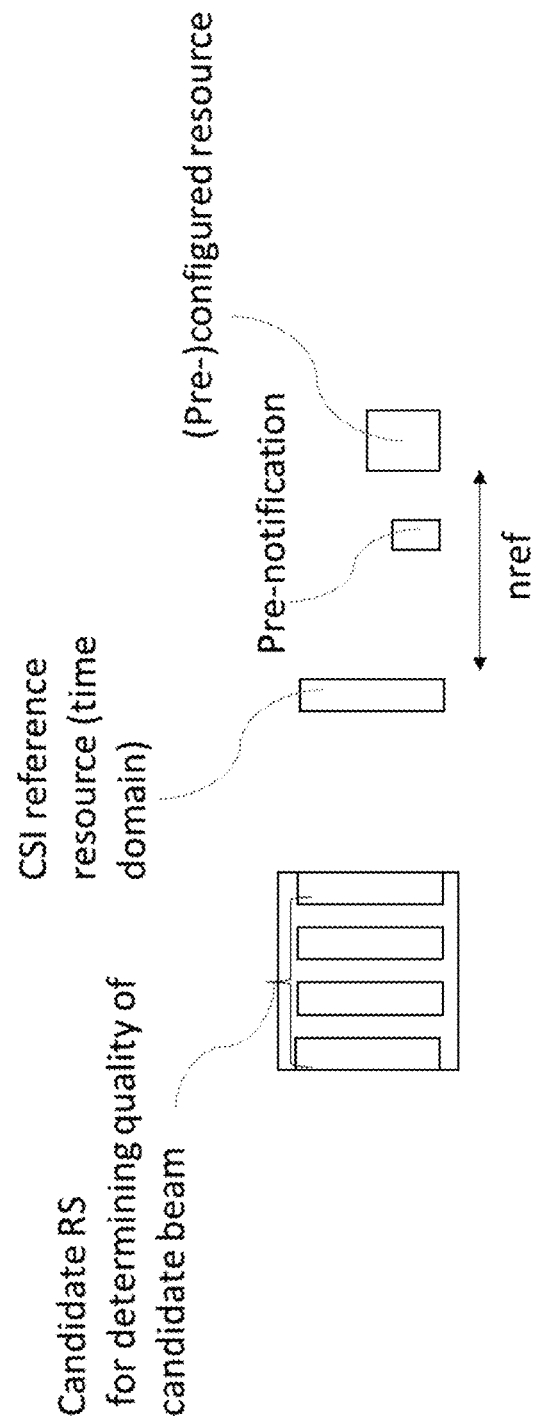
FIG. 20 is an example diagram showing a candidate RS for determining quality of a candidate beam, a CSI reference resource, a PN, and a (pre-)configured resource, in accordance with embodiments of the present invention.

For the example in FIG. 20, a UE determines a CSI reference resource (in time domain) for a UEI report based on a resource associated with PN. Preferably, a time domain position of the resource associated with the PN (associated with a first resource for transmitting the UEI report) is used for determining the CSI reference resource for the UEI report. Preferably in certain embodiments, a starting symbol or ending symbol of the resource associated with the PN is used as reference for determining the CSI reference resource. An ending symbol of the CSI reference resource is at least an offset before the starting of the ending symbol of the resource associated with PN. A starting symbol of the CSI reference resource is at least an offset before the starting of the ending symbol of the resource associate with PN. Preferably in certain embodiments, a UE determines a CSI reference resource (in time domain) for the UEI report based on timing associated with transmitting the PN. Preferably in certain embodiments, the timing associated with transmitting the PN corresponds to or is the timing that the UE transmits the PN which is associated with the UEI report (or which is associated with the resource for transmitting the UEI report).

Alternatively in certain embodiments, a UE determines a CSI reference resource for a UEI report based on a virtual bundle of a first resource associated with the UEI report and a second resource associated with the PN. The CSI reference resource (in time domain) is at least an offset before a resource associated with the PN. Preferably, the CSI reference resource (in time domain) is at least an offset before the virtual bundle of the first resource and the second resource.

The determination is based on at least when the UE is configured or operates in mode-B. Mode-B means or corresponds that the UE is (pre-)configured with a UL resource for transmitting a UEI report, and the UL resource is associated with one resource associated with the PN (or for transmitting PN).

The UE determines a CSI reference resource (in time domain) for a UEI report based on a resource associated with the UEI report when the UE is configured or operates in mode-A. Mode-A means or corresponds that the UE is scheduled by the UL resource for transmitting the UEI report. Mode-A may not need the resource for PN. Once the UE is configured or operates in Mode-A, the UE determines a CSI reference resource (in time domain) for the UEI report NOT based on the resource associated with PN.

Preferably in certain embodiments, for a CSI report rather than a UEI report, the UE determines a CSI reference resource based on (timing associated with) the CSI report. The timing associated with the CSI report corresponds to or is the timing that the UE transmits the CSI report. Preferably in certain embodiments, the UEI report is associated with the UE being configured with Mode-B.

Preferably in certain embodiments, the bundle of PN and UEI could be used to determine whether cell switch for PUCCH (or PUCCH cell switch) is allowed or not. Preferably in certain embodiments, during the bundle of PN and UEI, the UE does not expect to switch from a first cell transmitting the PN to a second cell transmitting the UEI report when the PN is associated with the UEI report. Alternatively in certain embodiments, the UE does not expect that the PN and UEI report are transmitted in a different cell comprising PUCCH resource. In other words, TTI(s) between the TTI for the PN and the TTI for the UEI report could be indicated as a PUCCH cell switch.

Figure 21:
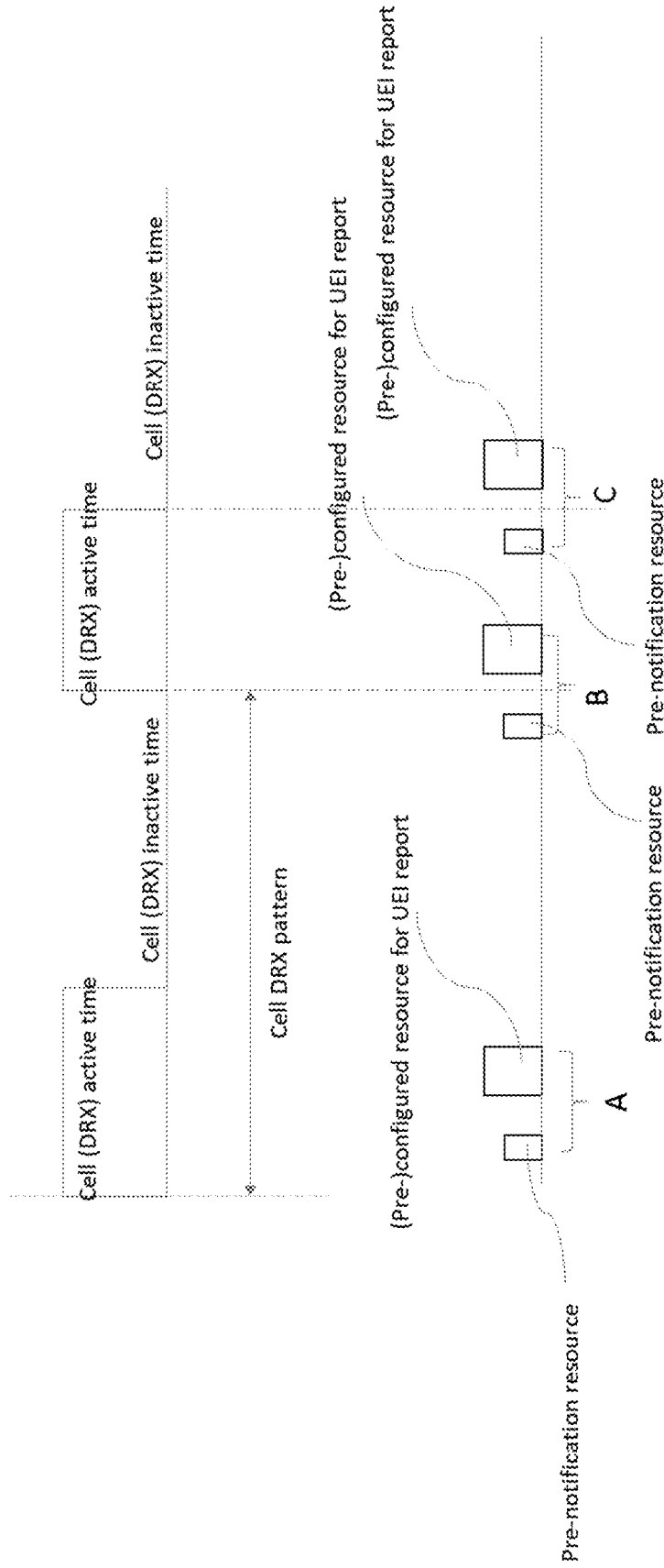
FIG. 21 is an example diagram showing a UE could be (pre-)configured with three pairs or bundles of PN resources and resources for the UEI report denoted as A, B, and C, in accordance with embodiments of the present invention.

For the example in FIG. 21, a UE could be (pre-)configured with three pairs or bundles of PN resources and resources for the UEI report denoting as A, B, and C. When the UE triggers a UEI report, the UE will determine or select a valid resource for transmitting the UEI report. The determination or selection may fulfill that both resources (for PN and for UEI report) should be within cell DRX active time. If the UE triggers a UEI report before the start of PN resource A, the UE could select or determine PN resource A and resource A for the UEI report as valid. If the UE triggers a UEI report after start of PN resource A, the next valid resource for transmitting the UEI report is not present in FIG. 21 since bundle B may face PN resource B is within cell DRX inactive time and bundle C may face resource C for the UEI report is within cell DRX inactive time. An alternative way is that the UE does not expect to be configured with the UL resource as bundle B and bundle C. An alternative way is that the UEI report and the cell DRX cannot be configured simultaneously.

Figure 22:
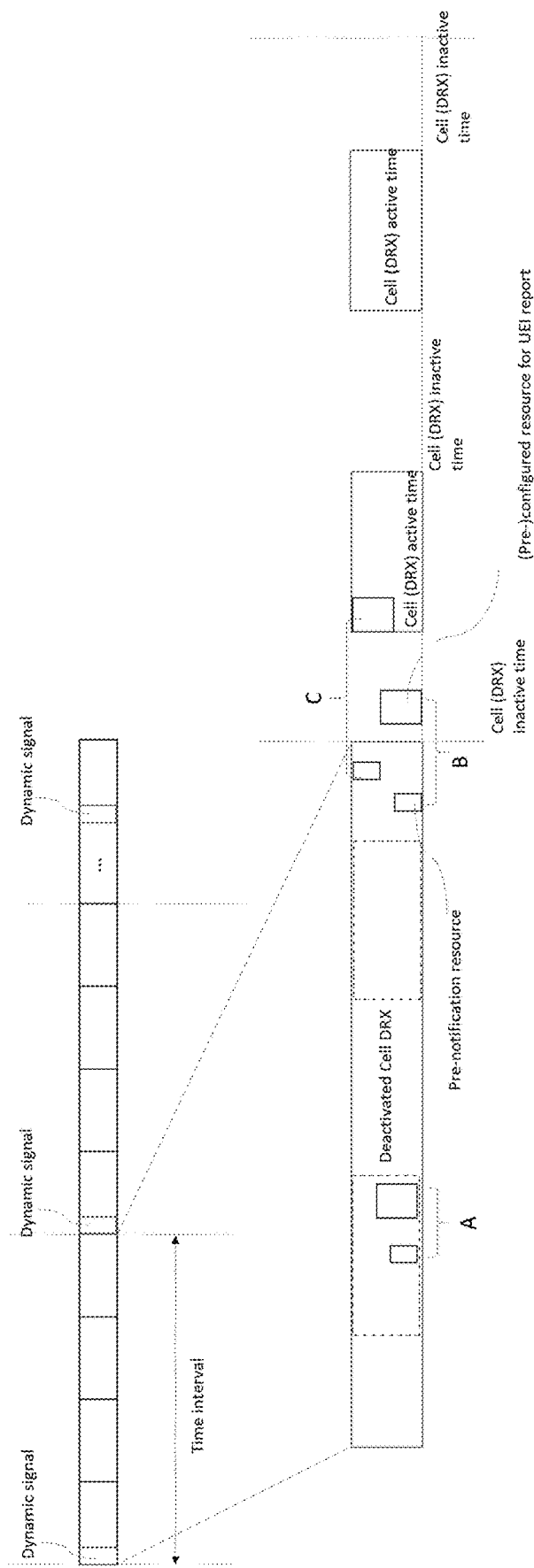
FIG. 22 is an example diagram showing a first dynamic signal (in the left beginning of the figure) deactivates the cell DRX which means active time for a time interval, and a second dynamic signal activates the cell DRX which means the cell DRX active time and the cell DRX inactive time are based on an on-duration timer associated with a cell DRX configuration, in accordance with embodiments of the present invention.

For another example, as shown in FIG. 22, a first dynamic signal (in the left beginning of the figure) deactivates the cell DRX which means active time for a time interval. A second dynamic signal activates the cell DRX which means the cell DRX active time and the cell DRX inactive time are based on an on-duration timer associated with a cell DRX configuration. In this example, a dotted square may correspond to an original cell DRX active time if the first dynamic signal indicates an activated cell DRX. There are 3 examples of bundles of resources of PNs and UEI reports denoting as A, B, and C. Bundle A may correspond that both resources for the PN and UEI reports are associated with one dynamic signal. Bundle B may correspond that at least one resource is within the cell DRX active time while another resource is not within the cell DRX active time. Bundle C may correspond that at least one resource of the PN and UEI reports are in the cell DRX active time and another resource of the PN and UEI reports are in the cell DRX inactive time. In this example, for bundle C, the PN resource is in the cell DRX active time while the resource for the UEI report is in the cell DRX inactive time. Preferably in certain embodiments, cell (DRX) active time corresponds that the on-duration timer is running. Preferably in certain embodiments, the on-duration timer is associated with the cell DRX configuration. Starting timing of the on-duration timer may be associated with an RRC configuration or MAC CE or DCI. Preferably in certain embodiments, in this example, for bundle C, when the resource for the UEI report is within the cell (DRX) active timer, bundle C, the resource for the UEI report could be determined as a valid resource for transmitting the UEI report. In order between the PN resource and the resource for the UEI report is assumed that is the earlier PN resource is associated with the earlier resource for the UEI report (same time occasion could be considered valid). Preferably in certain embodiments, out-of-order between the PN resource and the resource for the UEI report is not allowed. In this example, both bundle B and bundle C correspond that the PN resource and the resource for the UEI report is associated with a different dynamic signal. In one example, the UE does not expect to receive a configuration resulting in bundle B or bundle C. Alternatively in certain embodiments, the UE expects both the PN resource and the resource for the UEI report are configured within the cell (DRX) active time no matter whether the cell DRX is activated or not (once cell DRX is configured). In one method, the UE could be configured with virtual resources comprising the cell (DRX) active time assuming (always) activating cell DRX. The UE determines the periodic PN resource and the resource for the UEI report is within virtual resources. Preferably in certain embodiments, the virtual resource corresponds to the resource in TTI within the cell DRX active time. Preferably in certain embodiments, periodicity of the PN resource or periodicity of the resource for the UEI report is configured with multiple integer number of (cell DRX) cycles of the cell DRX or time interval. Preferably in certain embodiments, periodicity for the PN resource is restricted to be aligned with periodicity of a time interval (e.g., periodicity of a dynamic signal for activating/deactivating the cell DRX mechanism). Alternatively in certain embodiments, the UE could receive a configuration for bundle B and bundle C. The UE may determine validation of bundle B and bundle C when the UE has triggered an event or a pending UEI report to be transmitted. The UE determines bundle B as a non-valid resource via assuming a dynamic signal is not received or indicating an activating cell DRX mechanism. The UE determines bundle C as a non-valid resource via assuming a dynamic signal is not received or indicating an activating cell DRX mechanism. Alternatively in certain embodiments, the UE determines bundle C as a valid resource via assuming a dynamic signal is not received or indicating activating a cell DRX mechanism. Due to a resource for the UEI report of bundle C is originally configured in cell (DRX) active time, the UE determines bundle C as a valid resource. Preferably in certain embodiments, if the first dynamic signal in FIG. 22 indicates an activated cell DRX mechanism, the PN resource in bundle B and in bundle C is not valid. Preferably in certain embodiments, based on an indication of the first dynamic signal indicating an activated cell DRX mechanism (causing the PN resource in inactive time), the UE determines a non-valid resource for the UEI report for bundle B and bundle C. Preferably in certain embodiments, for a non-valid bundle, and/or for a non-valid PN resource, and/or for a non-valid resource for the UEI report, the UE does not determine or select such resource for transmitting the UEI report. Preferably in certain embodiments, the UE may determine a valid bundle, and/or a valid PN resource, and/or a valid resource for the UEI report once the UE has one or more triggered events and/or the UE has one or more pending (and not cancelled) UEI reports.

Preferably in certain embodiments, the UE does not expect to receive both a configuration for the UEI report and the on-duration timer. Preferably in certain embodiments, the UE does not expect to receive both a configuration for the UEI report and a dynamic signal for activating/deactivating the cell DRX mechanism. Preferably in certain embodiments, the UE could be configured with a cell DTX mechanism.

If the UE transmits a PN via a resource for the PN within a cell DRX active time, the UE could transmit a UEI report via a resource for the UEI report within the cell DRX inactive time. The resource for the UEI report could be associated with the PN transmitted by the UE or the resource for the PN. If a resource for the PN and a resource for the UEI report associated with the resource for the PN are both within the cell DRX inactive time, the UE may not (be allowed to) transmit the PN via the resource for the PN and/or the UEI report via the resource for the UEI report. If a resource for the PN and a resource for the UEI report associated with the resource for the PN are both within the cell DRX inactive time, the UE determines the resource for the PN and the resource for the UEI report are not valid.

Alternatively in certain embodiments, the UE could transmit a PN via a resource for the PN within a cell DRX inactive time. In other words, the UE could transmit the PN via the resource for the PN regardless of whether the resource for the PN is within the cell DRX inactive time or not. Alternatively and/or additionally, the UE could transmit a UEI report via a resource for the UEI report within the cell DRX inactive time. In other words, the UE could transmit the UEI report via the resource for the UEI report regardless of whether the resource for the UEI report is within the cell DRX inactive time or not.

After the UE transmits a UEI report, if a resource for a network node response for the UEI report is within a cell DTX inactive time, the UE may (still) monitor or receive a network node response via the resource for the network node response. In other words, the UE could monitor or receive the network node response via the resource for the network node response regardless of whether the resource for the network node response is within the cell DTX inactive time or not. Alternatively in certain embodiments, the UE may not (be allowed to) monitor or receive the network node response via the resource for the network node response (within cell DTX inactive time). The UE may assume that a transmission of the UEI report fails. Alternatively in certain embodiments, the UE may assume that the transmission of the UEI report is successful.

Preferably in certain embodiments, when the UE faces some problem to transmit a pending UEI report, the UE keeps a triggered event. When the UE deprioritizes or postpone transmission of the PN, the UE could keep the triggered event.

Preferably in certain embodiments, the UE cancels a triggered event when the UE transmits a corresponding UEI report, or the UE receives a response associated with a transmitted UEI report from a network node, or after a window starting from a timing that the UE transmits a corresponding UEI report.

The UE is configured with a unified TCI framework. The unified TCI framework may correspond to a joint TCI mode or separate TCI mode. the Joint TCI mode means or corresponds that a DL and UL using a same TCI state. The separate TCI mode means or corresponds that the DL and UL using a different TCI state. Without loss of generality, as shown in FIG. 23, with introduction of the UEI report and the PN for notification, t1, or t2 corresponds to a timing that the UE receives the DL signal for (updating) activated/deactivated TCI state, applies an activated TCI state, (updating) indicated TCI state, applied indicated TCI state, transmitting HARQ in response to receiving the DL signal for updating/changing of an activated TCI state, and/or transmitting HARQ in response to receiving the DL signal for indicating updating/changing an indicated TCI state, and/or a candidate TCI state is changed or activated or reconfigured.

If the UE, before the UE transmits a PN on a PN resource (or a time offset before the UE transmits a PN on a PN resource) (e.g., t1 in FIG. 23),
    receives a DL signal for (updating) activated/deactivated TCI state,
    applies an activated TCI state,
    (updating) indicated TCI state, applied indicated TCI state,
    transmitting HARQ in response to receiving a DL signal for updating/changing of an activated TCI state, transmitting HARQ in response to receiving a DL signal for indicating updating/changing an indicated TCI state, and/or candidate TCI state is changed or activated or reconfigured, the UE cancels triggered event, and/or the UE does not transmit PN and/or UEI report for a triggered event.

If the UE, after the UE transmits a PN on a PN resource (e.g., t2 in FIG. 23), receives a DL signal for (updating) activated/deactivated TCI state, applies an activated TCI state, (updating) indicated TCI state, applied indicated TCI state, transmitting HARQ in response to receiving a DL signal for updating/changing of an activated TCI state, transmitting HARQ in response to receiving a DL signal for indicating updating/changing a indicated TCI state, and/or candidate TCI state is changed or activated or reconfigured, The UE cancels a triggered event, and/or the UE does not transmit the UEI report for a triggered event (or the UE avoids transmitting the UEI report for a triggered event), or alternatively in certain embodiments, the UE transmits a specific/default/null UEI report to a network node. The UE may not monitor or receive a network node response, for the UEI report, from the network node. Alternatively in certain embodiments, the UE may ignore a received network node response, for the UEI report, from the network node. In other words, the UE may not retransmit the UEI report or may not transmit a new UEI report in response to the received network node response (e.g. indicating NACK or unsuccessful transmission/reception).

Preferably in certain embodiments, the specific/default/null UEI report may comprise specific/default/null information of a current beam. Preferably in certain embodiments, the specific/default/null UEI report may comprise information for indicating specific/default/null information associated with the current beam. Preferably in certain embodiments, based on the one or more specific events associated with a candidate beam or current beam, the UE could determine to report specific/default/null information for the candidate beam or current beam.

Preferably in certain embodiments, no matter the timing of receiving a DL signal indicating changing/updating a current beam is before or after a timing of the PN resource (associated with a triggered event), the UE cancels all triggered events (associated with the current beam). Preferably in certain embodiments, no matter the timing of receiving the DL signal indicating changing/updating the candidate beam is before or after timing of the PN resource (associated with a triggered event), the UE cancels all triggered events (associated with the candidate beam).

Preferably in certain embodiments, a new current beam corresponds to an indicated TCI state or activated TCI state based on a DL signal (e.g., DCI format with TCI field indicating a TCI code-point different than a current used/applied/indicated). Preferably in certain embodiments, one or more candidate beams correspond to one or more configured TCI states or MAC CEs activating one or more TCI states. Preferably in certain embodiments, the update of one or more new candidate beams is associated with a (current) triggered event. Preferably in certain embodiments, the update of one or more new candidate beams is associated with a (current) serving cell. Preferably in certain embodiments, if the update of a new candidate beam is not associated with a (current) triggered event, the update of the new candidate beam does not impact on the triggered event. Alternatively in certain embodiments, based on a first event and a second event associated with a same serving cell or same BWP, or same intra-frequency band, or same cell group, or PUCCH group or other same characteristic (e.g., same serving cell, same measurement RS), once the UE has triggered the first event and the second event, and applies the update of the new candidate beam, the UE may cancel both the first triggered event and the second triggered event due to the one or more specific events (associated with beam change/update).

Preferably in certain embodiments, when the UE has triggered a first event and a second event, wherein the first event is associated with a current beam and a first set of candidate beams and the second event is associated with the candidate beam and a second set of candidate beams, once the UE has detected one or more specific events associated with the current beam (e.g., changing/updating the current beam), the UE cancels both the first triggered event and the second triggered event in response to the one or more specific events (and does not transmit the UEI report associated with the first event and does not transmit the UEI report associated with the second event in response to the one or more specific events). Preferably in certain embodiments, if the UE has transmitted the PN for the UEI report associated with the first event while the UE does not transmit the PN for the UEI report associated with the second event, the UE may have a same or different handling once the UE detects one or more specific events associated with the current beam (e.g., changing/updating the current beam). Preferably in certain embodiments, the UE cancels the second triggered event in response to detecting the one or more specific events associated with the current beam. Preferably in certain embodiments, the UE does not cancel the first triggered event in response to detecting the one or more specific events associated with the current beam in response to the one or more specific events.

For another example, once the UE detects one or more specific events associated with both the first set of candidate beams and the second set of candidate beams (e.g., changing/updating one more candidate beams overlapping with the first set of candidate beams, and also overlapping with the second set of candidate beams), the UE cancels both the first triggered event and the second triggered event in response to the one or more specific events (and does not transmit the UEI report associated with the first event and does not transmit the UEI report associated with the second event in response to the one or more specific events).

For other examples, once the UE detects one or more specific events associated with the first set of candidate beams and without being associated with the second set of candidate beams (e.g., changing/updating one more candidate beams overlapping with the first set of candidate beams, and not overlapping with the second set of candidate beams), the UE cancels the first triggered event and does NOT cancel the second triggered event in response to the one or more specific events (and does not transmit the UEI report associated with the first event and transmits the UEI report associated with the second event in response to the one or more specific events).

When the UE receives a (re) configuration and/or (de) activation for the PN resource and/or the resource for the UEI report, the UE cancels a triggered event (no matter whether the UE transmits the PN on an old PN resource or not). Alternatively in certain embodiments, the UE does not expect to receive a (re) configuration and/or (de) activation for the PN resource and/or the resource for the UEI report in between timing of the old PN resource and the (corresponding) resource for the UEI report.

The UE could be configured with a PUCCH group comprising a PCell and a PUCCH-sSecondary Cell (sSCell) (i.e., an Scell for supporting PUCCH carrier switch). A PUCCH transmission for the PUCCH group is between the PCell and the PUCCH-sSCell. Preferably in certain embodiments, the UE does not expect to be configured with both a PUCCH carrier switch and a UEI report. Preferably in certain embodiments, the UE expects that the PN resource and/or the resource for the UEI report is configured in one cell or carrier. Preferably in certain embodiments, for a given configuration associated with the UEI report, the UE does not expect that the PN resource in a first timing and the resource for the UEI report are in a timing b are transmitted in a different cell or carrier. Preferably in certain embodiments, for a given configuration associated with the UEI report, the PN resource and/or the resource for the UEI report are restricted being configured in a same carrier. Preferably in certain embodiments, even for a different timing, the UE does not expect that the PN resource in a first timing and the PN resource in a second timing are to be transmitted in different carriers. Preferably in certain embodiments, the UE is configured to transmit the PN resource without the PUCCH carrier switch (if the UE is configured with PUCCH carrier switch). Preferably in certain embodiments, the UE does not expect to transmit the PN and the UEI report on different carriers. Alternatively in certain embodiments, the UE could transmit on a first bundle of PN resources and resources for the UEI report which are in a PCell and transmit on a second bundle of PN resources and resources for the UEI report which are in a PUCCH-sSCell. Preferably in certain embodiments, for a given bundle of PN resources and resources for the UEI report, the UE does not expect to receive signal indicating changing serving cell for PUCCH transmission within the bundle. Preferably in certain embodiments, the UE does not expect to have or receive a signal to indicate a different cell for the PN resource and the resource for the UEI report which have association. Based on timing of a received signal indicating information of a carrier switch, the UE could determine whether to apply a PUCCH carrier switch and/or the UE could determine whether a bundle of PN resources and resources for the UEI report are valid or not. Preferably in certain embodiments, if the UE receives a signal indicating information of carrier switch before transmitting the PN (e.g., t1 in FIG. 23), when there is a switch between the PN resource and the resource for the UEI report, the UE transmits the PN on a first cell and transmits the UEI report on a second cell. Alternatively in certain embodiments, the UE determines this bundle of PN resources and resources for the UEI report is not valid due to information of a carrier switch. Preferably in certain embodiments, if the UE receives a signal indicating information of a carrier switch after transmitting the PN (e.g., t2 in FIG. 23), when there is a switch between the PN resource and the resource for the UEI report, the UE transmits the PN on a first cell and transmits the UEI report on a second cell. Alternatively in certain embodiments, the UE cancels to transmit the UEI report on the second cell. Preferably in certain embodiments, the UE changes from mode-B to mode-A. Preferably in certain embodiments, the UE expects to receive a gNB signal for requesting a pending UEI report during a window. Alternatively in certain embodiments, the UE does not expect that the signal indicating information of carrier the switch for the PN resource and the resource for the UEI report. In one example, the signal could indicate a PUCCH carrier switch for TTI(s) other than the TTI associated with the PN resource and the TTI associated with the resource for the UEI report. Preferably in certain embodiments, the TTI between the PN resource and the resource for the UEI report could be indicated to be transmitted in a second serving cell while the PN resource and the resource for the UEI report are indicated to be transmitted in a first serving cell.

Preferably in certain embodiments, the PN resource comprises a different or same number of symbols, number of PRBs, PUCCH format, starting symbol, and/or starting PRB.

The UE could be configured with both mode-B associated with the UEI report and the network node requesting report. Once receiving a request from the network node before transmitting a PN on a PN resource (e.g., t1 in FIG. 23), the UE will cancel transmission of the PN on the PN resource and the UEI report. Preferably in certain embodiments, both the PN resource and the UEI report is in response to or associated with a triggered event. Preferably in certain embodiments, the triggered event is associated with at least one candidate beam and one current beam. The UE may determine whether to cancel transmission of the PN on the PN resource and the UEI report based on whether the request is associated with the at least one candidate beam or the one current beam. If the request is associated with the at least one candidate beam or the one current beam, the UE may cancel transmission of the PN on the PN resource and the UEI report. If the request is NOT associated with any of the at least one candidate beam or the one current beam, the UE does not cancel transmission of the PN on the PN resource and the UEI report (in response to the request or due to the request). Preferably in certain embodiments, the UE transmits the PN on the PN resource and the UEI report. Preferably in certain embodiments, the UE may determine whether to cancel transmission of the PN on the PN resource and the UEI report based on whether there is (time domain) overlapping between a UL resource for transmitting the network node requested report and the PN resource or the UL resource for transmitting the network node requested report and the resource for transmitting the UEI report. Preferably in certain embodiments, when there is (time domain) overlapping between the UL resource for transmitting the network node requested report and the PN resource or the UL resource for transmitting the network node requested report and the resource for transmitting the UEI report, the UE cancels the UEI report and/or the PN transmission. Alternatively in certain embodiments, the UE does not expect to receive a signal to schedule UL resource overlapping with the PN resource in time domain (e.g., symbol domain and/or slot domain overlapping). Preferably in certain embodiments, after transmitting the PN on the PN resource (e.g., t2 in FIG. 23), the UE prioritizes to transmit the network node requested report when there is overlapping between the UL resource for transmitting the network node requested report and the resource for transmitting the UEI report. Preferably in certain embodiments, the PN transmission is used to indicate change of mode of the UEI report from mode B to mode A due to overlapping of the network node requested report and the resource for transmitting the UEI report. Preferably in certain embodiments, if the network node requested report is associated with the one current beam and/or the one candidate beam, the UE may cancel the UEI report and/or the UE may cancel the triggered event. Alternatively in certain embodiments, the UE may multiplex UCI between the network node requested report and the UEI report. Preferably in certain embodiments, the UE may drop part of the UEI report. Preferably in certain embodiments, the UE may drop part of the network node requested report. Preferably in certain embodiments, based on whether the PN is transmitted or not, the UE could determine whether to drop the UEI report (or multiplex the UEI report into the network node requested report).

The UE may be configured with a cancellation mechanism for one or more UL resources. The cancellation may be indicated by a DL signal. Preferably in certain embodiments, the DL signal could be a group common DCI or UE-specific DCI or MAC CE. Preferably in certain embodiments, the group common DCI corresponds to a DCI indicating a cancellation indication including cancellation of a (pre-) configured resource for the UEI report. Preferably in certain embodiments, UE-specific DCI corresponds to DCI scheduling a higher priority transmission. Preferably in certain embodiments, before transmitting the PN, if the UE receives a DL signal indicating cancellation of one resource for the UEI report, the UE determines the resource for transmitting the UEI report as not valid. Before transmitting the PN, if the UE receives a DL signal indicating cancellation of the PN resource, the UE determines the resource for transmitting the UEI report as not valid. Preferably in certain embodiments, before transmitting the PN, if any of a bundle of resources for transmitting the UEI report and the PN resource is indicated by the DL signal as cancelled, the UE determines the resource for transmitting the UEI report as not valid. Preferably in certain embodiments, after transmitting the PN (before transmitting the UEI report), if the UE receives a DL signal indicating cancellation of one resource for the UEI report, the UE cancels the UEI report. Preferably in certain embodiments, after transmitting the PN (before transmitting the UEI report), the UE does not expect to receive a DL signal indicating cancellation of one resource for the UEI report. Alternatively in certain embodiments, the UE does not expect the DCI cancellation including a (pre-)configured resource. Preferably in certain embodiments, a cancellation timeline may include a processing offset before the PN resource and/or the resource for transmitting the UEI report. Preferably in certain embodiments, if the UE receives the cancellation before the processing offset, the UE could cancel the UEI report or the PN resource. Preferably in certain embodiments, if the UE receives cancellation within the processing offset, the UE transmits the UEI report or the PN. Preferably in certain embodiments, the UE does not expect to receive the cancellation indication within the processing offset when the cancellation indication indicates cancelling the PN resource or the resource for transmitting the UEI report.

Preferably in certain embodiments, a DL signal for cancellation may indicate a second resource for transmitting the UEI report or transmitting the PN resource. Preferably in certain embodiments, the DL signal may provide a priority threshold.

Additionally and/or alternatively in certain embodiments, the UE may not transmit the UEI report or the PN (on a PUCCH Cell) associated with a Cell if or when the Cell is deactivated. The UE could consider the PN resource and/or UEI resource(s) (associated with the Cell) to be invalid or suspended if or when the Cell is deactivated. The PUCCH Cell on which the UEI report and/or the PN is transmitted may not be the same Cell as the Cell. Alternatively in certain embodiments, the PUCCH Cell could be the Cell.

All concepts, examples, and embodiments above and herein could be combined, in whole or in part, into new concepts, examples, and embodiments.

Various concepts, examples, and embodiments of the present invention are described below. For the methods, alternatives, concepts, examples, and embodiments detailed above and herein, the following aspects and embodiments are possible.

Figure 26:
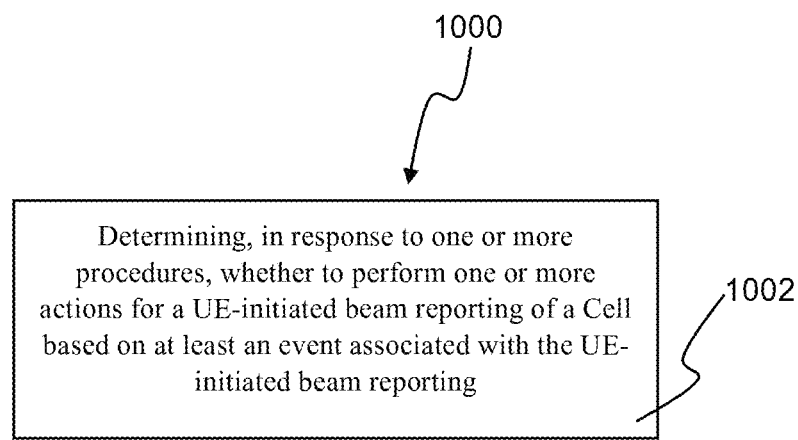
FIG. 26 is a flow diagram of a method of a UE in a wireless communication system comprising determining, in response to one or more procedures, whether to perform one or more actions for a UE-initiated beam reporting of a Cell based on at least an event associated with the UE-initiated beam reporting, in accordance with embodiments of the present invention.

Referring to FIG. 26, with this and other concepts, systems, and methods of the present invention, a method 1000 for a UE in a wireless communication system comprises determining, in response to one or more procedures, whether to perform one or more actions for a UE-initiated beam reporting of a Cell based on at least an event associated with the UE-initiated beam reporting (step 1002).

Referring back to FIGS. 3 and 4, in one or more embodiments from the perspective of a device (e.g., a UE) in a wireless communication system, the device 300 includes a program code 312 stored in memory 310 of the transmitter. The CPU 308 could execute program code 312 to: (i) determine, in response to one or more procedures, whether to perform one or more actions for a UE-initiated beam reporting of a Cell based on at least an event associated with the UE-initiated beam reporting. Moreover, the CPU 308 can execute the program code 312 to perform all of the described actions, steps, and methods described above, below, or otherwise herein.

Figure 27:
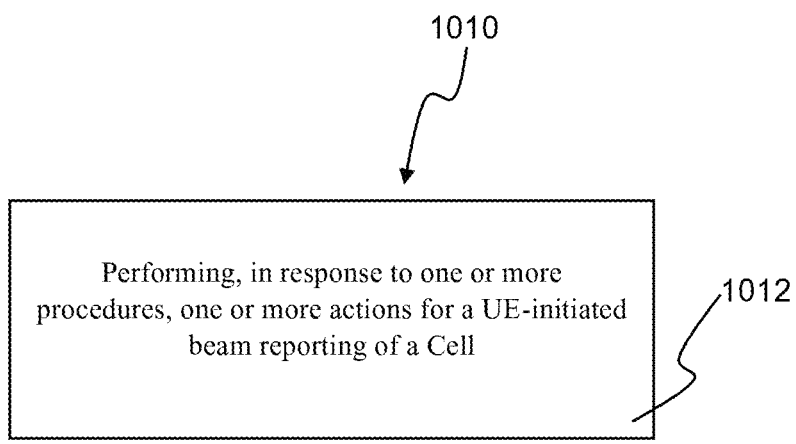
FIG. 27 is a flow diagram of a method of a UE in a wireless communication system comprising performing, in response to one or more procedures, one or more actions for a UE-initiated beam reporting of a Cell, in accordance with embodiments of the present invention.

Referring to FIG. 27, with this and other concepts, systems, and methods of the present invention, a method 1010 for a UE in a wireless communication system comprises performing, in response to one or more procedures, one or more actions for a UE-initiated beam reporting of a Cell (step 1012).

Referring back to FIGS. 3 and 4, in one or more embodiments from the perspective of a device (e.g., a UE) in a wireless communication system, the device 300 includes a program code 312 stored in memory 310 of the transmitter. The CPU 308 could execute program code 312 to: (i) perform, in response to one or more procedures, one or more actions for a UE-initiated beam reporting of a Cell. Moreover, the CPU 308 can execute the program code 312 to perform all of the described actions, steps, and methods described above, below, or otherwise herein.

In various embodiments, the Cell could be a Serving Cell or an LTM candidate Cell.

In various embodiments, the one or more procedures contain/comprise BWP switching of the Cell.

In various embodiments, the one or more procedures contain/comprise deactivation of the Cell.

In various embodiments, the one or more procedures contain/comprise activation of the Cell.

In various embodiments, the one or more procedures contain/comprise a beam or TCI state activation/deactivation of the Cell.

In various embodiments, the one or more procedures contain/comprise BWP switching to a dormant
 DL BWP of the Cell.

In various embodiments, the one or more procedures contain/comprise (ongoing) beam failure recovery or triggered BFR of the Cell.

In various embodiments, the one or more procedures contain/comprise (ongoing) beam failure recovery or triggered BFR of a second Cell on which the UE is configured or indicated to transmit a UE-initiated beam report of the Cell.

In various embodiments, the one or more procedures contain/comprise expiry of a TA timer (timealignmenttimer) associated with the Cell.

In various embodiments, the one or more procedures contain/comprise expiry of a TA timer (timealignmenttimer)

associated with a second Cell on which the UE is configured or indicated to transmit a UE-initiated beam report of the Cell.

In various embodiments, the one or more actions contain/comprise suspending an event of the UE-initiated beam reporting.

In various embodiments, the one or more actions contain/comprise stopping or restarting a timer associated with timeToTrigger of an event associated with the UE-initiated beam reporting or associated with the Cell.

In various embodiments, the one or more actions contain/comprise discarding a UE-initiated beam report of the UE-initiated beam reporting.

In various embodiments, the one or more actions contain/comprise cancelling the UE-initiated beam reporting.

In various embodiments, the one or more actions contain/comprise not generating a UE-initiated beam report.

In various embodiments, the event includes a quality of a current (activated) beam of the Cell being lower than a threshold.

In various embodiments, the event includes a quality of a new (or candidate) beam of the Cell being higher than a threshold.

In various embodiments, the event includes a quality of a current (activated) beam of the Cell is a threshold value lower than a quality of a new (or candidate) beam of the Cell.

Figure 28:
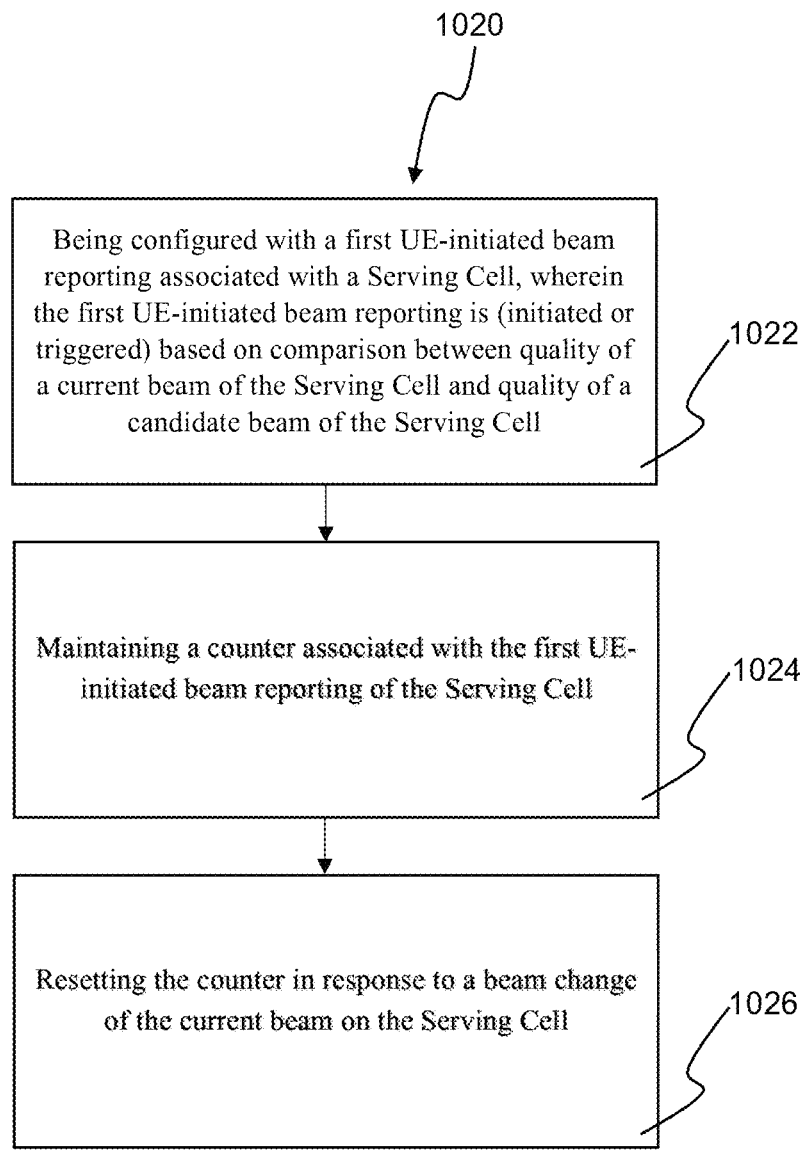
FIG. 28 is a flow diagram of a method of a UE in a wireless communication system comprising being configured with a first UE-initiated beam reporting associated with a Serving Cell, maintaining a counter associated with the first UE-initiated beam reporting of the Serving Cell, and resetting the counter in response to a beam change of the current beam on the Serving Cell, in accordance with embodiments of the present invention.

Referring to FIG. 28, with this and other concepts, systems, and methods of the present invention, a method 1020 for a UE in a wireless communication system comprises being configured with a first UE-initiated beam reporting associated with a Serving Cell, wherein the first UE-initiated beam reporting is (initiated or triggered) based on comparison between a quality of a current beam of the Serving Cell and a quality of a candidate beam of the Serving Cell (step 1022), maintaining a counter associated with the first UE-initiated beam reporting of the Serving Cell (step 1024), and resetting the counter in response to a beam change of the current beam on the Serving Cell (step 1026).

In various embodiments, the counter is used for detecting if an event associated with the first UE-initiated beam reporting is fulfilled within a time period.

In various embodiments, the event is the quality of the candidate beam being higher than the quality of the current beam plus a first threshold.

In various embodiments, the UE maintains a first timer associated with the first UE-initiated beam reporting, and the UE stops the first timer in response to the beam change of the current beam on the Serving Cell.

In various embodiments, in response to the beam change of the current beam on the Serving Cell, the UE does not restart or stop a second timer associated with a second UE-initiated beam reporting associated with a candidate cell.

In various embodiments, the second timer is timeToTrigger, and wherein the second timer is a time during which an event needs to be fulfilled in order to trigger an L1 event-triggered beam report associated with the candidate cell.

In various embodiments, the event is a quality of a candidate beam associated with the candidate cell being higher than the quality of the current beam of the Serving Cell plus a second threshold.

In various embodiments, the candidate cell is associated with a candidate configuration for LTM.

In various embodiments, the second UE-initiated beam reporting is for LTM.

In various embodiments, the current beam is an activated or indicated TCI state of the Serving Cell.

In various embodiments, the candidate beam is associated with a TCI state or a reference signal of the Serving Cell.

In various embodiments, the beam change of the current beam is indicated by a network via a DCI, a MAC CE or an RRC reconfiguration (message).

In various embodiments, the first UE-initiated beam reporting is for MIMO and/or for intra-cell beam management.

Referring back to FIGS. 3 and 4, in one or more embodiments from the perspective of a device (e.g., a UE) in a wireless communication system, the device 300 includes a program code 312 stored in memory 310 of the transmitter. The CPU 308 could execute program code 312 to: (i) be configured with a first UE-initiated beam reporting associated with a Serving Cell, wherein the first UE-initiated beam reporting is (initiated or triggered) based on comparison between a quality of a current beam of the Serving Cell and a quality of a candidate beam of the Serving Cell; (ii) maintain a counter associated with the first UE-initiated beam reporting of the Serving Cell; and (iii) reset the counter in response to a beam change of the current beam on the Serving Cell. Moreover, the CPU 308 can execute the program code 312 to perform all of the described actions, steps, and methods described above, below, or otherwise herein.

Figure 29:
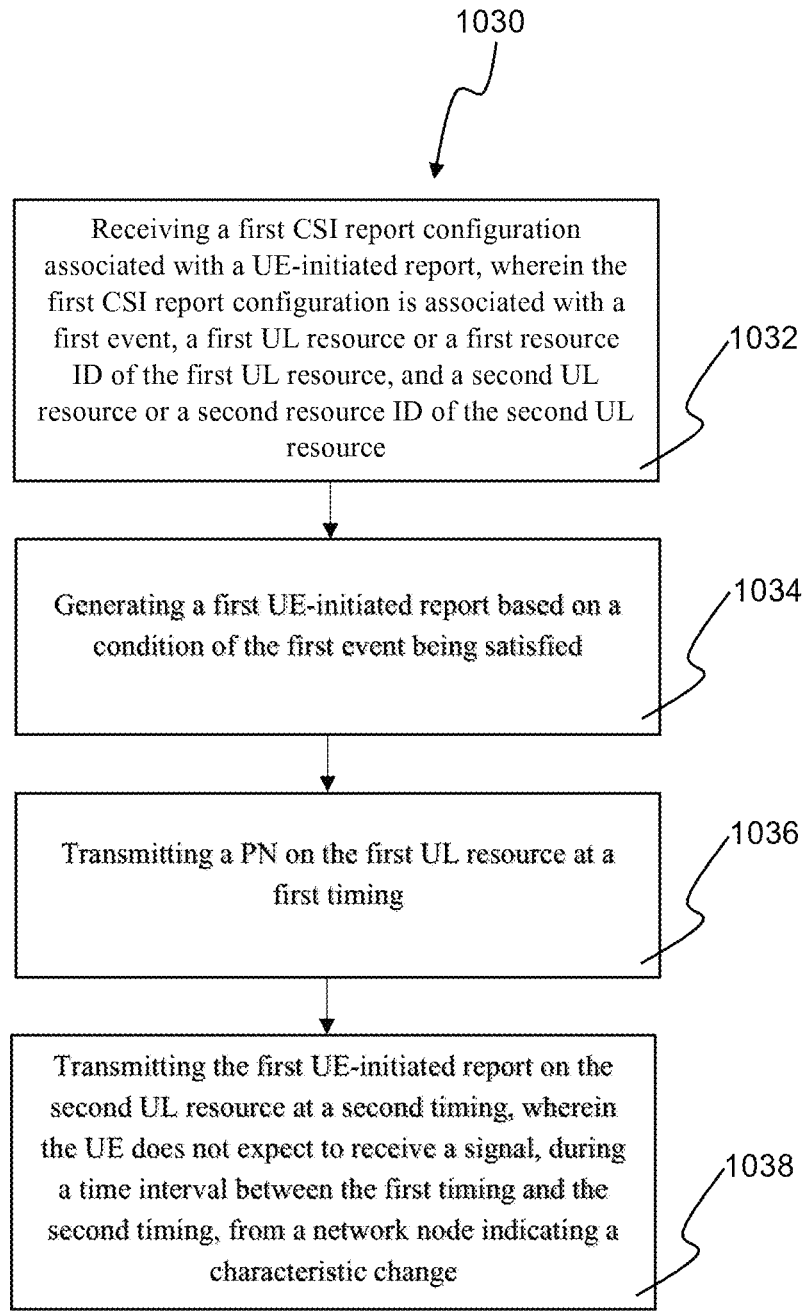
FIG. 29 is a flow diagram of a method of a UE in a wireless communication system comprising receiving a first CSI report configuration associated with a UE-initiated report, generating a first UE-initiated report based on a condition of the first event being satisfied, transmitting a PN on the first UL resource at a first timing, and transmitting the first UE-initiated report on the second UL resource at a second timing, in accordance with embodiments of the present invention.

Referring to FIG. 29, with this and other concepts, systems, and methods of the present invention, a method 1030 for a UE in a wireless communication system comprises receiving a first CSI report configuration associated with a UE-initiated report, wherein the first CSI report configuration is associated with a first event, a first UL resource or a first resource ID of the first UL resource, and a second UL resource or a second resource ID of the second UL resource (step 1032), generating a first UE-initiated report based on a condition of the first event being satisfied (step 1034), transmitting a PN on the first UL resource at a first timing (step 1036), and transmitting the first UE-initiated report on the second UL resource at a second timing, wherein the UE does not expect to receive a signal, during a time interval between the first timing and the second timing, from a network node indicating a characteristic change (step 1038).

In various embodiments, the characteristic corresponds to a characteristic of the first UL resource and/or a characteristic of the second UL resource.

In various embodiments, the characteristic corresponds to an active UL BWP, a serving cell, or a cell DRX active time.

In various embodiments, the first event corresponds to a quality of a candidate beam being higher than a quality of a current beam plus a threshold.

In various embodiments, the first UL resource and the second UL resource are configured or associated with a same characteristic, and/or the UE does not expect the first UL resource and the second UL resource to be configured or associated with different characteristics.

In various embodiments, the signal corresponds to a DCI or a MAC CE, or an RRC message, and/or the signal indicates a UL BWP which is different than a current active UL BWP, and/or the signal indicates a BWP change including change of the current active UL BWP.

Referring back to FIGS. 3 and 4, in one or more embodiments from the perspective of a device (e.g., a UE) in a wireless communication system, the device 300 includes a program code 312 stored in memory 310 of the transmitter. The CPU 308 could execute program code 312 to: (i) receive a first CSI report configuration associated with a UE-initiated report, wherein the first CSI report configuration is associated with a first event, a first UL resource or a first resource Identification ID of the first UL resource, and a second UL resource or a second resource ID of the second UL resource; (ii) generate a first UE-initiated report based on a condition of the first event being satisfied; (iii) transmit a PN on the first UL resource at a first timing; and (iv) transmit the first UE-initiated report on the second UL resource at a second timing, wherein the UE does not expect to receive a signal, during a time interval between the first timing and the second timing, from a network node indicating a characteristic change. Moreover, the CPU 308 can execute the program code 312 to perform all of the described actions, steps, and methods described above, below, or otherwise herein.

Figure 30:
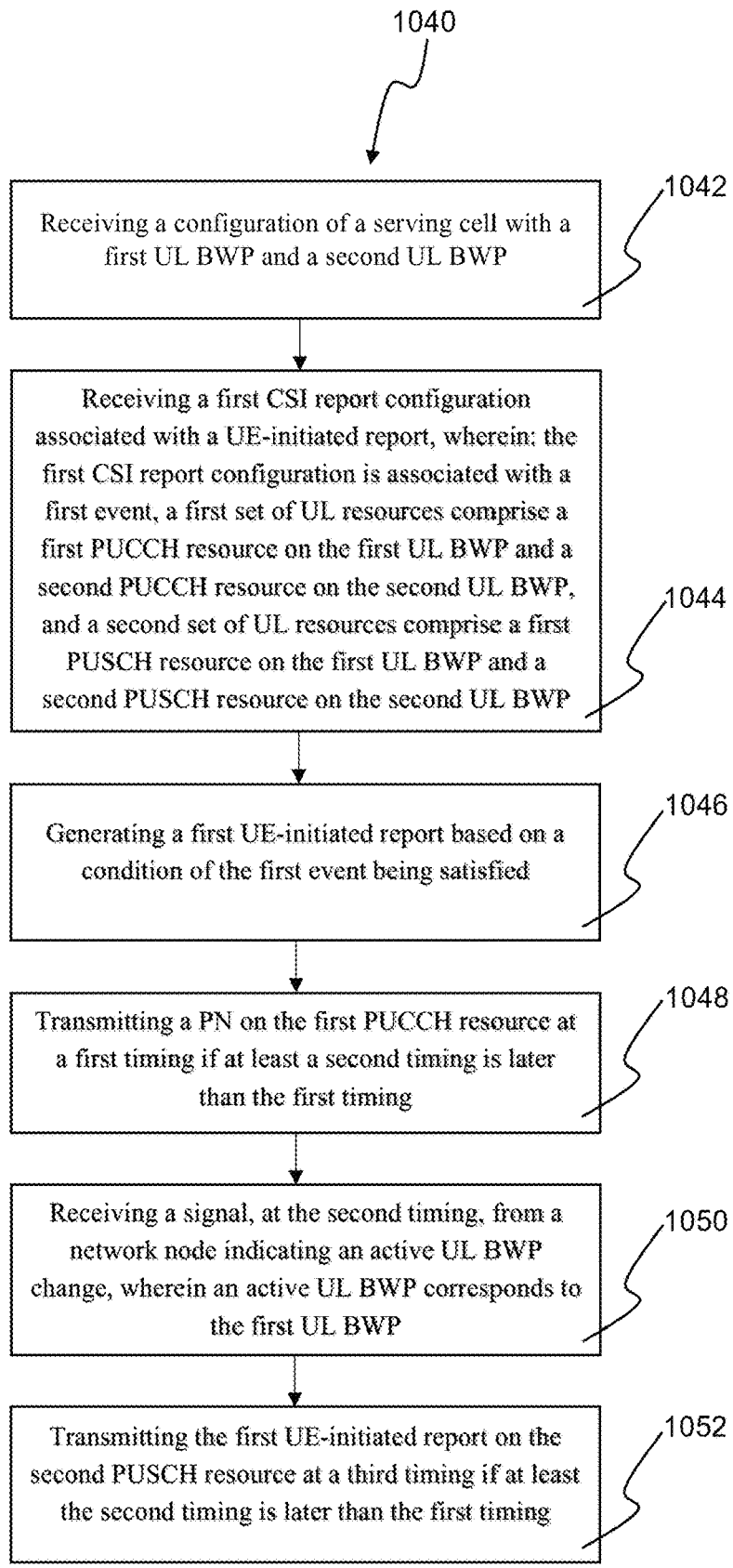
FIG. 30 is a flow diagram of a method of a UE in a wireless communication system comprising receiving a configuration of a serving cell with at least a first UL BWP and a second UL BWP, receiving a first CSI report configuration associated with a UE-initiated report, generating a first UE-initiated report based on a condition of the first event being satisfied, transmitting a PN on the first PUCCH resource at a first timing if at least a second timing is later than the first timing, receiving a signal, at the second timing, from a network node indicating an active UL BWP change, and transmitting the first UE-initiated report on the second PUSCH resource at a third timing if at least the second timing is later than the first timing, in accordance with embodiments of the present invention.

Referring to FIG. 30, with this and other concepts, systems, and methods of the present invention, a method 1040 for a UE in a wireless communication system comprises receiving a configuration of a serving cell with at least a first UL BWP and a second UL BWP (step 1042), receiving a first CSI report configuration associated with a UE-initiated report, wherein: the first CSI report configuration is associated with a first event, a first set of UL resources comprise at least a first PUCCH resource on the first UL BWP and a second PUCCH resource on the second UL BWP, and a second set of UL resources comprise at least a first PUSCH resource on the first UL BWP and a second PUSCH resource on the second UL BWP (step 1044), generating a first UE-initiated report based on a condition of the first event being satisfied (1046), transmitting a PN on the first PUCCH resource at a first timing if at least a second timing is later than the first timing (step 1048), receiving a signal, at the second timing, from a network node indicating an active UL BWP change, wherein an active UL BWP corresponds to the first UL BWP (step 1050), and transmitting the first UE-initiated report on the second PUSCH resource at a third timing if at least the second timing is later than the first timing (step 1052).

In various embodiments, the first event corresponds to a quality of a candidate beam being higher than a quality of a current beam plus a threshold.

In various embodiments, the first PUSCH resource is not available in response to the indication of the signal.

In various embodiments, the UE performs the active UL BWP change in response to an indication of the signal, and/or the signal indicates the second UL BWP which is different than the active UL BWP.

In various embodiments, if the second timing is before the first timing, the UE performs the active UL BWP change and transmits the PN on the second PUCCH resource and transmits the first UE-initiated report on the second PUSCH resource.

In various embodiments, the first PUCCH resource on the first UL BWP is associated with the second set of UL resources comprising both the first PUSCH resource on the first UL BWP and the second PUSCH resource on the second UL BWP, and/or the second PUCCH resource on the second UL BWP is associated with the second set of UL resources comprising both the first PUSCH resource on the first UL BWP and the second PUSCH resource on the second UL BWP, and/or the PN transmitted on the first PUCCH resource or on the second PUCCH resource indicates usage of the second set of UL resources comprising both the first PUSCH resource and the second PUSCH resource.

In various embodiments, depending on a current active UL BWP being as the first UL BWP or the second UL BWP, the UE determines one PUCCH resource for transmitting the PN among the first PUCCH resource and the second PUCCH resource, and/or depending on the current active UL BWP being as the first UL BWP or the second UL BWP, the UE determines one PUSCH resource for transmitting the UE-initiated report among the first PUSCH resource and the second PUSCH resource.

In various embodiments, the UE transmits the first UE-initiated report on the second PUSCH resource at the third timing if at least the third timing is later than the second timing.

In various embodiments, the first CSI report configuration indicates the first set of UL resources and the second set of UL resources.

Referring back to FIGS. 3 and 4, in one or more embodiments from the perspective of a device (e.g., a UE) in a wireless communication system, the device 300 includes a program code 312 stored in memory 310 of the transmitter. The CPU 308 could execute program code 312 to: (i) receive a configuration of a serving cell with at least a first UL BWP and a second UL BWP; (ii) receive a first CSI report configuration associated with a UE-initiated report, wherein: the first CSI report configuration is associated with a first event, a first set of UL resources comprise at least a first PUCCH resource on the first UL BWP and a second PUCCH resource on the second UL BWP, and a second set of UL resources comprise at least a first PUSCH resource on the first UL BWP and a second PUSCH resource on the second UL BWP; (iii) generate a first UE-initiated report based on a condition of the first event being satisfied; (iv) transmit a PN on the first PUCCH resource at a first timing if at least a second timing is later than the first timing; (v) receive a signal, at the second timing, from a network node indicating an active UL BWP change, wherein an active UL BWP corresponds to the first UL BWP; and (vi) transmit the first UE-initiated report on the second PUSCH resource at a third timing if at least the second timing is later than the first timing. Moreover, the CPU 308 can execute the program code 312 to perform all of the described actions, steps, and methods described above, below, or otherwise herein.

Any combination of the above or herein concepts or teachings can be jointly combined, in whole or in part, or formed to a new embodiment. The disclosed details and embodiments can be used to solve at least (but not limited to) the issues mentioned above and herein.

It is noted that any of the methods, alternatives, steps, examples, and embodiments proposed herein may be applied independently, individually, and/or with multiple methods, alternatives, steps, examples, and embodiments combined together.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects, concurrent channels may be established based on pulse repetition frequencies. In some aspects, concurrent channels may be established based on pulse position or offsets. In some aspects, concurrent channels may be established based on time hopping sequences. In some aspects, concurrent channels may be established based on pulse repetition frequencies, pulse positions or offsets, and time hopping sequences.

Those of ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of ordinary skill in the art would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects, any suitable computer-program product may comprise a computer-readable medium comprising codes relating to one or more of the aspects of the disclosure. In some aspects, a computer program product may comprise packaging materials.

While the invention has been described in connection with various aspects and examples, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

What is claimed is:

1. A method of a User Equipment (UE), comprising:
being configured with a first UE-initiated beam reporting associated with a Serving Cell, wherein the first UE-initiated beam reporting is based on comparison between a quality of a current beam of the Serving Cell and a quality of a candidate beam of the Serving Cell;
maintaining a counter associated with the first UE-initiated beam reporting of the Serving Cell; and
resetting the counter in response to a beam change of the current beam on the Serving Cell.

2. The method of claim 1, wherein the counter is used for detecting if an event associated with the first UE-initiated beam reporting is fulfilled within a time period.

3. The method of claim 2, wherein the event is the quality of the candidate beam being higher than the quality of the current beam plus a first threshold.

4. The method of claim 1, wherein the UE maintains a first timer associated with the first UE-initiated beam reporting, and the UE stops the first timer in response to the beam change of the current beam on the Serving Cell.

5. The method of claim 1, wherein in response to the beam change of the current beam on the Serving Cell, the UE does not restart or stop a second timer associated with a second UE-initiated beam reporting associated with a candidate cell.

6. The method of claim 5, wherein the second timer is timeToTrigger (ttt), and wherein the second timer is a time during which an event needs to be fulfilled in order to trigger a Layer 1 (L1) event-triggered beam report associated with the candidate cell.

7. The method of claim 6, wherein the event is a quality of a candidate beam associated with the candidate cell being higher than the quality of the current beam of the Serving Cell plus a second threshold.

8. The method of claim 5, wherein the candidate cell is associated with a candidate configuration for L1/Layer 2 (L2)-Triggered Mobility (LTM).

9. The method of claim 5, wherein the second UE-initiated beam reporting is for LTM.

10. The method of claim 1, wherein the current beam is an activated or indicated Transmission Configuration Indication ($T_{CI}$) state of the Serving Cell.

11. The method of claim 1, wherein the candidate beam is associated with a $T_{CI}$ state or a reference signal of the Serving Cell.

12. The method of claim 1, wherein the beam change of the current beam is indicated by a network via a Downlink Control Information (DCI), a Medium Access Control (MAC) Control Element (CE) or a Radio Resource Control (RRC) reconfiguration.

13. The method of claim 1, wherein the first UE-initiated beam reporting is for Multiple-Input Multiple-Output (MIMO) and/or for intra-cell beam management.

14. The method of claim 1, wherein the UE is configured with cell Discontinuous Reception (DRX) comprising a cell DRX pattern for a cell DRX inactive time and a cell DRX active time, and the UE is configured with one or more bundles of resources for the first UE-initiated beam reporting, wherein a bundle of the one or more bundles comprises a Physical Uplink Control Channel (PUCCH) resource for transmitting a Pre-Notification (PN) and a Physical Uplink Shared Channel (PUSCH) resource for transmitting a UE-initiated beam report, and wherein the UE transmits the UE-initiated beam report on the PUSCH resource based on at least both the PUCCH resource and the PUSCH resource are within the cell DRX active time, and the UE does not transmit the UE-initiated beam report on the PUSCH resource based on at least one of the PUCCH resource or the PUSCH resource is within the cell DRX inactive time.

15. A User Equipment (UE), comprising:
a memory; and
a processor operatively coupled with the memory, wherein the processor is configured to execute a program code to:
be configured with a first UE-initiated beam reporting associated with a Serving Cell, wherein the first UE-initiated beam reporting is based on comparison between a quality of a current beam of the Serving Cell and a quality of a candidate beam of the Serving Cell;
maintain a counter associated with the first UE-initiated beam reporting of the Serving Cell; and
reset the counter in response to a beam change of the current beam on the Serving Cell.

16. The UE of claim 15, wherein the counter is used for detecting if an event associated with the first UE-initiated beam reporting is fulfilled within a time period.

17. The UE of claim 16, wherein the event is the quality of the candidate beam being higher than the quality of the current beam plus a first threshold.

18. The UE of claim 15, wherein the UE maintains a first timer associated with the first UE-initiated beam reporting, and the UE stops the first timer in response to the beam change of the current beam on the Serving Cell.

19. The UE of claim 15, wherein in response to the beam change of the current beam on the Serving Cell, the UE does not restart or stop a second timer associated with a second UE-initiated beam reporting associated with a candidate cell.

20. The UE of claim 15, wherein the UE is configured with cell Discontinuous Reception (DRX) comprising a cell DRX pattern for a cell DRX inactive time and a cell DRX active time, and the UE is configured with one or more bundles of resources for the first UE-initiated beam reporting, wherein a bundle of the one or more bundles comprises a Physical Uplink Control Channel (PUCCH) resource for transmitting a Pre-Notification (PN) and a Physical Uplink Shared Channel (PUSCH) resource for transmitting a UE-initiated beam report, and wherein the UE transmits the UE-initiated beam report on the PUSCH resource based on at least both the PUCCH resource and the PUSCH resource are within the cell DRX active time, and the UE does not transmit the UE-initiated beam report on the PUSCH resource based on at least one of the PUCCH resource or the PUSCH resource is within the cell DRX inactive time.

* * * * *